(12) United States Patent
Passaniti et al.

(10) Patent No.: US 6,436,571 B1
(45) Date of Patent: Aug. 20, 2002

(54) BOTTOM SEALS IN AIR DEPOLARIZED ELECTROCHEMICAL CELLS

(75) Inventors: Joseph Lynn Passaniti, Middleton; Susan Jean Launder, Madison; John Edward Oltman, Mount Horeb, all of WI (US); Robert Brian Dopp, Marietta, GA (US); Gregory Scott Moy, Madison, WI (US); Michael Andrew Ward, Belvidere, IL (US)

(73) Assignee: Rayovac Corporation, Madison, WI (US)

( * ) Notice: Subject to any disclaimer, the term of this patent is extended or adjusted under 35 U.S.C. 154(b) by 0 days.

(21) Appl. No.: 09/262,977

(22) Filed: Mar. 5, 1999

Related U.S. Application Data
(60) Provisional application No. 60/077,037, filed on Mar. 6, 1998, and provisional application No. 60/091,384, filed on Jul. 1, 1998.

(51) Int. Cl.[7] ............................................. H01M 2/02
(52) U.S. Cl. ..................... 429/174; 429/27; 429/164; 429/171
(58) Field of Search ................... 429/27, 229, 164–174

(56) References Cited

U.S. PATENT DOCUMENTS

| | | | |
|---|---|---|---|
| 3,840,404 A | 10/1974 | Porter et al. | ............... 136/86 A |
| 3,855,000 A | 12/1974 | Jammet | ..................... 136/86 A |

(List continued on next page.)

FOREIGN PATENT DOCUMENTS

| | | | | |
|---|---|---|---|---|
| AU | 87177/75 | * | 6/1977 | ............ H01M/4/70 |
| AU | 26799/77 | * | 11/1979 | ............ H01M/4/00 |

(List continued on next page.)

OTHER PUBLICATIONS

Arregui, J., et al. "Universal application of the zinc–air system in batteries." *Progress in Batteries and Solar Cells,* vol. 5, 1984, pp. 136–138. Abstract. (no month).*

Bender, Steven F., et al. "Zinc/Air Cells." *Handbook of Batteries,* New York: McGraw–Hill, Inc., 1995. pp. 13.1–13.5. (no month).*

(List continued on next page.)

*Primary Examiner*—Carol Chaney
(74) *Attorney, Agent, or Firm*—Quarles & Brady LLP

(57) ABSTRACT

An elongate, generally tubular, air depolarized electrochemical cell (10) comprising a cathode (14), including an air cathode assembly (26), extending about the tubular circumference, and along the tubular length, of the cell (10), an anode (12), a separator (16) between the anode (12) and the cathode (14), electrolyte, a top closure member (177, 200), and a bottom closure member (114, 202). The cathode assembly (26) is fixedly held, by a friction fit, in a slot (116) at the bottom of the cell. The slot can be developed, for example, by inner (110) and outer (114) wars of a cathode can (28), by inner (226) and outer (224) walls of a bottom closure member (202), or by an outer wall (114) of a cathode can (28) and an opposing outer wall of a plug (128) on the interior of the cell. Preferably, bottom closure structure of the cell (10) and receives a bottom edge portion (44) of the cathode current collector (32), and makes electrical contact with, the bottom edge portion (44), preferably at an inner surface (60) of the cathode current collector. A diffusion member (36) of the cathode assembly (26) is preferably compressed as a seal, at the bottom of the cell (10), between an outer side wall (39) of the cell and the remainder of the cathode assembly (26). The diffusion member (36) is also used at least as an assist in sealing the cell (10) against electrolyte leakage from the anode cavity (137) and past the cathode assembly (26). Various embodiments comprehend a variety of bottom seal members (140, 142) between the bottom wall (37) and the electroactive anode material (20), typically in combination with a bottom slot (116) receiving the cathode assembly (26) adjacent an outer side wall (39) of the bottom closure member (30, 202).

8 Claims, 25 Drawing Sheets

U.S. PATENT DOCUMENTS

| | | | | |
|---|---|---|---|---|
| 3,864,171 | A * | 2/1975 | Mills et al. | 136/107 |
| 3,881,959 | A | 5/1975 | Tsuchida et al. | 136/86 A |
| 3,897,265 | A * | 7/1975 | Jaggard | 136/86 A |
| 3,963,519 | A * | 6/1976 | Louie | 136/86 A |
| 3,977,901 | A * | 8/1976 | Buzzelli | 136/86 A |
| 4,041,211 | A * | 8/1977 | Wiacek | 429/36 |
| 4,054,726 | A * | 10/1977 | Sauer et al. | 429/66 |
| 4,105,830 | A * | 8/1978 | Kordesch | 429/27 |
| 4,118,544 | A * | 10/1978 | Przybyla et al. | 429/27 |
| 4,189,526 | A * | 2/1980 | Cretzmeyer et al. | 429/13 |
| 4,262,062 | A * | 4/1981 | Zatsky | 429/27 |
| 4,333,993 | A * | 6/1982 | Gibbard | 429/27 |
| 4,343,869 | A | 8/1982 | Oltman et al. | 429/27 |
| 4,369,568 | A | 1/1983 | Dopp | 29/623.2 |
| 4,380,576 | A | 4/1983 | Yoshida et al. | 429/27 |
| 4,404,266 | A | 9/1983 | Smilanich | 429/27 |
| RE31,413 | E * | 10/1983 | Jaggard | 429/27 |
| 4,433,035 | A | 2/1984 | Wiacek | 429/27 |
| 4,439,500 | A | 3/1984 | Gibbard et al. | 429/27 |
| 4,557,983 | A | 12/1985 | Sauer | 429/27 |
| 4,585,710 | A | 4/1986 | McEvoy | 429/27 |
| 4,591,539 | A | 5/1986 | Oltman et al. | 429/27 |
| 4,626,482 | A * | 12/1986 | Hamlen et al. | 429/27 |
| 4,649,090 | A | 3/1987 | Oltman et al. | 429/29 |
| 4,687,714 | A | 8/1987 | Oltman et al. | 429/27 |
| 4,791,034 | A | 12/1988 | Dopp | 429/27 |
| 4,822,698 | A | 4/1989 | Jackovitz et al. | 429/27 |
| 4,828,939 | A | 5/1989 | Turley et al. | 429/38 |
| 4,842,963 | A | 6/1989 | Ross, Jr. | 429/21 |
| 4,885,217 | A * | 12/1989 | Hoge | 429/27 |
| 4,894,295 | A | 1/1990 | Cheiky | 429/77 |
| 4,894,296 | A | 1/1990 | Borbely et al. | 429/27 |
| 4,950,561 | A | 8/1990 | Niksa et al. | 429/27 |
| 4,957,826 | A | 9/1990 | Cheiky | 429/27 |
| 5,185,218 | A | 2/1993 | Brokman et al. | 429/27 |
| 5,190,833 | A | 3/1993 | Goldstein et al. | 429/27 |
| 5,279,905 | A | 1/1994 | Mansfield, Jr. et al. | 429/27 |
| 5,306,578 | A | 4/1994 | Ohashi et al. | 429/27 |
| 5,308,711 | A | 5/1994 | Passaniti et al. | 429/29 |
| 5,328,777 | A | 7/1994 | Bentz et al. | 429/27 |
| 5,362,577 | A | 11/1994 | Pedicini | 429/27 |
| 5,366,822 | A | 11/1994 | Korall et al. | 429/27 |
| 5,378,562 | A | 1/1995 | Passaniti et al. | 429/224 |
| 5,415,949 | A | 5/1995 | Stone et al. | 429/63 |
| 5,451,473 | A | 9/1995 | Oltman et al. | 429/27 |
| 5,458,988 | A | 10/1995 | Putt | 429/27 |
| 5,462,818 | A * | 10/1995 | Jacus et al. | 429/174 |
| 5,567,538 | A | 10/1996 | Oltman et al. | 429/27 |
| 5,576,117 | A | 11/1996 | Morita et al. | 429/162 |
| 5,582,930 | A | 12/1996 | Oltman et al. | 429/27 |
| 5,582,932 | A | 12/1996 | Oltman et al. | 429/27 |
| 5,591,541 | A | 1/1997 | Oltman | 429/171 |
| 5,607,796 | A | 3/1997 | Jacus et al. | 429/165 |
| 5,662,717 | A | 9/1997 | Burns | 29/623.1 |
| 5,733,676 | A | 3/1998 | Dopp et al. | 429/27 |
| 5,804,327 | A | 9/1998 | Oltman | 429/27 |
| 5,846,672 | A | 12/1998 | Bennett | 429/164 |

FOREIGN PATENT DOCUMENTS

| | | | | |
|---|---|---|---|---|
| AU | 46311/79 | B * | 11/1979 | H01M/12/06 |
| AU | B1 38479/78 | * | 2/1980 | H01M/2/14 |
| AU | 18497/83 | A | 3/1984 | H01M/4/92 |
| AU | 28771/84 | A | 12/1984 | H01M/12/06 |
| AU | 16333/83 | A | 9/1986 | H01M/4/98 |
| AU | 22725/88 | B | 4/1989 | H01M/10/42 |
| AU | 24798/88 | B | 5/1989 | H01M/2/38 |
| AU | 28963/89 | B | 8/1989 | H01M/2/18 |
| AU | 86060/91 | B | 12/1991 | H01M/10/42 |
| CA | 1 185 318 | | 4/1985 | H01M/6/02 |
| CA | 1 212 717 | | 10/1986 | H01M/4/74 |
| CA | 2125954 | | 6/1993 | H01M/2/02 |
| CA | 2177393 | | 4/1995 | H01M/2/04 |
| EP | 0 129 881 | A1 | 1/1985 | H01M/12/06 |
| EP | 0 560 579 | A1 | 9/1993 | H01M/2/02 |
| JP | 55-025916 | * | 2/1980 | H01M/4/96 |
| JP | 55-043765 | | 3/1980 | H01M/12/06 |
| JP | 55-090080 | | 7/1980 | H01M/12/04 |
| JP | 57-021069 | | 2/1982 | H01M/4/96 |
| JP | 57-032575 | | 2/1982 | H01M/4/86 |
| JP | 57-163964 | | 10/1982 | H01M/4/90 |
| JP | 58-026460 | | 2/1983 | H01M/4/90 |
| JP | 58-026461 | | 2/1983 | H01M/4/90 |
| JP | 58-032369 | | 2/1983 | H01M/4/90 |
| JP | 58-42184 | | 3/1983 | H01M/12/06 |
| JP | 58-053159 | | 3/1983 | H01M/4/90 |
| JP | 58-061569 | | 4/1983 | H01M/4/90 |
| JP | 58-087781 | | 5/1983 | H01M/12/06 |
| JP | 58-106765 | | 6/1983 | H01M/4/96 |
| JP | 58-112275 | | 7/1983 | H01M/12/06 |
| JP | 58-128678 | | 8/1983 | H01M/12/06 |
| JP | 58-161273 | | 9/1983 | H01M/12/06 |
| JP | 58-165252 | | 9/1983 | H01M/4/86 |
| JP | 58-198861 | | 11/1983 | H01M/4/86 |
| JP | 60-41752 | | 3/1985 | H01M/2/02 |
| JP | 61-2279 | | 1/1986 | H01M/12/06 |
| JP | 62-202470 | | 9/1987 | H01M/12/06 |
| JP | 63-62170 | | 3/1988 | H01M/12/06 |
| JP | 63-294672 | | 12/1988 | H01M/12/06 |
| JP | 2-236949 | | 9/1990 | H01M/2/02 |
| JP | 3-297074 | | 12/1991 | H01M/12/06 |
| JP | 4-14754 | | 1/1992 | H01M/2/16 |
| JP | 4-17259 | | 1/1992 | H01M/1/16 |
| JP | 162374 | | 6/1992 | H01M/12/06 |
| JP | 4-206443 | | 7/1992 | H01M/2/02 |
| JP | 4-312771 | | 11/1992 | H01M/12/06 |
| JP | 529025 | | 2/1993 | H01M/12/06 |
| JP | 5-47422 | | 2/1993 | H01M/12/06 |
| JP | 121104 | | 5/1993 | H01M/12/06 |
| JP | 5-217605 | | 8/1993 | H01M/12/06 |
| JP | 5-258782 | | 10/1993 | H01M/12/06 |
| JP | 8-173775 | | 7/1996 | B01D/69/00 |
| JP | 8-195229 | | 7/1996 | H01M/12/06 |
| JP | 11-185835 | | 7/1999 | H01M/12/06 |
| WO | WO92/10864 | | 6/1992 | H01M/12/06 |

OTHER PUBLICATIONS

Costenoble, U., et al. Galvanic Primary Element. Oct. 16, 1986. p. 4. Abstract.

Cretzmeyer, J. W. et al. "Zinc–Air Button Cells." Proc.— Electrochem. Soc. (United States), 1981. pp. 283–284. Abstract. No month.

Cretzmeyer, John W. "Commercial Zinc–Air Batteries." *Power Sources 6,* Academic Press, 1977. pp. 269–290.

Cutler, Tim. "A Design Guide For Rechargeable Zinc–Air Battery Technology." Undated, pp. 616–621.

Gibbard, H. F. et al. "Mechanisms of Operation of the Zinc–Air Battery."1979. Abstract. No month.

Gyorki, John R. "Hybrid Battery Systems Take Charge." *Machine Design,* vol. 61(22), Nov. 1989, pp. 123–127.

Gyorki, John R. "Smart Battery Chemistries Take Charge." *Machine Design,* Mar. 1995, pp. 130–138.

Harris, Frank M., et al. "Zinc–Air Rechargeable Batteries For Mobile Power." *1994IEEE,* Smyrna: AER Energy Resources, Inc., 1994. No month.

Hitachi Product Literature "Specifications" 1982. No month.

Kiehne, H. A. *Battery Technology Handbook,* New York: Marcel Dekker, Inc., 1989, pp. 302–303, 314–317, and 334–335. No month.

Kloss, W., et al. "Galvanic Primary Element." DE 2853740 A, Jun. 1980, Abstract.

Konishi, Hajime, et al. "Zinc–air Batteries for Pagers." *National Technical Report,* vol. 37(1), Feb. 1991, pp. 38–73, (translation pp. 1–20).

Martin, Robert L. "How Long Should A Battery Last? Check the Chart." *The Hearing Journal,* vol. 45(1), Jan. 1992, pp. 21–22.

Martin, Robert L. "Some Facts You Should Know About Hearing Aid Batteries." The Hearing Journal, vol. 44(11), Nov. 1991, pp. 41–42.

Megahed, Sid, et al. "Batteries for Present & Future Hearing Aids." *ASHA,* Jun./Jul. 1990, pp. 52–54.

Morita, Yoshinobu. "Zinc–Air Batteries (Button Type) for Hearing Aids." *National Technical Report,* vol. 32(5), 1986, pp. 590–596, (translation pp. 1–26). No month.

Morse, E. M. "Zinc–Oxygen Battery System." 19th Annual Power Sources Conference, May 1965, pp. 109–112.

Naoka, Soma, et al. "High–Capacity Zinc–Air Battery Series for Hearing Aids." *National Technical Report,* vol. 40(4), 1994, pp. 18–23, (translation pp. 1–21). No month.

Nonomura, Eiichi. "Recent Directions in Hearing Aids." *Japan Acoustics Society Magazine,* vol. 45(7), 1989, pp. 549–555. Original and translation. No month.

Power, Robert A. "Advances and Trends in Primary and Small Secondary Batteries." *IEEE AES Systems Magazine,* Apr. 1994, pp. 32–36.

Putt, R. A., et al. "Advanced zinc–air batteries." *Proceedings of the 28th Intersociety Energy Conversion Engineering Conference,* vol. 1, 1993. Abstract. No month.

Pytches, Dick. "Zinc–air cells; power source of the future." *Electronics and Power,* vol. 29(7/8), Jul./Aug. 1983, pp. 577–580.

Riezenman, Michael J. "The Search For Better Batteries." *IEEE Spectrum,* vol. 32, May 1995, pp. 51–56.

Russell, Bill. "Power out of thin air." *Engineering Materials & Design,* Apr. 1984, pp. 81–82.

Sauer, H. Air Oxygen Cell, Original title Luftsauerstoffzelle. DE 3314624 A, Oct. 1984. Abstract.

Sauer, H. *Galvanic Circular or Button Cell,* Original title *Galvanisch Rund—oder Knopfzelle.* DE 3034600 A, Sep. 1982. Abstract.

Schimpf, Mark. "Rechargeable Zinc Air Batteries Market and Technology Overview." *Multidimensional Digital Filters,* Technical Conference, Session 1, Mar. 1995, pp. 30–36.

Schroeder, Mary. "Zinc air batteries—here today, here tomorrow." *Hearing Instruments,* vol. 38(7), Jul. 1987, p. 11.

Sieminski, Dennis. "Recent Advances in Rechargeable Zinc–Air Battery Technology." The Twelfth Annual Battery Conference on Applications and Advances, Jan. 1997, pp. 171–180.

Thorpe, Bill. "Battery design reflects smaller sizes, greater powers of today's hearing aids." Hearing Instruments, vol. 44(9), Sep. 1993, p. 24.

"What is a Battery?" Rayovac Corporation, 1995. pp. 6–7. No month.

* cited by examiner

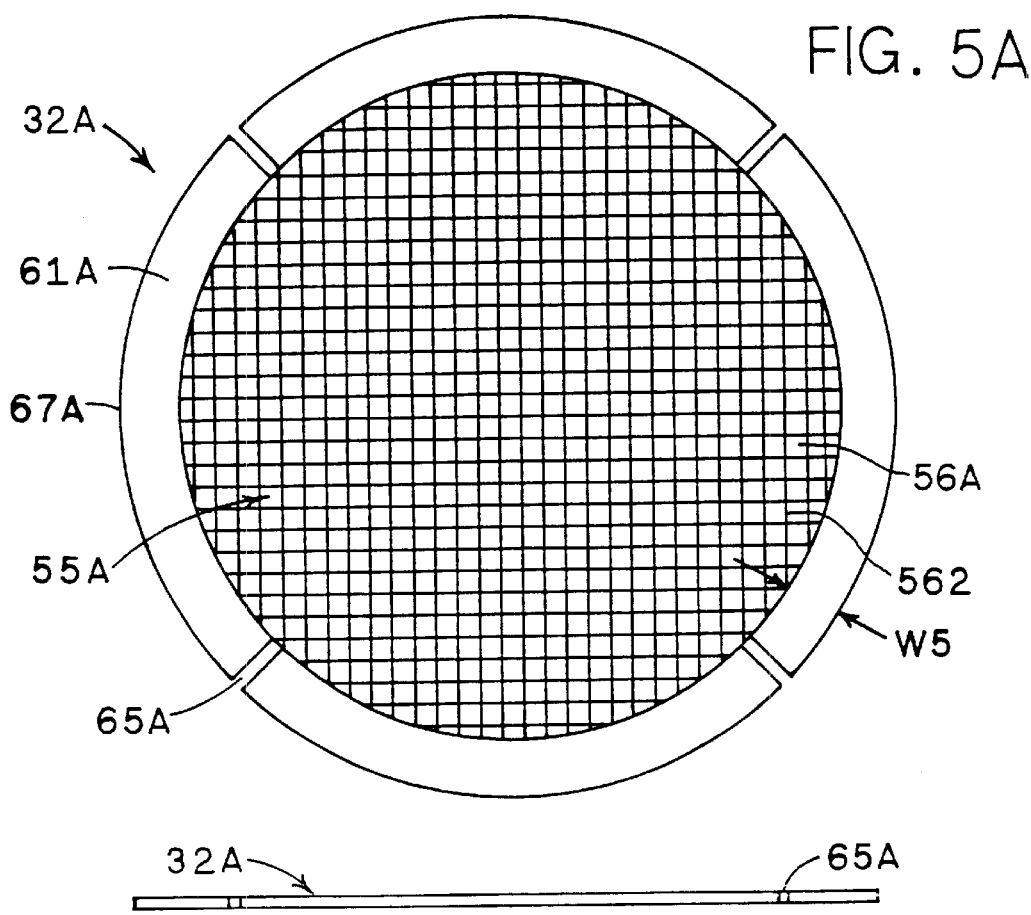
FIG. 5A
FIG. 5B
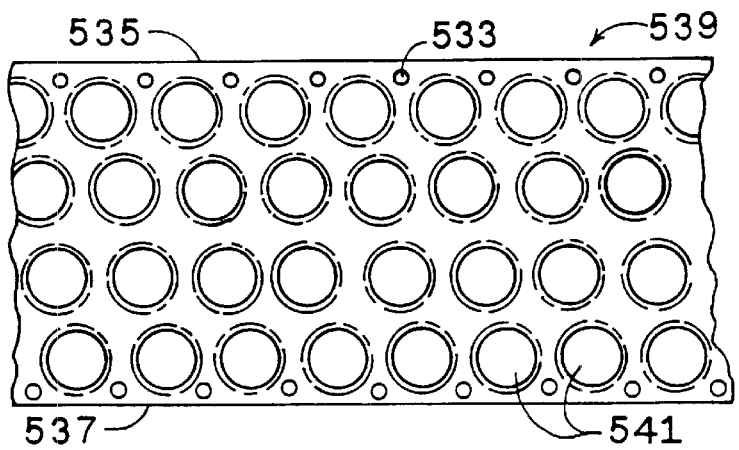
FIG. 5C

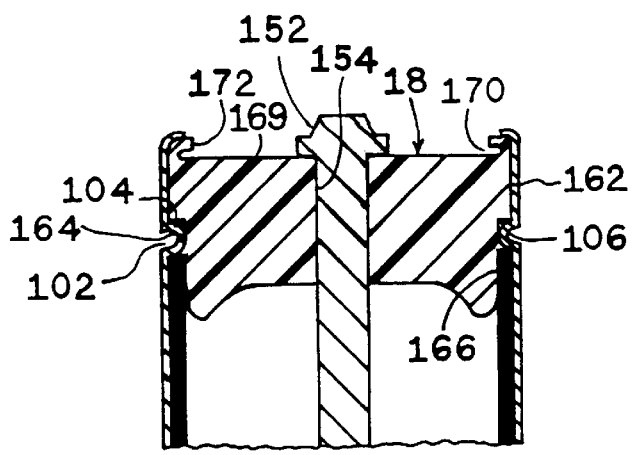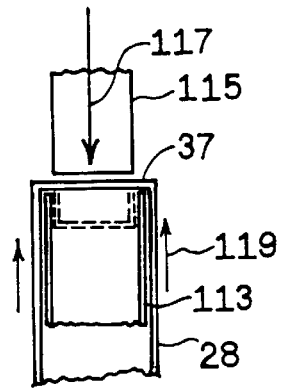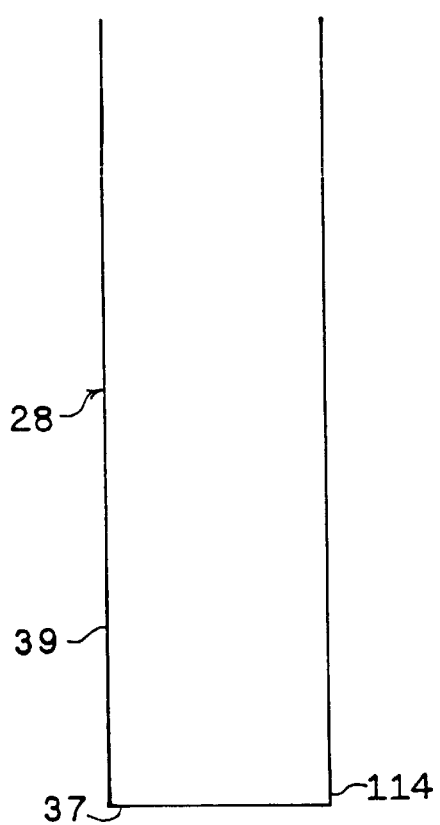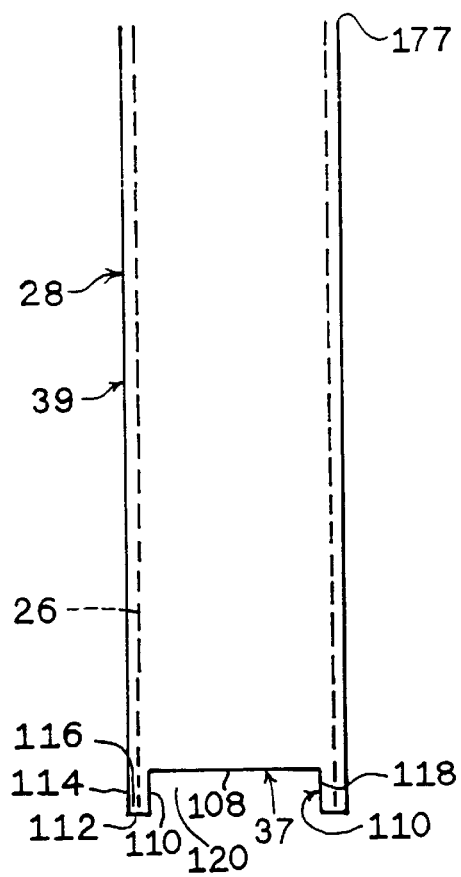
FIG. 18　　FIG. 20A
FIG. 19　　FIG. 20

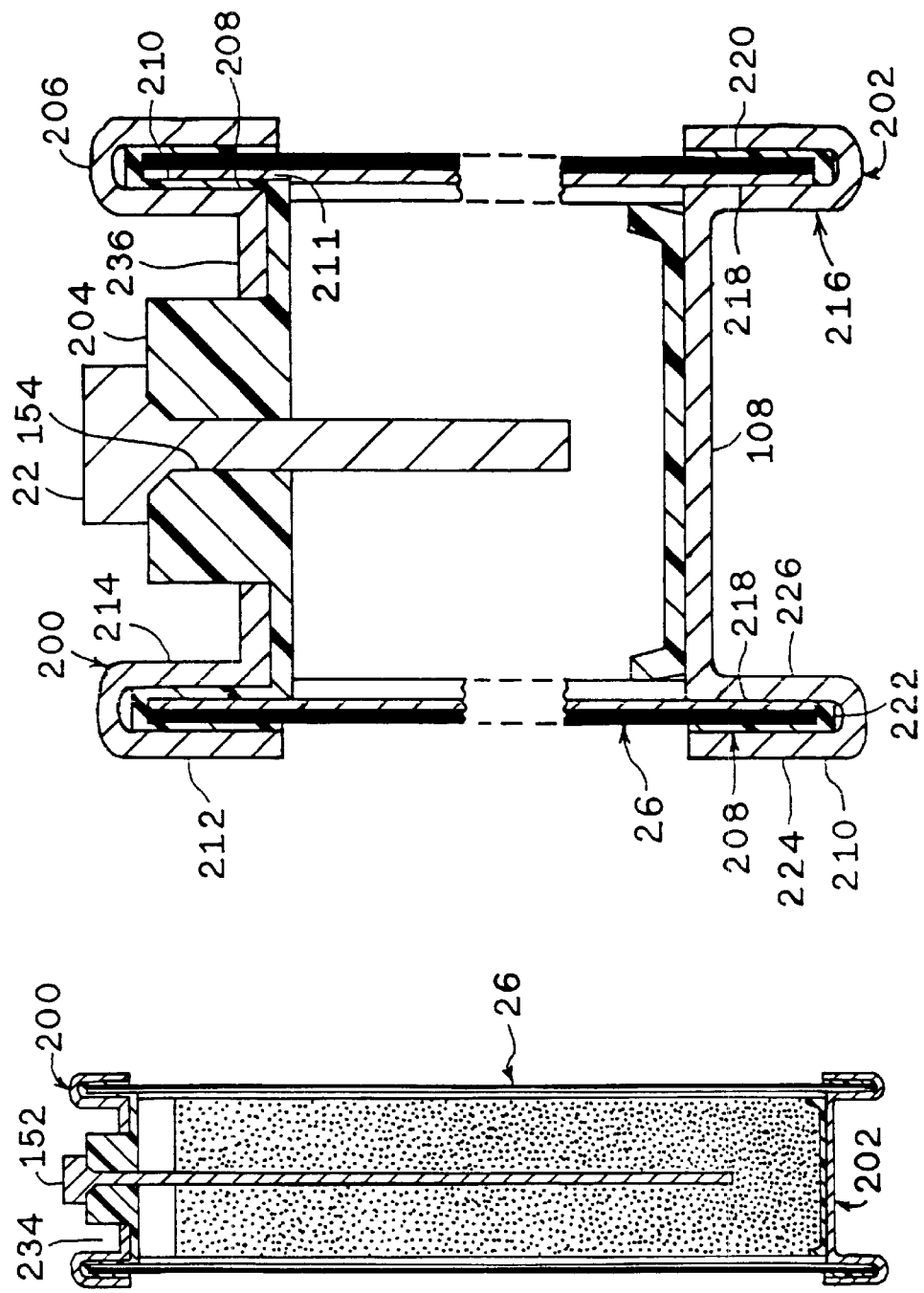

BOTTOM SEALS IN AIR DEPOLARIZED ELECTROCHEMICAL CELLS

This application claims priority from provisional application serial No. 60/077,037, filed Mar. 6, 1998, and serial No. 60/091,384 filed Jul. 1, 1998, both of which are incorporated herein by reference in their entireties.

The U.S. Government has a paid-up license in this invention and the right in limited circumstances to require the patent owner to license others on reasonable terms as provided for by the terms of one or more of Contract Nos. DAAL01-95-C-3543, DAAB07-96-C-G026, and DAAB07-97-C-G027 awarded by Department of the Army.

BACKGROUND

This invention relates to air depolarized electrochemical cells. This invention is related specifically to metal-air, air depolarized electrochemical cells, especially elongate cylindrical cells. Elongate cells are described herein with respect to cells having the size generally known as "AA."

Button cells, also illustrated herein, are commercially produced in smaller sizes having lesser height-to-diameter ratios, and are generally directed toward use in hearing aids, and computer applications. Such button cells generally feature overall contained cell volume of less than 2 cm$^3$, and for the hearing aid cells less than 1 cm$^3$.

The advantages of air depolarized cells have been known as far back as the 19th century. Generally, an air depolarized cell draws oxygen from air of the ambient environment, for use as the cathode active material. Because the cathode active material need not be carried in the cell, the space in the cell that would have otherwise been required for carrying cathode active material can, in general, be utilized for containing anode active material.

Accordingly, the amount of anode active material which can be contained in an air depolarized cell is generally significantly greater than the amount of anode active material which can be contained in a 2-electrode cell of the same overall size. By "2-electrode" cell, we mean an electrochemical cell wherein the entire charge of both anode active material and cathode active material are contained inside the cell structure when the cell is received by the consumer.

Generally, for a given cell size, and similar mass, an air depolarized cell can provide a significantly greater number of watt-hours of electromotive force than can a similarly sized, and similar mass, 2-electrode cell using the same, or a similar, material as the anode electroactive material.

Several attempts have been made to develop and market commercial applications of metal-air cells. However, until about the 1970's, such cells were prone to leakage, and other types of failure.

In the 1970's, metal-air button cells were successfully introduced for use in hearing aids, as replacement for 2-electrode cells. The cells so introduced were generally reliable, and the incidence of leakage had generally been controlled to an extent sufficient to make such cells commercially acceptable.

By the mid 1980's, zinc-air cells became the standard for hearing aid use. Since that time, significant effort has been made toward improving metal-air hearing aid cells. Such effort has been directed toward a number of issues. For example, efforts have been directed toward increasing electrochemical capacity of the cell, toward consistency of performance from cell to cell, toward control of electrolyte leakage, toward providing higher voltages desired for newer hearing aid appliance technology, toward higher limiting current, and toward controlling movement of moisture into and out of the cell, and the like.

An important factor in button cell performance is the ability to consistently control movement of the central portion of the cathode assembly away from the bottom wall of the cathode can during final cell assembly. Such movement of the central portion of the cathode assembly is commonly known as "doming."

Another important factor in button cell performance is the electrical contact between the cathode current collector and the cathode can or other cathode terminal. Conventional cathode current collectors comprise woven wire screen structure wherein ends of such wires provides the electrical contact between the cathode current collector and the inner surface of the cathode can.

While metal-air button cells have found wide-spread use in hearing appliances, and some use as back-up batteries in computers, air depolarized cells have, historically, not had wide-spread commercial application for other end uses, or in other than small button cell sizes.

The air depolarized button cells readily available as items of commerce for use in hearing aid appliances are generally limited to sizes of no more than 0.6 cm$^3$ overall volume. In view of the superior ratio of "watt-hour capacity/mass" of air depolarized cells, it would be desirable to provide air depolarized electrochemical cells in additional sizes and configurations, and for other applications. It would especially be desirable to provide air depolarized electrochemical cells which are relatively much larger than button cells. For example, it would be desirable to provide such cells in "AA" size as well as in the standard button cell sizes.

SUMMARY OF THE INVENTION

It is an object of the invention to provide an elongate an depolarized electrochemical cell having a cathode extending along the length of the cell, and having a bottom electrically insulating seal member extending across the bottom of the anode cavity between the anode cavity and the bottom wall of the cell.

It is another object of the invention to provide an air depolarized cell wherein the bottom seal member comprises a melt plug.

It is a further object to provide such a cell having such a melt plug by melting one or more solid particles of electrically insulating thermoplastic seal material inside the anode cavity.

It is a yet further object to provide a cell having such a melt plug by melting such solid particles by driving heat through the bottom wall of the cell.

Still another object is to provide a cell having such a melt plug by melting such solid particles by applying heat to the solid particles by applying heat through the top of the cell.

Another object is to provide a cell having such a melt plug by spray-applying a melted such thermoplastic electrically-insulating material into the bottom of the otherwise-empty anode cavity.

Another object is to provide a cell wherein the bottom seal member comprises an isolation cup extending generally across the bottom of the anode cavity and separating the anode material from the bottom wall.

A yet further object is to provide a cell wherein the bottom seal member comprises a combination of an isolation cup between the bottom wall and a melt plug.

A still further object is for the separator to extend below the top of the bottom seal member at the joint between the bottom seal member and the separator, and to terminate above the bottom of the cathode current collector.

It is yet another object to provide a method of fabricating an elongate air depolarized cell, including melting one or more particles of an electrically insulating thermoplastic seal material in situ in the bottom of the anode cavity, and subsequently to solidify the melt plug material, thereby to provide an insulating melt plug between the positively-charged bottom wall and the negatively-charged anode material.

In a first family of embodiments, the invention comprehends an elongate air depolarized electrochemical cell. The cell has a top and a bottom, and a transverse cross-section disposed along a length of the cell. The cell comprises a cathode, including an air cathode assembly extending along the length of the cell; an anode, including an anode cavity and electroactive anode material in the anode cavity, the anode cavity having a top and a bottom; and a separator, having an inner side wall thereof defining a side wall of the anode cavity between the anode material and the cathode assembly. Electrolyte is dispersed in the anode, the cathode, and the separator. A bottom closure member is electrically connected to the cathode assembly and forms a bottom wall of the air depolarized electrochemical cell. An electrically insulating bottom seal member extends generally across that portion of the transverse cross-section which spans the anode cavity at the bottom of the anode cavity. The bottom seal member separates the electroactive anode material from the bottom wall, and provides a seal about the side wall of the anode cavity at the separator.

In preferred embodiments, the bottom seal member comprises a melt plug extending generally across the bottom of the anode cavity, electrically separating the electroactive anode material from the bottom wall. The melt plug preferably results from placing one or more particles of thermoplastic material at the bottom of the anode cavity, and subsequently melting the one or more particles in situ and thereby activating melt flow of the thermoplastic material thus to cove that portion of the transverse cross-section which spans the bottom of the anode cavity. The melt plug preferably comprises an upwardly-inclined meniscus at the separator.

In preferred embodiments the melt plug results from driving heat through the bottom wall of the bottom closure member and thereby melting one or more particles of thermoplastic seal material in the bottom of the anode cavity.

In other embodiments, the melt plug results from application of an already melted thermoplastic material in melt form in the bottom of the anode cavity such that the melted material reaches at least as high as an equal quantity of such material would reach by surface tension in a melted state.

Whatever the form of the bottom seal member, and however the bottom seal member is generated and/or applied in the bottom of the anode cavity, in preferred embodiments, the cell includes a downwardly extending slot adjacent an outer side wall of the bottom closure member, the cathode assembly extending downwardly into the slot and making electrical connection with the bottom closure member in the slot. Preferably, the separator extends downwardly below the top of the melt plug, as established adjacent the separator, and terminates above the bottom edge of the cathode current collector.

Either alone or in combination with a melt plug, the bottom seal member can comprise an electrically insulating isolation cup extending across the cross-section of the cell at the bottom of the anode cavity, between the anode material and the bottom wall, electrically separating the electroactive anode material from the bottom wall, and providing a seal about the side wall of the anode cavity at the separator. Where an isolation cup is used in combination with a melt plug, the isolation cup is generally between the melt plug and the bottom wall of the cell.

The invention further comprehends a method of fabricating an elongate air depolarized electrochemical cell having a top, a bottom, and a transverse cross-section disposed along a length of the cell. The cell comprises a cathode including a cathode assembly, an anode including an anode cavity containing electroactive anode material, a separator having an inner side wall thereof defining a side wall of the anode cavity between the electroactive anode material and the cathode assembly, and electrolyte dispersed in the anode material, the cathode assembly, and the separator. A bottom closure member is electrically connected to the cathode assembly and forms a bottom wall of the cell. The method comprises assembling a cathode assembly to a bottom closure member and thereby defining the anode cavity inwardly of the separator; and before loading electroactive anode material into the anode cavity, placing one or more particles of thermoplastic seal material into the anode cavity and subsequently melting the one or more particles in situ and thereby activating melt flow of the thermoplastic seal material outwardly to the separator such that the melted thermoplastic seal material extends generally across that portion of the transverse cross-section which spans the anode cavity and develops a melt plug separating the anode cavity from the bottom wall of the bottom closure member. The method further comprises solidifying the melted thermoplastic seal material to form a solid electrically insulating melt plug separating the anode cavity from the bottom wall, subsequently loading electroactive anode material into the anode cavity, and after loading the electroactive anode material into the anode cavity, employing top closure structure at the top of the cell to thereby close the cell.

Typically, the melting of the one or more particles includes developing an upwardly-inclined meniscus in the melted thermoplastic material adjacent the separator.

In some embodiments, the melting of the one or more particles comprises driving heat through the bottom wall of the bottom closure member to the one or more particles of seal material. In other embodiments, the melting of the particles comprises applying heat to the one or more particles through an open top of the anode cavity.

BRIEF DESCRIPTION OF THE DRAWINGS

FIG. 5A shows a representative perforated metal cathode current collector for use in a button cell, and having a generally imperforate contact zone.

FIG. 5B shows a representative edge view of the cathode current collector of FIG. 5A.

FIG. 5C shows a metal strip illustrating an array of patterns of circular etched precursors of cathode current collectors, from which current collectors of FIG. 5A can be made.

FIG. 18 is a cross-section of a top portion of a cell of the invention illustrating a stop groove in the cathode can.

FIG. 19 is a representative cross-section of a drawn, or drawn and ironed, pre-form used to make cathode cans for use in cells of the invention.

FIG. 20 is a representative cross-section of a second stage pre-form, made from the pre-form of FIG. 19.

FIG. 20A illustrates the process of converting the pre-form of FIG. 19 to the cross-section configuration shown in FIG. 20.

FIG. 28 is a representative cross-section showing a wide seal bead being formed at the bottom flange of the cathode can.

FIG. 33 is a cross-section of a can-less embodiment of a cell of the invention.

FIG. 34 is a fragmentary cross-section showing top and bottom portions of the cell of FIG. 33, further enlarged.

Figure 1:
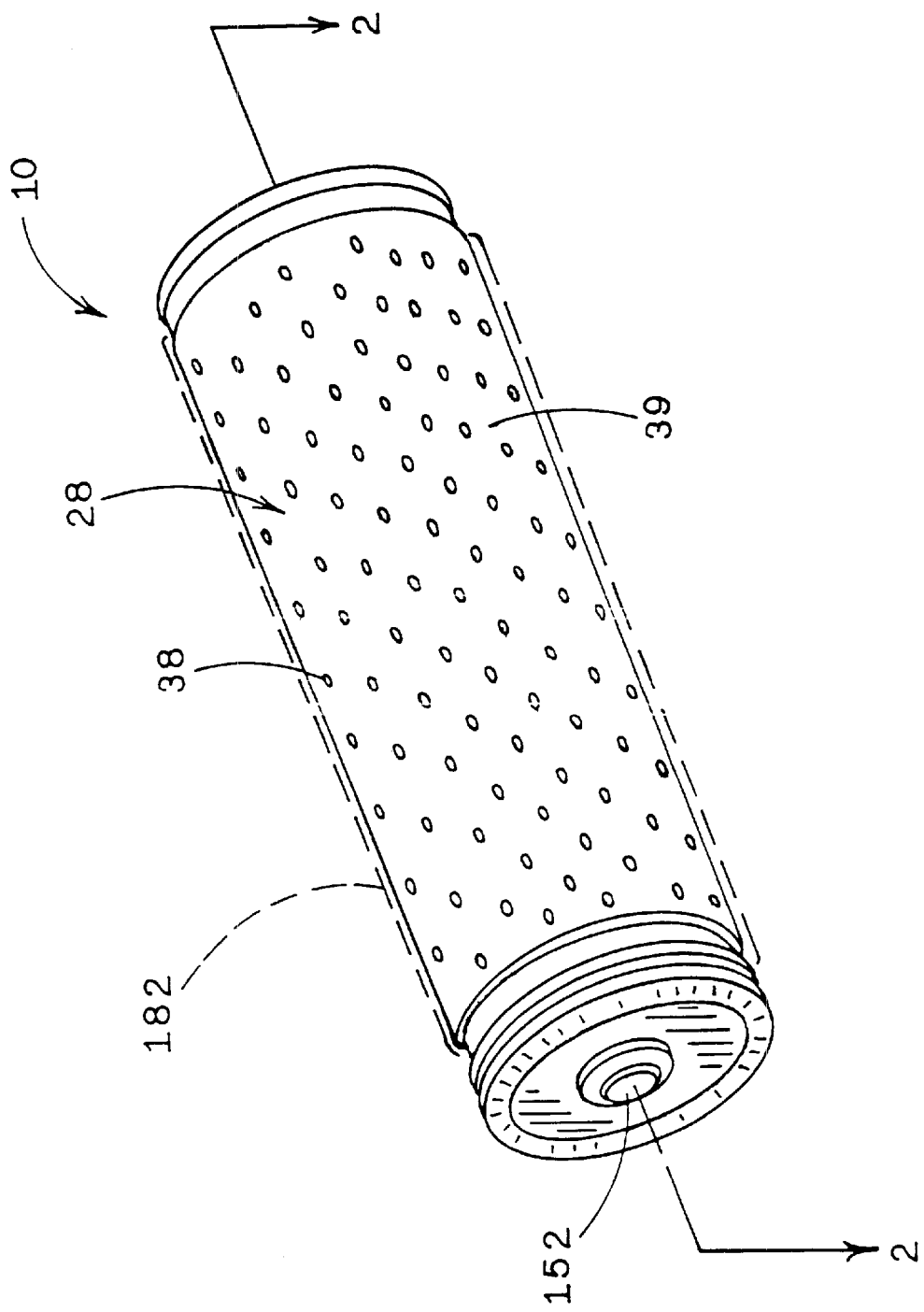
FIG. 1 shows a pictorial view of an elongate cylindrical metal-air cell of the invention.

The invention is not limited in its application to the details of construction or the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 2:
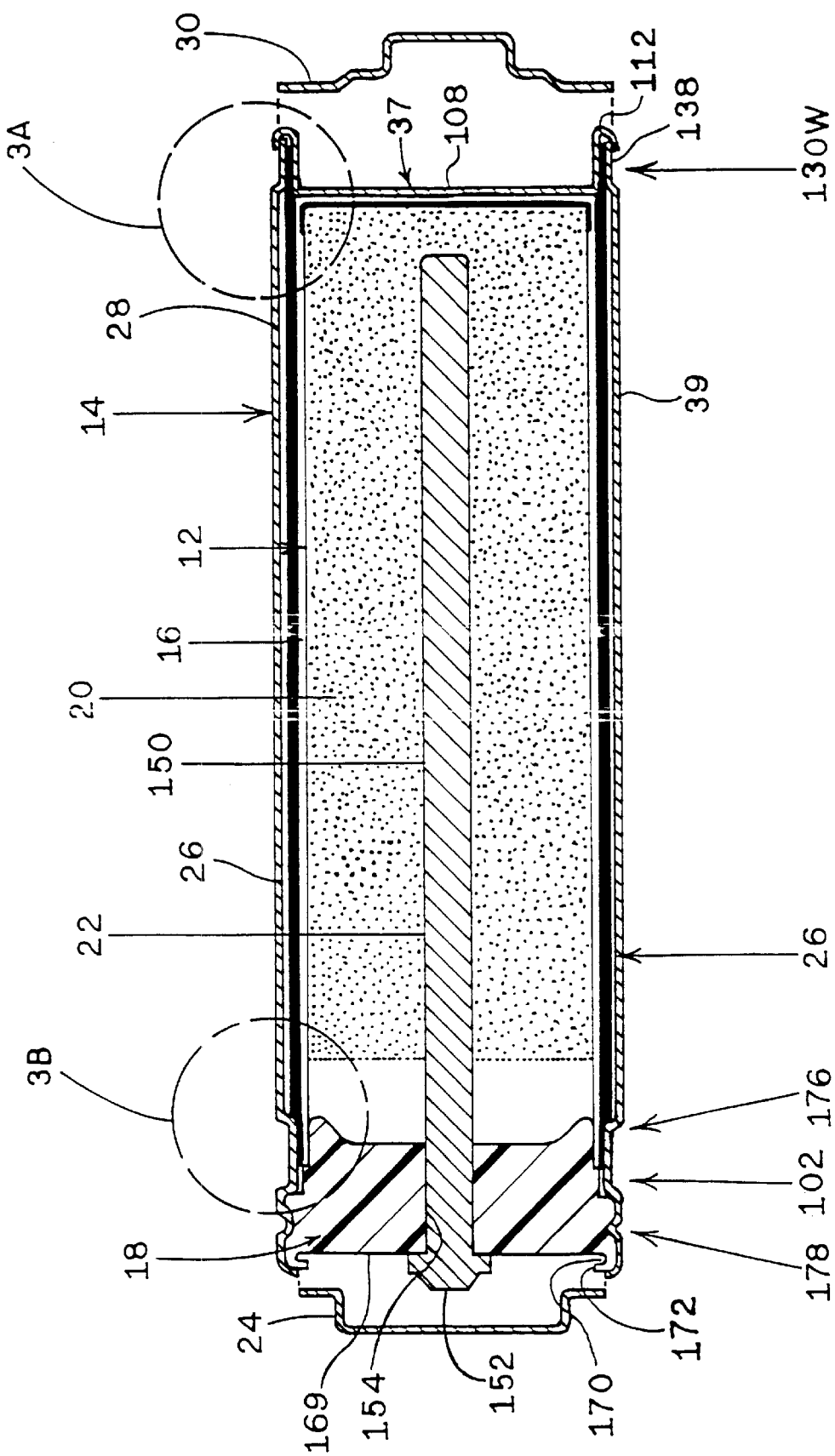
FIG. 2 shows a cross-section of the cell, taken at 2—2 of FIG. 1.
Figure 3A:
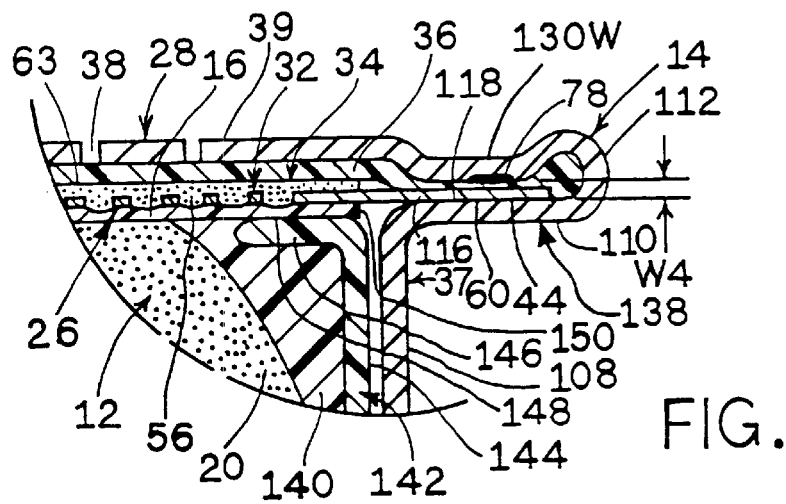
FIG. 3A is an enlarged representative cross-section of the side wall and bottom wall structures at the bottom of the cell, including the air cathode, and is taken at dashed circle 3A in FIG. 2.
Figure 3B:
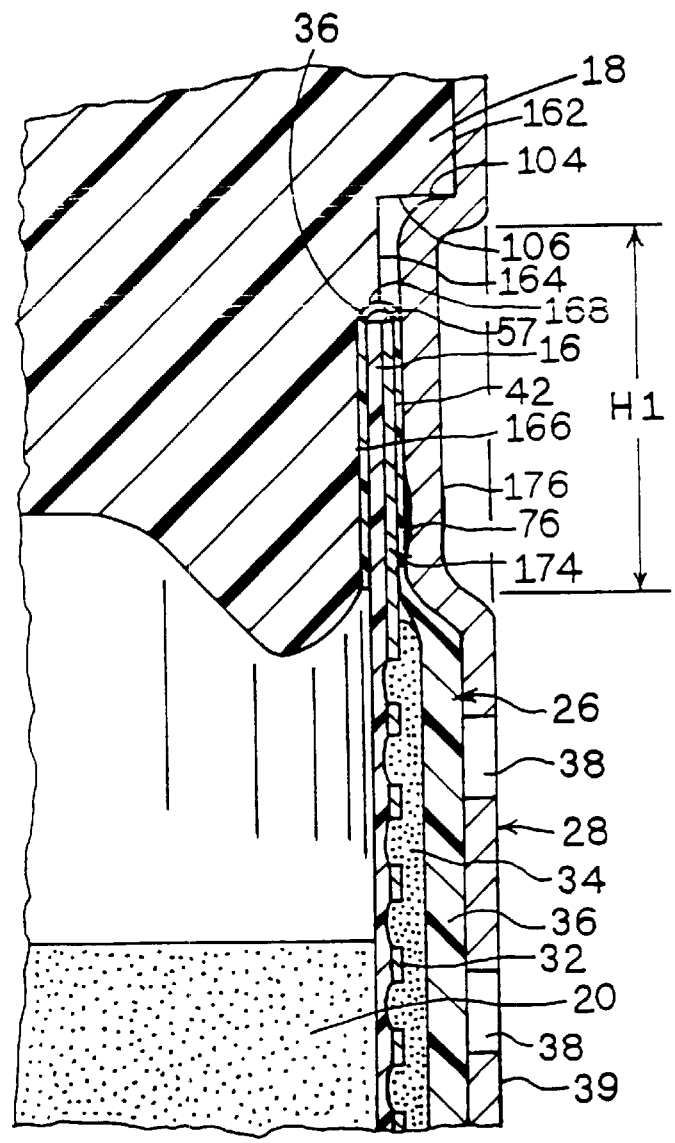
FIG. 3B is an enlarged representative cross-section of the side wall and grommet and other seal structures at and adjacent the top of the cell, also showing the air cathode, and is taken at dashed circle 3B in FIG. 2.

An elongate cylindrical metal-air cell 10 is shown in pictorial view in FIG. 1. A longitudinal cross-section of the cell of FIG. 1 is shown in FIG. 2. An enlarged portion of the cross-section of the cell of FIG. 2, at the bottom of the cell, is shown in FIG. 3A. An enlarged portion of the cross-section of the cell of FIG. 2, at the top of the cell, is shown in FIG. 3B.

The structure of cell 10 represents the result of applicant drawing on a combination of technologies including from, among other places, (i) 2-electrode cylindrical bobbin cell technology (e.g. zinc-manganese dioxide round cells), and (ii) zinc-air hearing aid cell technology (zinc-air button cells), and making novel combinations using such information, in addition to elements novel in and of themselves, in arriving at cell 10 as illustrated, as well as other embodiments of the invention.

As with zinc-air button cells, the active air cathode assembly in an elongate cell of the invention is quite thin, allowing for a large fraction of the cell volume to potentially be occupied by zinc anode material, thus providing for disposition of anode material in close proximity with the air cathode assembly adjacent the outer cylindrical sides of the elongate cell, as well as allowing for increased weight of anode material in the elongate cell. Greater anode weight potentially enables the cell to deliver about two to three times the discharge watt-hours of a standard 2-electrode alkaline zinc-manganese dioxide cell of the same size and configuration.

The dominant electrochemical reactions associated with operation of zinc-air cells, in general, are generally considered to be as follows.

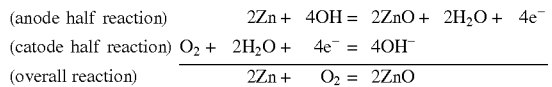

| (anode half reaction) | $2Zn + 4OH^- = 2ZnO + 2H_2O + 4e^-$ |
| (catode half reaction) | $O_2 + 2H_2O + 4e^- = 4OH^-$ |
| (overall reaction) | $2Zn + O_2 = 2ZnO$ |

Similar reaction mechanisms can be derived for electroactive reactions of other air depolarized cells.

However, whereas in air depolarized button cells the air cathode is a generally planar element of the cell along the bottom wall of the cell, air cathodes in elongate air depolarized cells of the invention are disposed along the elongate, generally arcuate, side walls of the cells, whereby typical such air cathodes are correspondingly arcuate in shape. While typical elongate cells of the invention are cylindrical, and thus have circular cross-sections, in the alternative, elongate cells of the invention need not be cylindrical. Rather, such cells can have a variety of cross-sectional shapes, including any closed-perimeter cross-section. The cross-section can thus be ovoid, square, rectangular, or any other polygonal cross-section, arcuate cross-section, or combination of straight-line and arcuate cross-section, it is preferred, however, that the cross-section define a perimeter devoid of acute interior angles, such that the thickness of electroactive anode material between the cathode assembly and the anode current collector is relatively uniform about the perimeter of the cell.

Still referring to FIGS. 1, 2, 3A, and 3B, cell 10 has an anode 12, a cathode 14, a separator 16, and a grommet 18. In general, anode 12 includes anode mix 20, anode current collector 22, and an optional anode cap 24. Cathode 14 includes a cylindrical air cathode assembly 26, a cathode can 28, and an optional cathode cap 30. Cylindrical air cathode assembly 26 includes a cathode current collector 32, an active carbon catalyst 34, and an air diffusion member 36. Cathode can 28 has a bottom wall 37 and a side wall 39. A multiplicity of air ports 38, extend through, and are generally evenly distributed about, side wall 39, for entry of air, and thus cathodic oxygen, into the cell at the cathode.

Separator 16 serves as a barrier to flow of electricity between anode 12 and cathode 14, while accommodating flow of electrolyte between the anode and the cathode.

Grommet 18 assists in blocking flow of electrolyte and electroactive anode material past the top edge of air cathode assembly 26, and out the top of the cell. Further, grommet 18 electrically insulates anode mix 20 from cathode current collector 32. Still further, grommet 18 separates, and electrically insulates, anode current collector 22 from the cathode, especially cathode can 28.

Separator 16 and grommet 18 thus, in combination, prevent internal shorting of the cell, namely prevent direct flow of electricity between the anode and cathode internally (shorting) in the cell without the application of such electricity to a circuit outside the cell.

Both the anode and the cathode are impregnated with suitable alkaline electrolyte based on, for example, aqueous potassium hydroxide liquid.

The Cathode

Cathode 14 includes cylindrical air cathode assembly 26, cathode can 28, and optional cathode cap 30. Cylindrical air cathode assembly 26 includes cathode current collector 32, active carbon catalyst 34, and air diffusion member 36. Cathode can 28 includes bottom wall 37, side wall 39, and air ports 38 (FIG. 3A) through side wall 39, for entry of air, and thus cathodic oxygen, into the cell.

The Air Cathode Assembly

Air cathode assembly 26 is structured with active carbon catalyst 34 generally interposed between current collector 32 and air diffusion member 36. In the cylindrical environment, in the preferred embodiments, the cathode current collector and the active carbon catalyst, in combination, generally form the inside surface of the cathode assembly, and the air diffusion member generally forms the outside surface of the cathode assembly. The invention does contemplate embodiments wherein active carbon catalyst fully encloses the inside surface of the cathode current collector opposite the reaction surface area such that the inside surface of the cathode assembly is defined generally overall by an inner surface of the active carbon catalyst.

The Cathode Current Collector

Figures 4, 5:
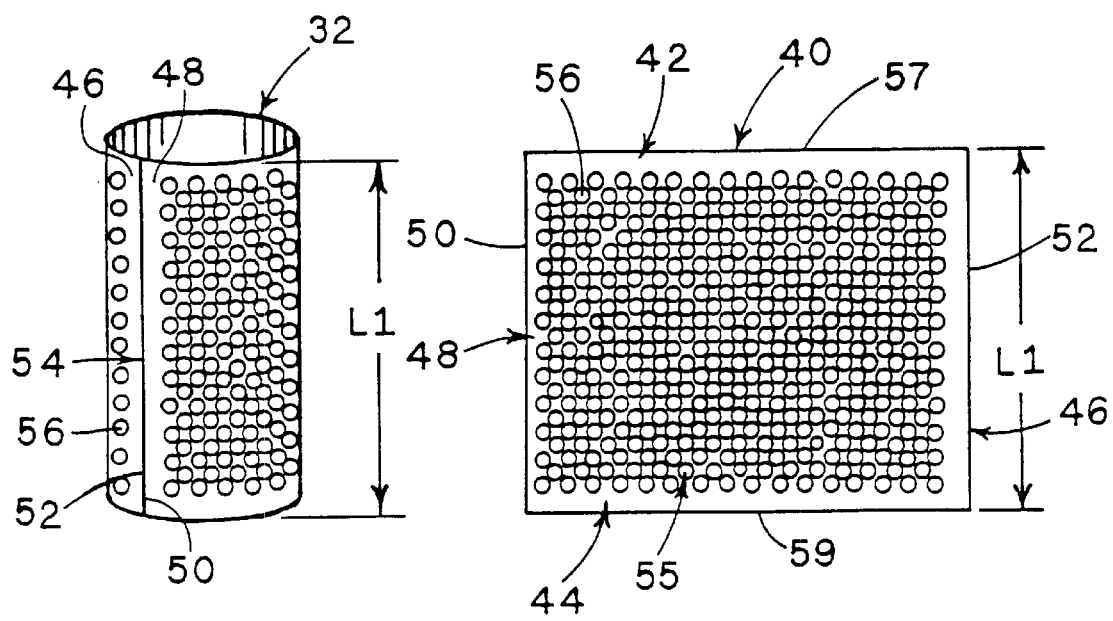
FIG. 4 shows a representative cathode current collector used in air cathode assemblies of the invention.
FIG. 5 shows a representative perforated metal sheet useful for making the cathode current collector of FIG. 4.

As illustrated in FIG. 4, cathode current collector 32 has a cylindrical configuration and collects and transports electric current at and through, to and from, the cathode. The cathode current collector generally provides that structural material which contributes most to defining the overall length, and the inner diameter, of the air cathode. In the embodiment illustrated in FIG. 4, the current collector further provides substantially all the structural hoop strength present in the air cathode.

A preferred embodiment of cathode current collector 32 for use in an elongate cylindrical cell is illustrated in FIG. 4 and is generally made from a square or otherwise rectangular, perforated metal sheet 40, illustrated in FIG. 5. Metal sheet 40 has top and bottom edge portions 42, 44, respectively, and right and left edge portions 46, 48, respectively. As illustrated in FIGS. 4 and 5, top and bottom edge portions 42, 44, and right and left edge portions 46, 48, are preferably not perforated like the remainder of sheet 40.

While top and bottom edge portions 42, 44, and right and left edge portions 46, 48, can have some perforations in some embodiments, the high level of perforations extant over the remaining majority of sheet 40 is not preferred in especially right and left edge portions 46, 48.

For a "AA" size elongate cell, top and bottom edge portions 42, 44 typically have widths "W1" of about 0.1 inch. See FIG. 6. As discussed hereinafter, bottom edge portion 44 provides a smooth surface for facilitating electrical contact between current collector 32 and the cathode can. Top edge portion 42 provides a smooth surface for assisting in creating a seal against leakage of liquid electrolyte past, the cathode assembly and grommet 18.

Current collector 32 can be fabricated from a metal sheen as illustrated in FIG. 5 into a cylindrical configuration such as that shown in FIG. 4 by, for example, welding, such as laser butt welding (FIGS. 4A, 4B), respective left and right distal edges 50, 52 of edge portions 46, 48 to each other to create a joint 54 along the length of the cylindrically configured sheet 40, thereby to fixedly secure the cylindrical configuration.

While joint 54 can be formed by e.g. welding overlapped elements of the structure of edge portions 46, 48, the resulting double thickness of sheet material 40 at the resulting joint 54 is not preferred. Accordingly, joint 54 is preferably fabricated without layer-on-layer overlapping of the structures of edge portions 46, 48 one on the other. Rather, distal edges 50, 52 are preferably butted against each other in fabrication of the butt welded embodiments shown in e.g. FIGS. 4A, 4B.

Figure 4A:
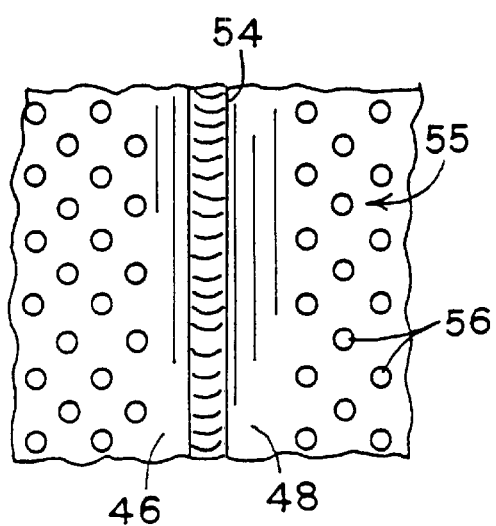
FIGS. 4A, 4B, 4C illustrative respectively a continuous-weld butt joint, a spot weld butt joint, and a joint formed by welding interdigitated wires or fingers.
Figure 4B:
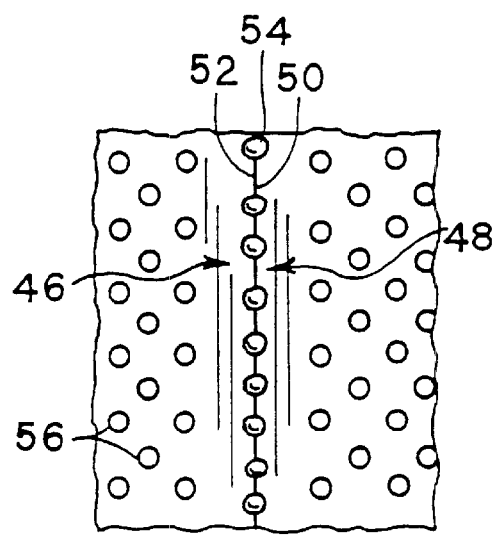

The illustrated e.g. butt welding thus creates longitudinal joint 54, which can be a series of spot welds (FIG. 4B), or can be a continuous weld (FIG. 4A). Any other operable method of joining edges 50, 52 which thereby effectively converts metal sheet 40 into the cylindrical, or otherwise closed, configuration seen in FIG. 4, is acceptable. The recited exemplary and preferred laser butt welding of metal sheet 40 can be done by Laser Services, Inc., Westford, Mass., USA.

Right and left edge portions 46, 48 typically have widths "W2" of about 0.03 inch, to provide desirable quantities of material from which butt weld 54 can be formed.

Metal sheet 40 includes perforations 56 (FIGS. 5, 6, 7) extending through the thickness "T1" (FIG. 7) of metal sheet 40, from outer surface 58 to inner surface 60. A typical such metal sheet, suitable for fabricating cylindrical current collector 32 for a "AA" size elongate cell, contains about 4000 of such perforations 56 as illustrated by Table 1. The number of perforations depends on the sizes and configurations of the perforations, and the widths "W3" of webs 62 between the respective perforations. Perforations 56 are preferably regular hexagons, measuring about 0.02 inch between opposing straight sides thereof. In the embodiments illustrated in FIGS. 4, 5, and 6, the widths "W3" of webs 62 are preferably also about 0.02 inch. Accordingly, in the embodiments illustrated in FIGS. 4, 5, and 6, perforations 56 represent about 65% of the overall surface area of metal sheet 40. In general, for a cell intended for use to deliver a high rate of electrical discharge, perforations 56 should usually represent about 45% to about 70% of the overall surface area of that portion of metal sheet 40 which is perforated.

Figure 6:
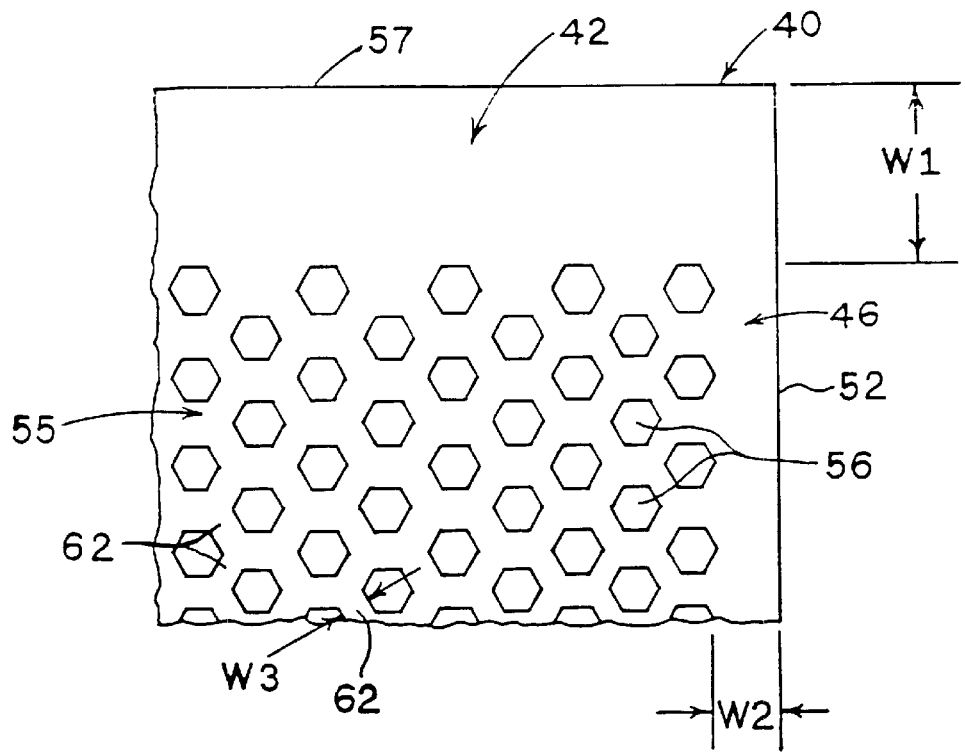
FIG. 6 shows an enlarged portion of a corner of the metal sheet of FIG. 5. illustrating hexagonal perforations.
Figure 8:
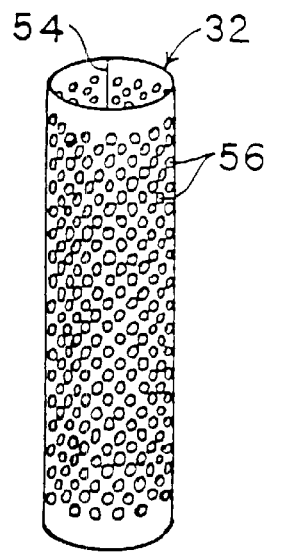
FIG. 8 is a representative pictorial view of an elongate cylindrical cathode current collector having circular perforations.
Figure 9:
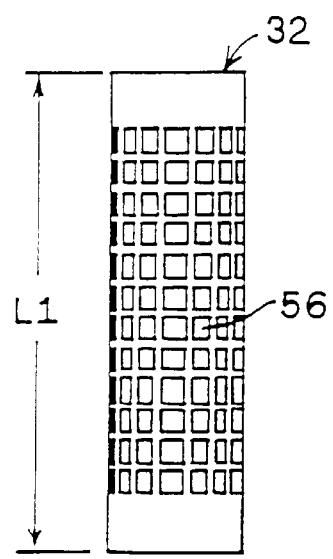
FIG. 9 is a representative pictorial view of an elongate cylindrical cathode current collector having square perforations.

While perforations 56 have been illustrated as regular hexagons, a variety of other shapes are acceptable. There can be mentioned, for example, circles, squares, and e.g. equilateral triangles. Circular perforations 56 are illustrated in current collector 32 shown in FIG. 8. Square perforations 56 are illustrated in current collector 32 shown in FIG. 9. However, because of advantageous resulting strength of the so-fabricated cathode current collector, and effective securement of the active cathode catalyst to current collectors having hexagonal perforation, regular hexagonal perforations 56, as illustrated in FIGS. 5 and 6, are preferred. After hexagons, the other shapes which create corners are preferred because the corners improve securement of the active cathode catalyst to the current collector, as compared to, for example, circles, ellipses, and like shapes which are devoid of corner structure where two side edges of the corresponding opening come together.

Table 1 illustrates typical parameters of various perforations such as those shown in FIGS. 5 and 6 for a cathode current collector sized for a "AA" size elongate cell. The column labeled "Open %" refers to that portion of the metal sheet which is perforated, irrespective of edge portions 42, 44, 46, 48.

TABLE 1

| Perf Type | Perforation Dimensions, inch | | Spacing Between Prefs | | Perfs Per Cell | Open Area In$^2$ | Circ Inch* | Open % |
|---|---|---|---|---|---|---|---|---|
| | w | h | horiz | vert | | | | |
| Hex | .020 | .023 | .025 | .021 | 4286 | 1.63 | 296 | 65% |
| Circle | .021 | .021 | .025 | .021 | 4276 | 1.48 | 282 | 59% |
| Square | .020 | .020 | .025 | .025 | 3600 | 1.44 | 288 | 57% |
| Triangle | .023 | .020 | .025 | .017 | 5294 | 1.22 | 366 | 49% |

* = Running circumference, in inches, namely the sum of the circumferences of all the perforations.

In general, the reaction sites where the cathode half reaction takes place are believed to be located toward the outer surface 63 of active carbon catalyst 34. Since electrolyte flows through perforations 56 to reach the reaction sites, the fraction of the projected cross-section of current collector 32 which is represented by the perforations 56 has an influence on the reaction rate. The greater the fraction of the surface area of current collector 32 represented by the perforations, the greater the potential capacity of the cathode assembly for movement of electrolyte through the perforations; and thus the greater the potential reaction rate.

Where a lesser fraction of the surface area of the current collector is represented by the perforations, the potential reaction rate is correspondingly less. Thus, assuming that other parameters are not otherwise controlling, the projected area of the perforations can positively, or negatively, affect the reaction rate. Where the perforations represent a significant limiting factor in the reaction rate, the open fraction of the currents collector surface area thus represents the ability to design the current collector as the control mechanism for determining the overall limiting reaction rate of the cell, and thus the limiting current of the cell. Accordingly, where it is desired to increase, or decrease, the limiting current of the cell, the number and/or sizes of perforations 56 can be specified accordingly.

Where the sizes of perforations 56 are desirably reduced, but limiting current is to be maintained or increased, the number of perforations is accordingly increased. Thus, the number and sizes or perforations 56 depends in general on the performance parameters desired for cell 10, in combination with the physical strength required of the current collector. The inventors thus contemplate a wide range of sizes for perforations 56, and a wide range of numbers of perforations, for a given cell size, which can be used for cathode current collectors 32 of the invention. Accordingly, in a size "AA" elongate cell, the number of perforations 56 can be as low as about 200 where a high rate of electromotive force production is not necessary.

If cathode current collector 32 has less than about 200 perforations, and maintains the perforations having the suggested range of fractions of the overall surface area of the current collector, the physical strength of the current collector and/or securement of the active carbon catalyst to the current collector may be compromised.

In general, increasing the number of perforations does not appear to have any negative affect on cell performance. However, as the number of perforations is increased over a given metal sheet surface area, the sizes of the perforations necessarily decrease. Further, as the target size of the perforation is reduced, the ability to fabricate perforations to precisely uniform and controllable sizes, configurations, and spacing, decreases unless additional fabrication controls are employed.

Whatever the target number of perforations and the target size of the perforations, it is preferred that all perforations on a given current collector be generally the same size, and that the perforations be generally uniformly distributed over the perforated region 55 of the current collector. The perforated region 55 is that portion bounded by the imperforate top, bottom, left, and right portions, as appropriate. "Imperforate" border regions include any border region or portion of a border region which is perforated to an extent significantly less than the extent of perforation of the central region, whereas "truly imperforate" refers to e.g. border regions which are fully without perforations. It is within the scope of the invention that any one current collector have any one, any combination, or all, of perforated borders, imperforate borders, and truly imperforate borders.

In particular, the smaller the target size for the perforations, the greater the difficulty, and cost, of repeatedly making the perforations to specific size, configuration, spacing, and/or location. Thus, as the target size of the perforations is reduced, one either sacrifices precision and repeatability of size, configuration, spacing, and/or location of the perforations, or tolerates increased cost. However, where suitable manufacturing controls are in place for fabricating perforations 56, and the cost can be tolerated, the number of such perforations in a cathode current collector sized for a "AA" size elongate cell, can be any number up to and including 10,000 perforations, or more. However, for a "AA" size cell, the number of perforations is preferred to be about 500 to about 6000 perforations, with a normal average number of perforations being about 4000 perforations.

Accordingly, the actual number of perforations used in a particular implementation of the invention results from balancing the benefit, if any, in the particular use for which the cells are planned, of a larger number of smaller perforations against the cost of making such larger number of smaller perforations.

The acceptable range of the number and sizes of perforations, of course, depends on the size of the overall surface area of metal sheet 40 being perforated. Thus, where a larger cell is being fabricated, and a respectively larger overall surface area of metal sheet is being perforated as the current collector, the upper end of the range of the acceptable number of perforations is increased accordingly. Where a smaller cell is being fabricates, and a respectively smaller overall area is being perforated as the current collector, the lower end of the range of the acceptable number of perforations is reduced accordingly.

In the preferred embodiment, perforations 56 as in FIGS. 5 and 6 are preferably fabricated by placing a suitable photo mask or metal sheet 40. The unmasked areas of the sheet are then acid etched to thereby fabricate the perforations.

In an alternate construction, current collector 32 can be made of woven wires rather than a perforated metal sheet.

Preferred screen size corresponds to greater size wire and openings than 200 standard mesh size. Mesh sizes of about 16 to about 100 tend to work well. Mesh sizes 24, 37, and 40 work particularly well. Similar sizes for perforations 56 and webs 62 are contemplated in the embodiments made with etched metal sheet.

In some embodiments, metal sheet 40 is perforated right up to and including right and left distal edges 50, 52, while edge portions 42, 44 are retained imperforate, whereby edge portions 46, 48 are obviated. Further, woven wire embodiments may not include imperforate edge portions 46, 48. In such embodiments, butt welding of distal edges 50, 52 to create joint 54 is somewhat more difficult because of the void spaces between webs 62 at distal edges 50, 52, or between adjacent wires in woven wire embodiments. In place of butt welding, cooperating webs 62, or corresponding wires 62, can be interdigitated, and edges of such interdigitated webs or wires can be welded together as a third example of methods of forming joint 54. Given the greater precision required for joinder of edges 50, 52, where perforations 56 extend to edges 50, 52, fabrication considerations suggest that such embodiments are not preferred.

In still other embodiments, metal sheet is perforated right up to top and bottom distal edges 57, 59, while edge portions 46, 48 are or are not retained imperforate, whereby edge portions 42, 44 are obviated. In such embodiments, use of the upper edge area of cathode current collector 32 in forming a seal against electrolyte leakage may be somewhat degraded such that there may be a need to employ other provisions for leakage control. Similarly, use of the lower edge area of the cathode current collector as a contact surface for making electrical contact with the cathode can may be somewhat less robust than imperforate embodiments, such that other provisions for electrical contact may be employed. However, such spaced contacts between the cathode current collector and the cathode can or other cathode terminal is routinely used with satisfactory result, in air depolarized button cells. Nonetheless, considerations of performance potential suggest that perforations up to top and bottom distal edges 57, 59 are not preferred.

Metal sheet 40 can be made from any material which provides suitable conductivity for collecting and transmitting the electrical current flowing through the cathode, while tolerating the alkaline electrolyte environment. Typical material for metal sheet 40 for embodiments illustrated in FIGS. 1, 2, 3A, 3B, 5, 6, and 7, for a size "AA" elongate cell, is nickel sheet 0.005 inch thick. The range of thicknesses of the cathode current collector for a size "AA" cell is from about 0.003 inch to about 0.010 inch. Thinner materials outside the recited range may be difficult to fabricate, and may lack sufficient structural strength. Thicker materials may be too rigid to fabriocate into annular shape. In addition, such thicker materials do use greater amounts of raw materials, and do occupy a greater fraction of the limited space available inside the cell.

The full complement of sizes within the recited range can be utilized in the invention, for example and without limitation, 0.004 inch, 0.006 inch, 0.007 inch, or 0.008 inch. Thinner material is preferred where emphasis is placed on minimizing the thickness of non-reactive materials, thus to provide greater internal volume inside the cell for packing in a greater quantity of electroactive anode material or thus to control weight of the cell. Thicker material is preferred where emphasis is placed on physical strength and/or rigidity of the air cathode assembly.

Hoop strength of annular current collector 32 as in FIG. 4 is related to the mathematical square of the thickness of sheet metal 40. Thus, the strength of a current collector 0.007 inch thick has approximately two times the hoop strength (7×7=49) of a corresponding current collector which is 0.005 inch thick (5×5=25). Overall, the ratio of the strength of the 0.007 inch thick current collector to the strength of the 0.005 inch thick current collector is thus 49/25=1.96/1.

Figure 4C:
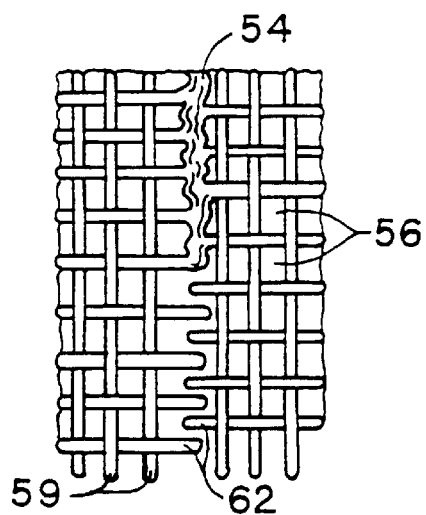
Figure 5D:
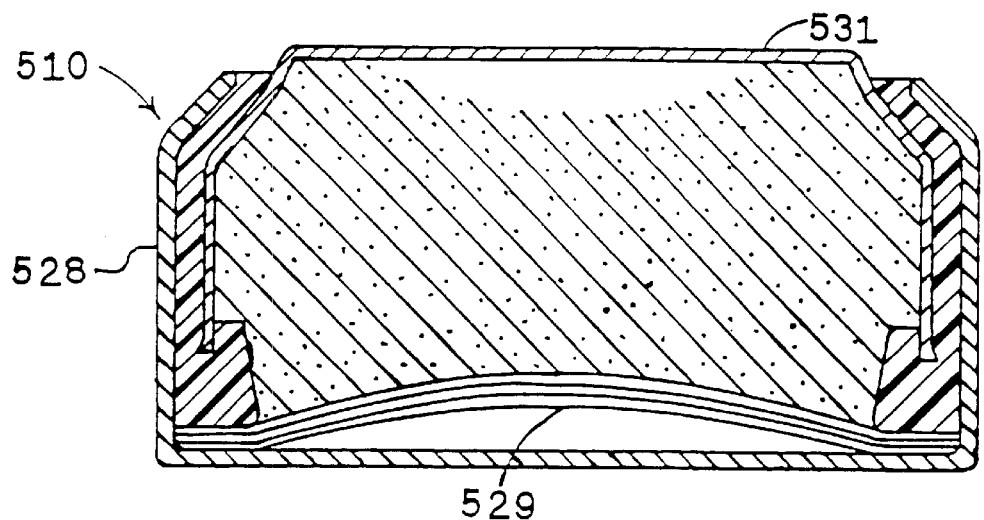
FIG. 5D shows a representative cross-section of an air depolarized button cell employing a cathode current collector of FIGS. 5A and 5B.

In other embodiments, metal sheet 40 is replaced with e.g. cross-bonded woven wire of a size similar to metal sheet 40. In such structure, the wires generally take the place of webs 62. The diameter of such woven wire is generally about 0.003 inch to about 0.010 inch thick and includes the full complement of sizes within the recited range, as recited herein for the sheet metal thickness. Current collectors can be fabricated from such wire by butt welding, as in FIG. 4, adjoining surfaces of respective cooperating wires in the weave. In place of butt welding, cooperating wires can be interdigitated as discussed herein above, and cooperating edges of such interdigitated wires welded together, as shown in FIG. 4C. The bottom edge of FIG. 4C illustrates perforations 56 extending to the distal edge 59 of the bottom of the current collector. FIG. 4C further illustrates the wires (e.g. 62) interdigitated at the lower portion of the FIGURE, and the interdigitated wires welded to each other to form joint 54 at the upper portion of the FIGURE.

Still another embodiment of the cathode current collector is represented by an article woven or otherwise fabricated as a seamless annulus, e.g. cylinder. Where a seamless annulus is woven, top and bottom edge portions 42, 44, and right and left edge regions 46, 48, are obviated, although imperforate edge portion elements representative of imperforate edge portions 42, 44 can be secured to the woven article as by welding at or adjacent upper and lower distal edges of the seamless annular current collector.

Regarding other materials which can be used in place of the nickel sheet, there can be mentioned nickel plated steel, nickel plated stainless steel such as 305 stainless steel, nickel plated iron, and like materials, either alone or as composite compositions or platings, such other like materials being, for example, noble metals such as gold, silver, platinum, palladium, irridium, rhodium, and the like, which can tolerate the alkaline environment inside the cell without excessive local e.g. gas generating reactions. Where a plating is used, the substrate is preferably plated after perforations 56 are fabricated.

FIGS. 5A, 5B, 5C, and 5D represent a further implementation of the concept of providing a cathode current collector 32A in an air depolarized cell 510, wherein the cathode current collector has an imperforate border region 61A, the outer edge 67A of imperforate border region 61A being an elongate electrical contact surface providing electrical contact, directly or indirectly, with cathode can 528 or other cathode conductor or terminal. In the embodiments represented by FIGS. 5A, 5B, 5C, and 5D, current collector 32A represents a flat sheet configuration such as the flat disc-like configuration used for cathode current collectors in commercially available air depolarized button cells.

As seen in FIG. 5A, current collector 32A has a generally perforated central region 55A, and an imperforate border region 61A extending entirely about and thus generally encompassing or surrounding the central region. While any of the above illustrated or suggested configurations can be employed for the perforations, perforations 56A further illustrate perforations having square configurations.

Optional slots 65A extend inwardly from cuter edge 67A of border region 61A, generally toward the central region, and may extend the full distance to the central region. Slots 65A provide structure effective to enhance predictability, repeatability, and thus overall control of doming of the cathode assembly, the doming being illustrated at 529 in FIG. 5D, in an air depolarized button cell. Namely, the number, and the shapes, such as depths and widths, of slots 55 are related to the degree of doming of the air cathode assembly.

A wide range of shapes are contemplated for slots 65A, including without limitation the illustrated rectangles, as well as squares, circles, semi-circles, triangles, slits, dart-shaped openings, irregular openings, and the like. While the illustrated rectangular slot openings extend generally perpendicular to outer edges 67A, other angles and opening shapes can be used so long as the respective openings extend generally toward central region 55A. Accordingly, in general, and with allowance for variations according to the shapes of slots 55A, the greater the fraction of the surface area which is defined by width "W5" and which is also occupied by slots 65A, the greater is the control over doming.

The invention contemplates a variety of widths "W5" of border region 61A. Where a seal or grommet 518 is used between an anode can 531 and cathode can 528 in a button cell, as illustrated generally in FIG. 5D, such seal or grommet overlies an outer peripheral portion of the air cathode assembly, thereby blocking off that outer peripheral portion of the air cathode assembly from access to anode material at the separator. Such blocking off of the outer peripheral portion of the air cathode assembly significantly reduces usefulness of that outer peripheral portion in the cathode half reaction, such that the remaining inner portion of the air cathode assembly, namely that portion inwardly of and not blocked off by, the seal or grommet, is sometimes referred to as the reaction surface area or similar nomenclature.

Returning again to FIG. 5A, the width "W5" of border region 61A can generally correspond with the entire outer peripheral portion of the air cathode assembly, which will face the seal or grommet, without negatively affecting or otherwise controlling the useful size of the reaction surface area of the air cathode assembly. And the wider the border region, the more effective is the border region in assisting in controlling doming of the cathode assembly, and in assisting in controlling leakage of electrolyte around the outer edge of the cathode assembly, as well as providing improved electrical contact with the cathode can, as compared to a current collector wherein the border region and central region are similarly perforated.

While current collector 32A is preferably configured as a single sheet having suitable perforations, slots, etc., a variety of other structures and configurations are contemplated, along with corresponding methods of fabricating such other structures and configurations. For example, the current collector can be made from an imperforate band affixed, as by welding, to a woven wire central region.

In current collector 32A, e.g. sheet material structure used in central region 55A, wire structure used in central region 55A, or sheet or wire used in border region 61A, can have thicknesses of about 0.003 inch to about 0.010 inch, with thicknesses of about 0.004 to about 0.008 inch being preferred. Most preferred material thicknesses are about 0.005 inch to about 0.007 inch, including about 0.006 inch.

The range of materials which can be used to fabricate current collector 32A includes the same compositions, and the same structures, as are recited above for current collector 32. Any known method for making perforations in metal sheet can be used to make perforations 56A, including the use of woven wire to fabricate the perforated central region, or the above noted combination of photo mask and acid etching of metal sheet. Thus, "perforated," "imperforate," and like expressions include, without limitation, both perforated metal sheet material, woven wire articles, and articles made of woven web material. Web material is an elongate wire-like or strap-like structure having width greater than top-to-bottom thickness.

Perforations 56A, and the corresponding webs, can have any of the shapes and configurations described above for perforations 56 such as square, circular, hexagonal, and the like.

FIG. 5C illustrates generally a process for fabricating current collectors 32A. As suggested in FIG. 5C, cooperating registration holes 533 are fabricated along opposing edges 535, 537 of a suitable metal strip 539 having thickness and composition consistent with the above recited thicknesses and compositions. Suitable photo mask and acid etching are then employed, in cooperation with registration holes 533, thereby to fabricate multiple spaced circular arrays 541 of perforations 56A representing respective central portions 55A of precursors of current collectors 32A. The respective arrays 541 are subsequently punched from metal strip 539, along with a corresponding border region about each array, to thus fabricate a corresponding number of cathode current collectors 32A. As an array is punched out of strip 539, the correspondingly punched border region becomes region 61A in the respective current collector 32A.

An advantage of the border region 61A, as compared to a current collector made entirely of woven wire or the like, is that the entire outer edge 67A of the border region is available for making electrical contact with the cathode can whereas only ends of the respective wires are so available in a current collector made entirely from wire, for making electrical contact with the cathode can. In addition, the border region participates in the formation of an effective seal against leakage of electrolyte out past the grommet and thence out of the cell.

The Active Carbon Catalyst

Active carbon catalyst 34 is generally supported on current collector 32. The active carbon catalyst provides reaction sites where oxygen from the air reacts with water from the electrolyte, e.g. according to the above cathode half reaction, to generate the hydroxyl ions which are later used in the anode to release electrons, e.g. according to the anode half reaction. Carbon particles in the active carbon catalyst thus provide solid reaction sites for the air/liquid interface where aqueous liquid and gaseous oxygen come together and effect the electroactive cathode half reaction.

The carbon catalyst cooperates with the current collector in collecting and/or conducting current within the cathode in support of the cathode half reaction.

Figure 7:
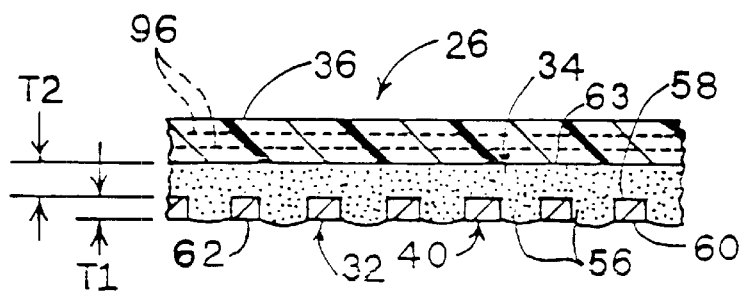
FIG. 7 is an enlarged representative cross-section of the air cathode illustrated in FIG. 3A.
Figure 10:
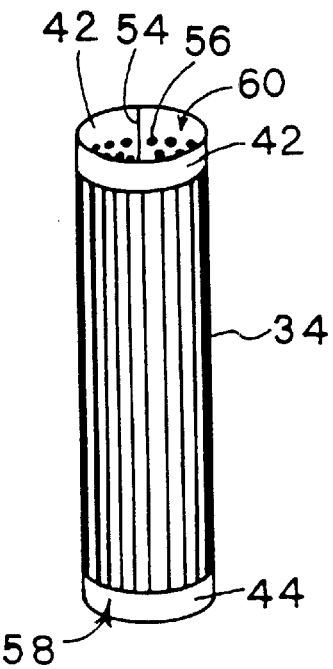
FIG. 10 is a representative pictorial view of a cylindrical cathode current collector of the invention, and active carbon catalyst secured to the current collector.

In order to limit internal resistance in the cathode, during the process of joining carbon catalyst to the current collector, the carbon catalyst is brought into intimate contact with current collector 32, including and especially at perforations 56. Referring to FIGS. 3A, 7 and 10, carbon catalyst 34 preferably extends through perforations 56 and extends outwardly of the projections of perforations 56 at and adjacent inner surface 60 of current collector 32. Thus, the carbon catalyst is generally intimately interlocked with current collector 32, through perforations 56, about the perimeter edges of the respective perforations, at both outer and inner surfaces 58, 60 of the current collector.

Referring to FIG. 10, upon completion of assembly of the carbon catalyst to the cathode current collector, carbon catalyst 34 preferably covers the entirety of that portion of cylindrical outer surface 58 of the current collector which lies between top edge portion 42 and bottom edge portion 44.

Carbon catalyst 34 is a combination of carbon particles, a binder, and processed potassium permanganate. During processing of the potassium permanganate in creating carbon catalyst 34, the carbon reduces the manganese to valence state +2 (hereinafter "manganese (II)"). The combination of valence state +2 manganese, with suitably activated carbon, acts successfully as catalyst for reduction of oxygen in air cathodes.

As a result of in situ reactions, catalytically active manganese (II) forms in the matrix of the active carbon catalyst.

Carbon catalyst 34 can be fabricated, and mounted on current collector 32 as follows. The carbon used in fabricating catalyst 34 is represented by carbon particles having surface area greater than 50 square meters per gram ($m^2/g$) preferably greater than 150 $m^2/g$, more preferably greater than 250 $m^2/g$, still more preferably between about 250 $m^2/g$ and 1500 $m^2/g$ yet more preferably between about 700 $m^2/g$ and 1400 $m^2/g$, further more preferably between about 900 $m^2/g$ and 1300 $m^2/g$, and most preferably between about 1000 $m^2/g$ and 1150 $m^2/g$.

In a Preferred embodiment, carbon of the present invention has the following characteristics; surface area between 1000 $m^2/g$ and 1150 $m^2/g$ apparent density of about 0.47 g/cc to about 0.55 g/cc, preferably about 0.51 g/cc; real density of about 1.7 g/cc to about 2.5 g/cc. preferably about 2.1 g/cc; pore volume of about 0.80 to about 1.0 g/cc, preferably about 0.90 g/cc; specific heat at 100 degrees C. of about 0.20 to about 0.30, preferably about 0.25; and about 65% to 75% of such material will pass through a wet −325 US Standard mesh screen wherein the nominal opening size is 0.0017 inch (0.045 mm). Such preferred carbon is available as PWA activated carbon from Activated Carbon Division of Calgon Corporation, Pittsburgh, Pa.

Generally, a range of carbon particle sizes is acceptable for processing of the material required in fabricating the active carbon catalyst. Particle size can be measured using a laser light scattering technique such as, for example, that provided by using a Model 7991 MICROTRAK particle-size analyzer manufactured by Leeds & Northrup.

Typical particle sizes of particles of the preferred PWA carbon are given numerically in Table 2.

TABLE 2

| Particle Size of PWA Activated Carbon Particles | |
|---|---|
| Diameter, Microns | Volumetric Percent |
| 125–176 | -0- |
| 88–125 | 11.8 |
| 62–88 | 7.1 |
| 44–62 | 9.7 |
| 31–44 | 17.1 |
| 22–31 | 12.4 |
| 16–22 | 7.4 |
| 11–16 | 7.3 |
| 7.8–11 | 10.0 |
| 5.5–7.8 | 5.1 |
| 3.9–5.5 | 5.6 |
| 2.8–3.9 | 4.1 |
| 0.0–2.8 | 2.0 |

As illustrated in TABLE 2, PWA activated carbon particles have sizes ranging primarily between about 8 microns and about 125 microns, with about 71% by volume being small enough to pass through the 0.045 mm opening of a −325 mesh screen, about 65% by volume of the particle sizes being between 16 microns and 125 microns, about 40 by volume being between 22 microns and about 62 microns, and a small fraction of about 6% by volume being less than 4 microns.

In the embodiments contemplated for use in this invention, a degree of physical mechanical integrity is required of sheets of the active carbon material to enable the process of joining and securing the active carbon to the cathode current collector. To that end, polymeric halogenated hydrocarbon binder, or other suitable birder, is distributed substantially evenly throughout the mixture of carbon particles and manganese moiety. While choosing to not be bound by theory, applicants believe that in some embodiments, upon completion of the steps performed in fabricating the carbon composition into finished sheet form, the halogenated hydrocarbon binder forms a 3-dimensional web of interlocking fibers or fibrils of the binder material, thus imparting desired physical sheet integrity to the active carbon catalyst composition/mixture.

A preferred binder is polytetrafluoroethylene (PTFE). The optimum amount of PTFE is about 5% by weight of the finished active carbon catalyst product. Other binders known to bind carbon particles of the states size range, in fabricating electrodes, are acceptable.

More or less binder can be used, between about 3% by weight and about 10% by weight. Where less than about 3% binder is used, the binding effect may be unacceptably low, there greater than 10% binder is used, dielectric or electrical insulating properties of the binder can result in less desirable electrical performance of the electrode.

The following steps can be used to make the active carbon catalyst. 1000 milliliters of distilled water is placed in a non-reactive container. 19 grams of $KMnO_4$ (potassium permanganate) are added to the container. The mixture of $KMnO_4$ and water is mixed for ten minutes. 204 grams of PWA activated carbon having appropriate particle sizes set forth above are added slowly to the central mix vortex while mixing is continued. After ten minutes of further mixing, 51 grams of PTFE (TEFLON T-30 available from DuPont Company, Wilmington. Del.) is added slowly, uniformly, and without interruption to the mix vertex, and mixing is continued for yet another ten minutes at the speed required to maintain a vortex in the mix after the PTFE is added, so as to make a generally homogeneous mixture of the liquid and solid components and to fibrillate the PTFE.

The resulting powder mixture is then separated from the water by e.g. filtration through Whatman #1 or equivalent filter paper, and heated in an oven at about 100 degrees C., to about 140 degrees C., for 16 hours or until dry, to obtain a dry cake of the carbon, manganese moiety, and PTFE.

3 grams of Black Pearls 2000 carbon black, and optionally 5 grams of pre-densified cathode mix from previous manufacturing runs, are placed in a Model W10-B Littleford Lodige High Intensity Mixer along with the above-obtained dry cake of carbon, manganese moiety, and PTFE. The mixture is mixed at 2600 rpm at ambient temperature for 30 minutes, or until any and all agglomerates in the mixture are broken down, and the mixture becomes free flowing, thereby to make a free-flowing powder mixture 64.

Figure 11:
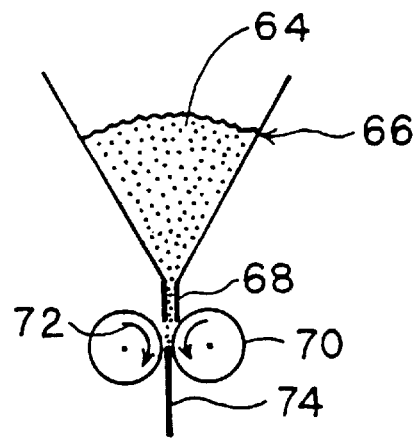
FIG. 11 is a representative elevation view of apparatus for forming a sheet of the active carbon catalyst.

The resulting free flowing powder mixture 64 is rolled into web form in a manner generally illustrated in FIG. 11. Referring to FIG. 11, carbon powder mixture 64 is placed in a hopper 66 and fed downwardly through the hopper to a discharge opening such as slot 68, which feeds the powder mixture to a first nip formed by a pair of polished steel rolls 70 at suitable speed to position a sufficient amount of the carbon powder mixture above the nip formed between the rolls, with which to form a generally continuous web of such powder mixture. Rolls 70 are driven in cooperating directions illustrated by arrows 72, at constant common speeds, thus to draw the powder into the nip between the rolls. The spacing between rolls 70 is set at a fixed distance sufficient to draw the carbon powder mixture into the nip and, by the pressure exerted on the carbon powder mixture as the mixture passes through the nip, to fabricate the carbon powder mixture into a web 74, having a thickness of about 0.006 to about 0.010 inch, preferably about 0.004 inch to about 0.006 inch, and a with machine direction (MD) and a cross machine direction (CD). The constant speed of rolls 70 produces a web 74 having a relatively uniform thickness along the length of the web.

While the web fabricated at rolls 70 can thus be consolidated from powder form to a single web body, the web so fabricated is quite fragile.

After the web is consolidated as illustrated in FIG. 11, the web may be wound up as a roll (not shown) or otherwise consolidated or packaged for storage and/or shipment. In some embodiments, web 74 is cut cross-wise (along the CD direction) to thereby produce individual, e.g. generally rectangular sheets 80, illustrated in FIG. 12. In such embodiments, 2 to about 6 such individual sheets 80 are stacked on top of each other with the machine direction (MD) in sequential sheets in the stack being oriented transverse, preferably perpendicular, to each other. FIG. 12A shows such a stack 82 of 4 sheets 80A, 80B, 80C, 80D. Arrows 84 indicate the MD in each sheet, illustrating the sheets being oriented perpendicular to each other. A stack of 4 such sheets, each having a thickness of about 0.005 inch, has a combined thickness of nominally about 0.020 inch.

With sheets 80 so stacked and arranged, the 4-sheet stack is passed through a second nip illustrated by rolls 86. Rolls 86 are shown spaced apart for illustration purposes in FIG. 12A. The spacing at the nip between rolls 86 is set and held at a uniform nip gap significantly smaller than the sum of the thicknesses of the sheets in the stack.

The size of the spacing between rolls 86 at the gap should be less than 75% of the combined thicknesses of the sheets making up the stack. Preferred size of the spacing is from about 20% up to about 60% of the combined free thicknesses of the sheets making up the stack, with a more preferred range of about 25% to about 40% of the combined thicknesses.

During processing of the stack 82 of sheets, rolls 86 preferably rotate at a generally constant speed in cooperating directions illustrated by arrows 87, and thereby draw the stack into the nip, thus working the composite 4-sheet stack. As stack 82 passes through the nip, the sheets are, in combination, mechanically worked by rolls 86, with the result that the worked composite sheet stack 82W is significantly stronger than the unworked sheets, whether taken alone or in combination. The composite sheet stack is preferably so worked in suitable nips, preferably from 2 to about 6 times, or more, until the worked composite sheet stack is suitably toughened or otherwise strengthened that the resulting worked composite sheet stack 82W can be handled by commercial speed production equipment in fabricating elongate electrochemical cells of the invention having cathode assemblies having generally arcuate configurations generally corresponding with the outer arcuate sides of the respective cells.

The overall effect of the working of the stack of sheets is to reduce the thickness of the stack and to effectively cross-bond and thereby consolidate the sheets to each other, such that the directionality of the strength of web 74 (e.g. the MD/CD ratio of tensile strength) is more evenly distributed in the MD and CD directions in the thus-consolidated, unitary worked sheet 82W than in an unworked sheet of similar thickness. Namely, the ratio of crossing tensile strengths is closer to "1" in the unitary worked sheet than in the unworked sheets, whether the unworked sheets are taken individually or in combination. In addition, applicants contemplate that the work done in the first and second nips at rolls 70 and 86 further fibrillates the binder, and interconnects the associated fibrils, into a three-dimensional net-like arrangement of interconnected binder fibrils, thus to assist the binder in its role of binding the carbon and Mn(II) moeties into the resulting worked sheets 82W, or otherwise containing or holding the carbon and Mn(II) moieties in sheet form. As a mechanical act, the contemplated three-dimensional net-like binder arrangement is believed to receive and hold the carbon particles in the sheet structure, primarily by mechanical entrapment.

PTFE, as a binder, can also serve as a chemical bonding agent, bonding carbon particles together to form an adhesively-defined matrix. While adhesive properties of PTFE are generally activated by heat, applicants contemplate that the work energy utilized in the working of the stack of carbon sheets as at the nip formed by rolls 70 and 86 may be effective to so heat the compositions of the materials being rolled as to concomitantly and concurrently activate the adhesive properties of the PTFE. Applicants thus contemplate that the binding performance of the DTFE in active carbon catalyst of the invention may be a combination of mechanical entrapment and such chemical adhesion.

The resulting worked sheet 82W is sufficiently strong, in all directions, to tolerate commercial processing. The typical worked sheet has an overall thickness in the range of about 0.003 to about 0.010 inch, preferably about 0.004 go about 0.008 inch, and most preferably about 0.005 go about 0.007 inch.

The following description applies to assembling a worked carbon sheet 82W to a cylindrical cathode current collector 32 such as that described in FIG. 4. A work piece 88 (FIG. 14) of suitable size is cut, as necessary, from worked sheet 82W. Work piece 88 has a width sized to cover the full length of cathode current collector 32, save top and bottom edge portions 42, 44, as shown in FIG. 10. Thus, work piece 88 is narrower than cathode current collector 32 is long.

Work piece 88 gas a length sufficient to wrap about the entire circumference of cathode current collector 32, and to provide for a modest overlap between the leading edge of the wrap and the trailing edge of the wrap.

Figure 14:
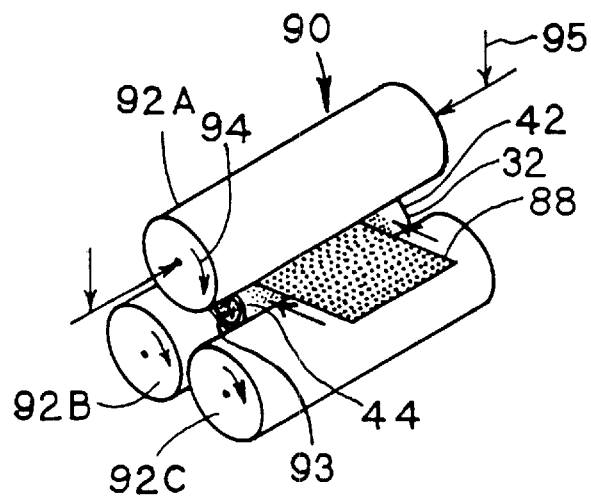
FIG. 14 is a representative pictorial view of a stack of pressure rolls used for assembling the active carbon catalyst, and the diffusion member, to the cathode current collector.

Work piece 88 is assembled to cathode current collector 32 using, for example, a 3-roll stack 90 of assembly rolls 92A, 92B, 92C. The lengths of rolls 92A, 92B, 92C are generally greater than the lengths of the cathode current collectors whose assembly, to other elements of the air cathode assembly, they facilitate. Rolls 92A, 92B, 92C are aligned with each other as shown in FIG. 14, and are spaced from each other whereby the rolls typically, but not necessarily always, rotate without touching each other.

Optionally, and preferably, current collector 32 is first slipped over an e.g. steel mandrel 93. The mandrel generally fills the space across the diameter of the current collector. The current collector, in combination with the mandrel, when the mandrel is used, is then inserted into the central opening defined by the stack of rolls 92A, 92B, 92C, as illustrated in FIG. 14. Pressure is then applied to the stack of rolls as illustrated by arrows 95, bringing the rolls together, and against cathode current collector 32. Rolls 92B, 92C, are preferably fixedly mounted to a support such that rolls 92B, 92C resist the pressure applied by roll 92A through mandrel 93 and current collector 32. Accordingly, the force applied by roll 92A is effectively applied to current collector 32 and mandrel 93. Thus, the pressure on the rolls causes the rolls to apply pressure to outer surface 58 of the current collector.

With pressure thus being applied to the outer surface of the cathode current collector in the midst of the 3-roll stack, workpiece 88 of the worked carbon sheet is directed into a third rip defined between the current collector and top roll 92A, centered between top and bottom edge portions 42, 44 of the current collector. e.g. top roll 92A is then driven in the direction indicated by arrow 94. Drives of bottom rolls 92B, 92C are connected to the drive of top roll 92A through suitable gearing or other apparatus, not shown, which causes the bottom rolls to rotate in unison at constant and common speed and direction with top roll 92A, such that rolls 92A, 92B. 92C provide a common drive direction driving cathode current collector 32.

With the rolls and the current collector so turning in common, the current collector being driven collectively and in common by the rolls, and with a leading edge of carbon sheet work piece 88 disposed against the nip, the work piece is drawn into the nip by rotation of the rolls and the current collector. As the work piece is drawn into the nip, downward force is being applied to top roll 92A and thus to cathode current collector 32, pressing the carbon sheet work piece against the outside surface of the cathode current collector. Rotation of rolls 92A, 92B, 92C, and current collector 32 continues, progressively drawing the work piece into the nip, and onto outer surface 58 of the current collector.

Accordingly, continued rotation of rolls 92A, 92B, 92C, and current collector 32 progressively brings the overall length of each portion of the work piece into sequential pressure relationships with all 3 of rolls 92A, 92B, 92C at the nips formed between the respective rolls and current collector 32. Rotation of the rolls, and of the current collector, continues until the full length of the work piece has been worked by all three pressure rolls.

As drawn into the entrance nip at roll stack 90, work piece 88 is a generally soft, pliable carbon-based sheet material. The pressure exerted by rolls 92A, 92B, 92C deforms the soft, carbon-based sheet material, thus "extruding" the carbon material into and through perforations 56 adjacent work piece 88 as illustrated in FIGS. 3A, 3B, and 7.

As the so-extruded carbon material moves through perforations 56, the carbon material is confined to the cross-sections of the respective perforations. As the leading edges of the extrusions in the respective perforations reach inner surface 60 of current collector 32, the carbon material encounters mandrel 93, whereby extension of the carbon material inwardly of inner surface 50 of the current collector is resisted and limited by mandrel 93. The combined forces of roll 92A and mandrel 93 thus squeeze the carbon material between them, causing lateral plastic deformation flow of the carbon material inwardly of inner surface 60. Thus, the leading edges of the carbon material, which is extruded through perforations 56, flow and extend outwardly of projections of the respective perforations 56 at and adjacent the inner surface of current collector 32, thus to mechanically interlock at least leading portions of the respective carbon extrusions to the cathode current collector by the mechanical interlocking of the carbon work piece between inner and outer surfaces of the cathode current collector, through perforations 56.

In the illustrated process, the resisting force of mandrel 93 limits the thickness of projection of the carbon material inwardly of inner surface 60 of the current collector. Overall, the result of the illustrated process is that the surface of the combination of current collector and carbon catalyst is a generally continuous matrix of webs 62 of the current collector interspersed with discontinuous regions of the carbon material, and wherein the carbon material extends inwardly of webs 62, typically about 1 millimeter or less. Other processes can be used, if desired to apply the carbon material as a layer, including over webs 62, such that the carbon covers substantially all of the inner surface of the cathode current collector, and defines substantially the entirety of the inner surface of the combination of the current collector and the carbon material.

The common and relatively constant speeds of rolls 92 provide a generally uniform thickness "T2" to the resulting layer of carbon-based material which is applied to the outside surface 58 of cathode current collector 32.

In the embodiment illustrated in FIG. 14, the pressure on the carbon sheet workpiece and on the cathode current collector in stack 90 is applied by a pair of pneumatic cylinders (not shown) having working diameters (cylinder bore size) of 1.06 inches. The pneumatic cylinders urge top roll 92A downwardly against the outer surface of current collector 32 as illustrated by arrows 95, and apply force through current collector 32 and mandrel 93 against bottom rolls 92B, 92C.

As illustrated in FIG. 14, downward force on top roll 92A is transferred through current collector 32 to mandrel 93 at top roll 92A, and from mandrel 93 back through current collector 32 to rolls 92B, 92C at the interfaces of rolls 92B, 92C with current collector 32. Accordingly, when downward force is applied to roll 92A, with mandrel 93 and current collector 32 in place as seer in FIG. 14, the force passes through mandrel 93 and is applied to current collector 32, substantially simultaneously, at the 3 locations of linear contact, namely the three nips, between current collector 32 and respective rolls 92A, 92B, 92C.

The relationship of the mandrel in the stack is such that the mandrel is held in the stack generally by the forces applied by the stack of rolls. Namely, the mandrel generally floats, in surface-to-surface contact with rolls 92A, 92B, 92C, within the opening defined between rolls 92A, 92B, 92C, both when rolls 92A, 92B, 92C are motionless, and when the rolls are turning in performance of the operations the rolls were designed to accomplish.

As work piece 88 is introduced into the nip, the force being applied by the top roll against the current collector is thus imposed on the work piece, and much of the respective force is accordingly transmitted through the work piece to the current collector. As the work piece is drawn into the stack of rolls, force is first applied to the leading edge of the work piece by roll 92A.

As the work piece leading edge progresses past roll 92A, the movement of the leading edge out of the nip at roll 92A correspondingly releases the nip force from the leading edge, and such force is correspondingly applied and released twice more as the leading edge respectively passes through the naps defined between rolls 92B and 92C and current collector 32. The remaining portions of the carbon sheet work piece are likewise subjected to three consecutive applications of lines of force at rolls 92A, 92B, 92C, with corresponding releases of the force between respective force applications as such portions pass into and through the respective working nips. Thus, when the full length of the work piece has been received into the stack of rolls, and the stack is effecting rotation of the work piece in the stack, force is being simultaneously applied to the work piece at three spaced lines extending along the length of current collector 32 and respectively along the width of work piece 88. It will be understood that force is being applied constantly and uniformly to the rolls, and that the application and release of force to current collector 32 and work piece 88 is a result of the current collector and work piece passing between a roll and the current collector (force applied) and out from between a roll and the current collector (force released), all while a preferably uniform force is being constantly applied to roll 92A, and thus at the three nips.

In the above process, some of the force at one or more of rolls 92A, 92B, 92C performs the above noted step of deforming the soft and pliable material of work piece 88, thereby to extrude the carbon material into perforations 56 as illustrated. The extent of the extrusion or other deformation of the workpiece at any given locus about the circumference of the outer surface of the current collector is a function of the nature and amount of forces applied at that locus by rolls 92A, 92B, 92C at their respective lines of contact with the work piece, in combination with the time over which the respective forces are applied as well as being a function of the nature of the surfaces of rolls 92A, 92B, 92C. As force is increased for a given time interval over which the force is applied, in general, the amount of material deformed through perforations 56 increases.

The length of work piece 88 is defined herein to be long enough to assuredly cover the entire circumference of current collector 32. As noted above, the forces applied on the work piece as the work piece is being assembled to the current collector cause the work piece to deform. Such deformation includes deformation of the length and width dimensions, as well as the above described deformation of the thickness parameters. Accordingly, considering the plastic deformation of work piece 88, in order to ensure that the work piece fully covers the circumference of the current collector, the length of the work piece is specified such that the deformed length will be slightly longer than is expected to be needed to fully cover the circumference or the current collector. Thus, by the time the full length of the work piece has been received at roll 92A, and the work piece has been plastically deformed in length, width, and thickness by the forces applied by stack 90 of rolls, the trailing edge of the work piece slightly overlaps the leading edge of the work piece on the current collector.

As the trailing edge of the work piece is pressed onto the current collector, and progresses about stack 90, the forces of rolls 92A, 92B, 92C, physically and plastically deform the combination of the leading and trailing edges thus to create a smooth boundary between the leading and trailing edges of the work piece in application of the carbon-based material to the cathode current collector, to thus form, mount, bind, secure, and otherwise join the active carbon catalyst onto the current collector, and wherein the current collector serves as a substrate receiving the deformable carbon work piece thereonto.

Similarly, if the residence time over which a given amount of force is applied is increased, the amount of carbon work piece material deformed through perforations 56 increases. Thus, to the extent the speed of rotation of rolls 92A, 92B, 92C is inconsistent, and a constant force is being applied, the time over which force is applied to given locations about the circumference of the current collector is similarly inconsistent, whereby the amount of material deformed through perforations 56 is likely to be inconsistent, resulting in varying thicknesses "T2" about the circumference of the cathode current collector and varying thicknesses of projections of the carbon material inwardly of inner surface 50. Thus, general constancy of force application, and general constancy of speed of rolls 92A, 92B, 92C, while not necessarily critical to basic operability of the air cathode assembly, assist in providing general overall uniformity of the application and bonding of active carbon catalyst layer 34 to the cathode current collector.

Where the diameters of the two pneumatic cylinders are the above recited 1.06 inches, and the width of the work piece is about 1.6 inches, the pneumatic pressure applied to each cylinder is between about 40 psi and about 100 psi, preferably about 60 psi to about 100 psi, still more preferably about 85 psi to about 90 psi. The force thus applied to the carbon workpiece by the two pneumatic cylinders, in combination, through roll 92A, is accordingly about 70 pounds to about 221 pounds applied over the 1.6 inch width of the work piece. Accordingly, the force applied to the carbon work piece by roll 92A is about 44 pounds to about 138 pounds per inch width of the work piece.

Considering the force levels suggested above, acceptable speeds for rotation of rolls 92A, 92B, 92C, are about 10 to about 150 revolutions per minute (rpm). Preferred speeds are between about 25 rpm and about 75 rpm, more preferably about 40 rpm to about 60 rpm. Within the stated speed range, the faster the roll speed, generally the more uniform the effect of the application of the force is believed to be. The slower the roll speed, and the greater the force, the greater is the extent of the deformation of the carbon catalyst composition caused by passage under a given roll at a respective nip.

Figure 15:
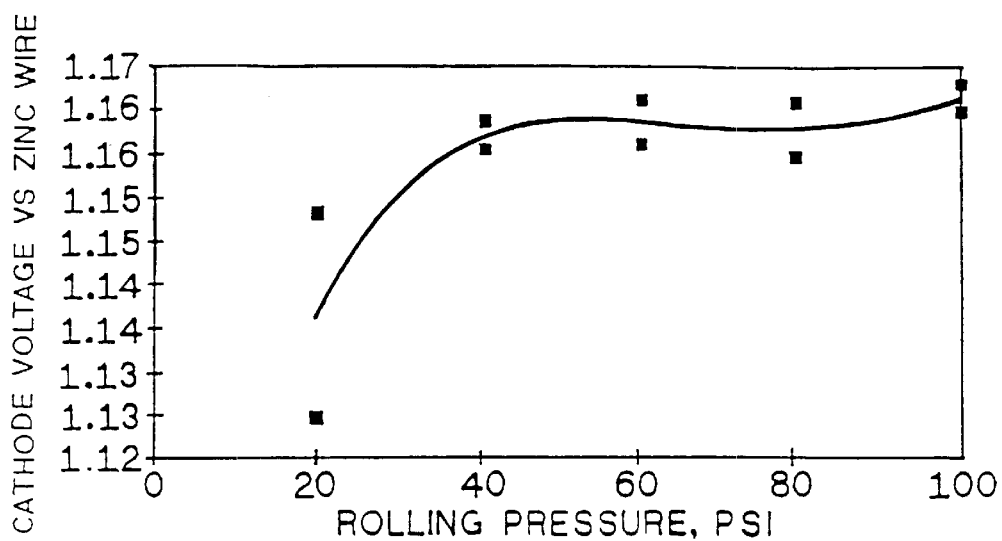
FIG. 15 is a graph illustrating the effect of rolling pressure on cathode voltage.

FIG. 15 shows in graph format the general affect of pneumatic cylinder pressure, using the above-noted cylinders, on the voltage of the resulting air cathode made from the work product of the assembly step illustrated in FIG. 14 as tested in a cathode half cell testing device on a discharge current of 80 mA/cm$^2$. As seen in FIG. 15, and assuming appropriate speed of rotation of rolls 92A, 92B, 92C, air pressure appears to have no substantial affect, or little affect, on voltage of the completed air cathode assembly when the air pressure on the cylinders is between about 40 psi and about 100 psi. When the air pressure is reduced from 40 psi to 20 psi, there is a distinct drop in voltage, from about 1.16 volts to about 1.14 volts. Accordingly, where the pressure is reduced to 20 psi at the pneumatic cylinders, the voltage of air cathodes made from such combinations is reduced by about 2%–4%. Thus, 20 psi to 40 psi is less preferred. Preferred pressure is about 60 psi to about 80 psi.

While assembly of the carbon sheet work piece to the air cathode at less than 20 psi can be done, and while the resulting air cathode has some functionality, the performance drops off still further as the pneumatic pressures drop below 20 psi. Accordingly, less than 20 psi pressure is not preferred.

Figure 14A:
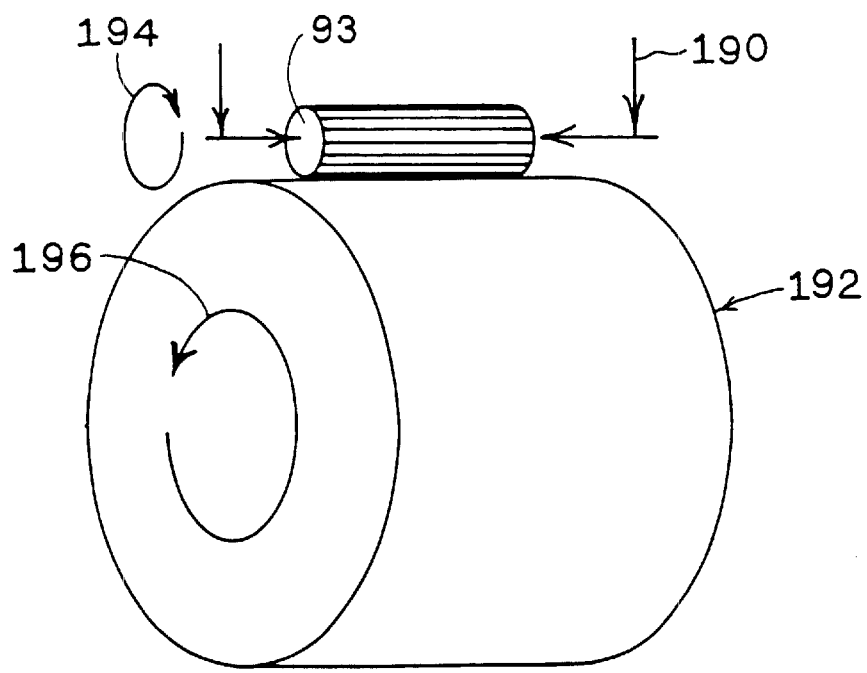
FIG. 14A is a representative orthogonal view illustrating alternative apparatus and methods for assembling the active carbon catalyst, and the diffusion member, to the cathode current collector.

FIG. 14A illustrates alternate apparatus, and alternate methods, for assembling a sheet of active carbon catalyst to the cathode current collector. As seen in FIG. 14A, mandrel roll 93 is urged, by downwardly-directed forces illustrated as arrows 190, against a single, fixedly-mounted working roll 192. The diameter of working roll 192 is substantially larger than that illustrated for rolls 92A, 92B, 92C of FIG. 14.

Mandrel 93 is, of course, the same size as in FIG. 14 in order to fit inside current collector 32.

Whereas rolls 92A, 92B, 92C are, for example, about 0.5 inch to about 0.8 inch in diameter, and mandrel 93 is of similar size, e.g. about 0.5 inch, working roll 192 is preferably about 4 inches to about 8 inches diameter, with a preferred size of about 6 inches diameter. The larger e.g. 6 inch diameter of roll 192 reduces the angle of attack between the surfaces of mandrel roll 93, current collector 32 and working roll 192. The reduced angle facilitates feeding of the carbon workpiece into the nip. Further, the reduced contact angle maintains pressure at a given locus on the carbon sheet for a substantially greater distance of circular travel than do any one of the nips in the embodiment of FIG. 14.

Mandrel 93 and working roll 192 are both cooperatively driven at cooperative surface speeds in the directions shown by arrows 194, 196, by suitable drive apparatus (not shown).

Figure 12:
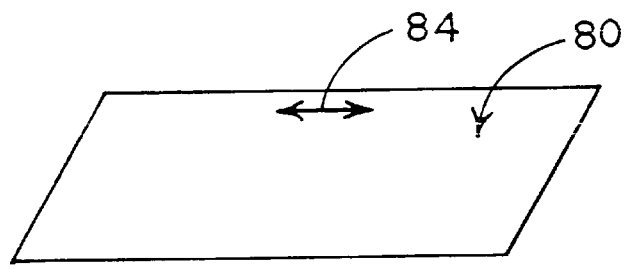
FIGS. 12 and 12A are representative pictorial views, with parts cut away, of an active carbon sheet, and a stack of such sheets being formed into a cross-bonded composite of such sheets.
Figure 12A:
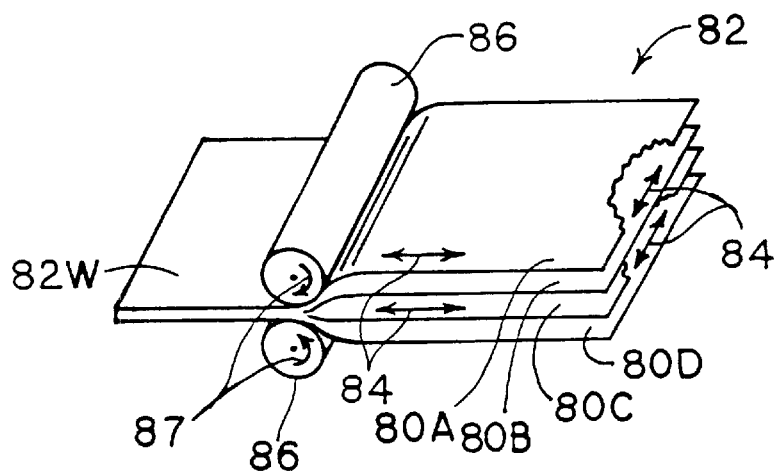

A further advantage of the larger working roll 192 is that carbon sheet 80 illustrated in FIG. 12, fabricated as at FIG. 11, need not be cross-laminated as at FIG. 12A. Rather, the carbon web as fabricated at 74 in FIG. 11 can be trimmed for size to make sheet 80, and fed into the nip between mandrel 93 and roll 192 without further preliminary processing of the carbon sheet. Namely, whereas preliminary working of sheet 80, to strengthen the sheet, is generally indicated when apparatus and process of FIG. 14 is used, no such preliminary working is required when using the apparatus and process or FIG. 14A.

In view of the comparative teachings with respect to FIGS. 14 and 14A, one can use as a support structure, as at roll 192, any structure having greater arc radius than the arc radius of mandrel 93 by a ratio of at least about 4/1, preferably at least about 8/1, more preferably at least about 12/1, optionally up to and greater than 16/1. including all ratios between 4/1 and the inverse arc represented by mandrel 93. One can use, for example, any of a variety of rolls 192. One can also use an endless belt (not shown) presenting, under pressure, any desired curvature to cathode current collector 32, or to the carbon catalyst, at the respective nip, including at least presentation e.g. an infinite radius (not shown), or an inverse concave curvature up to a curvature that more-or-less, or generally, follows the curvature of the cathode current collector as effected by mandrel 93. Thus, an arc radius ratio of at least about 4/1 includes flat presentations, and structures (e.g. inverted arcs) that tend to follow the outline of mandrel 93 and/or current collector 32.

For use of the embodiment of FIG. 14A to apply the carbon to the cathode current collector, the disclosed cylinders are preferably powered to about 40 psi to about 60 psi, more preferably about 50 psi.

Air Diffusion Member

Air diffusion member 36 preferably performs a variety of functions in the cell, and provides a variety of properties to the cell. First, diffusion member 36 provides a moisture barrier, tending to prevent, discourage, retard, or otherwise attenuate, passage of moisture vapor into or out of the cell.

Second, diffusion member 36 provides a liquid barrier, to prevent, retard, attenuate, or otherwise discourage leakage of liquidous electrolyte out of the cell.

Third, in preferred embodiments, diffusion member 36 provides a folded-over seal layer at the top of the cell. Such seal layer, in combination with the separator, physically and electrically isolates the cathode current collector and the active carbon catalyst from grommet 18 and anode mix 20.

Fourth, diffusion member 36 can be used to control the rate of diffusion of air into and out of the cell to and from the reaction sites on the active carbon catalyst. As such, the diffusion member sets the upper limit of the rate at which oxygen can reach the cathode reaction sites. To the extent the diffusion rate through the diffusion member is lower than the rate at which oxygen can be used at the reaction surface, namely the oxygen reaction rate, the diffusion member defines the upper limit of the cathode reaction rate at the reaction surface. By so controlling the cathode reaction rate, and assuming the anode reaction rate is not controlling, diffusion member 36 provides a control to the limiting current, namely that maximum current flow which can be produced by the cell when an external circuit which is powered by the cell operates under high demand conditions.

Fifth, diffusion member 36 distributes air laterally along its own length and width, especially the incoming air entering the cell. Such lateral distribution affects the degree to which oxygen is provided uniformly over the entirety of the area of the reaction surface of the cathode assembly, rather than having oxygen much more concentrated at those portions of the reaction surface which are directly opposite air ports 38 and correspondingly much less concentrated at those portions of the reaction surface which are between projections of the air ports onto the reaction surface.

In view of the above multiple functions of diffusion member 36, the material from which the diffusion member is fabricated must have certain properties. Such material must be sufficiently porous as to provide an adequate conduit for flow of oxygen therethrough, both through the thickness of the material and internally along the lateral length and width of the material. Suitable such materials are certain ones of the microporous polymeric films.

The material should be generally a barrier to transmission of water, whether in liquid or vapor form. Specifically, the air diffusion member serves as a barrier to loss of the liquid aqueous potassium, hydroxide or similar electrolyte from the cell, through the air cathode and preferably attenuates movement of water vapor into or out of the cell. Since the electrolyte is an aqueous composition, the material from which the air diffusion member is fabricated must be generally hydrophobic. Certain ones of the microporous polymeric films are hydrophobic.

The material must be tolerant of, and generally inert to, the electrolyte, for example the alkaline electrolyte environment of aqueous potassium hydroxide-based electrolyte which is typical of metal-air electrochemical cells.

The material must embody suitable internal structure, and suitable surface properties, to provide sealing properties, for example, to provide, in combination with the separator, a pressure seal gasket-type affect at the top of the air cathode, thereby to provide a seal layer between the grommet and the cathode current collector. At the bottom of the cell, the material provides a seal between the bottom member of the cell and the combination of the cathode current collector and the active carbon catalyst.

The material from which air diffusion member 36 is fabricated is preferably subject to manipulation such as during fabrication in order to limit, namely to reduce to a desired amount, the rate at which oxygen and water vapor penetrate through the diffusion member and reach the reaction surface of active carbon catalyst 34. Such capacity for manipulating the air diffusion rate enables the cell manufacturer to control the target air diffusion specifications of the cells being manufactured by making changes in the assembly process without necessarily changing the raw material from which the air diffusion member is fabricated. To the extent the diffusion rate of water vapor can be so manipulated/reduced and controlled without limiting oxygen diffusion so much that the cathode reaction rate is reduced, passage of water vapor into or out of the cell can be correspondingly reduced without affecting the limiting current of the cell A preferred air diffusion member 36 for a "AA" size cell has a thickness of about 0.0035 inch. A suitable range of thicknesses is about 0.002 inch to about 0.006 inch, with a preferred range of about 0.0025 inch to about 0.005 inch, and a most preferred range of about 0.003 inch to about 0.004 inch. Such air diffusion member 36 can be fabricated from a generally continuous web of microporous polytetrafluoroethylene (PTFE). The microporous PTFE used for diffusion member 36 has the same general chemical composition (PTFE) as the above-noted preferred material used as the binder in the active carbon catalyst 34. The application is, of course, different in that the PTFE used in the catalyst is obtained in powder form, whereas the PTFE used in the diffusion member is obtained in the form of a continuous microporous web.

A preferred web for fabricating diffusion member 36 has a width equivalent to the length "L1" of cathode current collector 32, plus about 0.125 inch, and a thickness. prior to assembly into the air cathode as air diffusion member 36, of about 0.002 inch. A suitable range of thicknesses for the web is about 0.001 inch to about 0.005 inch, welch a preferred range of about 0.0015 which to about 0.0025 inch. Such web of microporous PTFE is available from Performance Plastics Products Inc., Houston, Tex., as PTFE Ultrathin Membrane. The thickness of a web of the above described PTFE material typically varies along the length of the web by up to plus or minus 10%, as received from the supplier.

Figure 16:
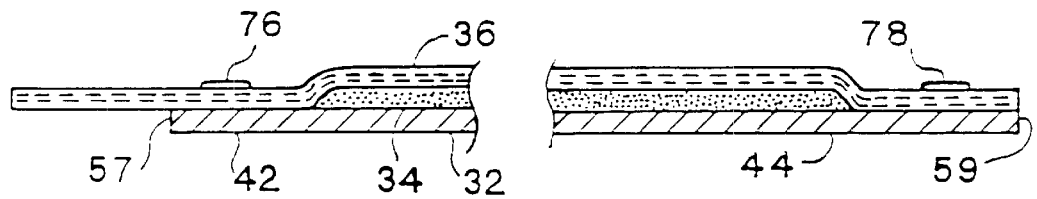
FIG. 16 is an enlarged longitudinal cross-section, with parts cut away, of an air cathode useful in assembling an elongate cell of the invention.

In air cathode 26, air diffusion member 36 is preferably consolidated from multiple thicknesses of the above described PTFE web. Referring to FIGS. 7 and 16, three such thicknesses are illustrated by dashed lines 96, it should be noted, however, that the consolidated air diffusion member operates more like a single layer than like the multiple layers suggested in FIGS. 7 and 16.

The invention contemplates that an acceptable cell 10, namely a cell that does not leak electrolyte, can be fabricated using as few as 2 layers of material to fabricate diffusion member 36. Up to 5 or more layers may be used. However, about 3 layers is preferred in order that thickness variations along the length of the web be accommodated among the layers thereby to reduce the overall thickness variations, and in order that the length of the interface between layers along the length of the web, from the leading edge to the trailing edge, be sufficiently long to avoid seepage of electrolyte along the inter-layer interface between the layers of hydrophobic material and thence out of the cell.

The multiple layer configuration of diffusion member 36 is preferably fabricated as the web of material from which the diffusion member is made is joined to the subassembly represented in FIG. 10 by the combination of the current collector and the carbon catalyst.

Referring now to FIGS. 10 and 14, after the active carbon catalyst work piece has been applied to the cathode current collector to fabricate the subassembly represented in FIG. 10, a strip of PTFE, of suitable width as described above, is fed to the nip between roll 92A and the active carbon catalyst which is disposed on the cathode current collector.

The PTFE strip has a length sufficient to wrap about the outer surface of the active carbon catalyst the number of times required to develop the number of layers desired in diffusion member 36, preferably plus a modest excess which wraps past the starting point on the circumference where wrapping of the PTFE was commenced.

Thus, the PTFE strip can be assembled to the cathode current collector at outer surface 63 of the active carbon catalyst using the same 3-roll stack 90 of assembly rolls 92A, 92B, 92C as is used to assemble the active carbon catalyst to the cathode current collector, or single roll 192 of FIG. 14A.

As with application of the carbon-cased work piece 88 to the current collector, pressure is applied to the stack of rolls, bringing the rolls together, and against cathode current collector 32 and active carbon catalyst 34, while the PTFE layer is being assembled into the air cathode structure. As with assembly of the carbon-based work piece to the current collector, the pressure on the rolls causes the rolls to apply pressure to outer surface 63 of the active carbon catalyst.

With pressure thus being applied to the outer surface of the catalyst in the midst of the 3-roll stack, the incoming PTFE strip is directed into the nip defined between the carbon catalyst and top roll 92A. As before, top roll 92A is driven in the direction indicated by arrow 94. Bottom rolls 92B, 92C accordingly rotate in unison at common speed with top roll 92A, and in directions providing a common annular drive direction to both the combination of the cathode current collector and the active carbon catalyst.

With the rolls and the current collector so turning in common, and with a leading edge of the PTFE strip disposed against the nip, the PTFE strip is drawn into the nip by rotation of the rolls and the current collector-catalyst combination. As the PTFE strip is drawn into the nip, the pressure between top roll 92A and the active carbon catalyst presses the PTFE strip against outer surface 63 of the active carbon catalyst. Rotation of rolls 92A, 92B, 92C, and the current collector-catalyst combination continues, drawing the PTFE strip into the nip, and onto outer surface 63 of the active carbon catalyst.

Accordingly, and similar to the assembly of the catalyst to the current collector, continued rotation of rolls 92A, 92B, 92C, and the current collector-catalyst combination progressively brings each portion of the length of the PTFE strip into sequential pressure relationships with all 3 of rolls 92A, 92B, 92C. Rotation of the rolls and of the current collector-catalyst combination continues until the full length of the PTFE strip has been drawn into the nip and worked by all three pressure rolls.

As drawn into the entrance nip at roll 92A of stack 90, the PTFE strip is a generally soft, pliable material. The force exerted by rolls 92A, 92B, 92C urges portions of the PTFE material into the catalyst composition whereby the structure of the PTFE which defines the microporous nature of the PTFE strip forms mechanical affixations with the active carbon catalyst, thus mechanically "bonding" the PTFE to active carbon catalyst 34. Applicants contemplate that, at the same time, the stack pressure likely further deforms the carbon material into and through perforations 56.

As the rotating current collector, catalyst, and PTFE strip complete a full revolution in roll stack 90, the incoming PTFE begins to encounter, and to be fed over, the underlying first layer of the PTFE. The pressure being applied by roll stack 90 urges the overlying incoming PTFE material into intimate contact with the underlying PTFE material such that the microporous structure of the two layers of PTFE which defines the microporous nature of the PTFE strip forms mechanical affixations between the two PTFE layers, thus lightly mechanically "bonding" the overlying and underlying PTFE layers to each other. Third and subsequent layers of PTFE, if applied, mechanically bord to the respective underlying layers in a similar manner. In preferred embodiments, the PTFE strip is wrapped about 3.25 times around the outer circumference of the current collector-catalyst combination.

The result, of wrapping the PTFE strip about the current collector-catalyst combination multiple times without an intervening leading or trailing end edge of the strip, is the application of multiple layers of the PTFE without deploying multiple seams at layer joinders. Rather, the multiple layer diffusion member so fabricated is effectively seamless in that there is no intermediate seam, or series of seams defining the mulitiple layers, which seams could provide leakage paths for exodus of liquid electrolyte from cell 10. By providing a full number of wraps plus a modest overlap of the starting point on the circumference of the assembly, a full complement of the desired thickness is provided over the entire circumference of the assembly so created.

Figure 17:
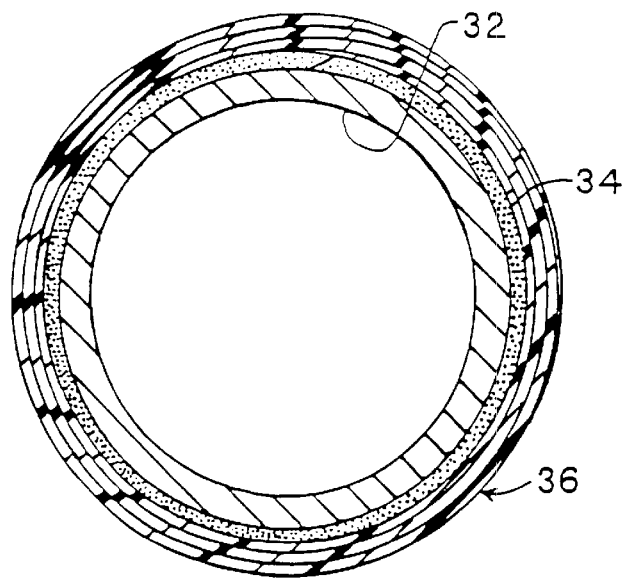
FIG. 17 is an enlarged transverse cross-section, with parts cut away, of an air cathode useful in assembling an elongate cell of the invention.

The terminal end edge of the strip is subjected to the same pressures as the rest of the strip. Accordingly, the same bonding principles bond the end edge of the strip to the underlying layer of PTFE, whereby the end edge of the strip is suitably bonded into the overall assembly. FIG. 17 shows a representative cross-section of the cathode assembly assemblage at the instantly above-described stage of assembly, whereby about 3.25 circumferential wraps of the PTFE have been applied to the assemblage of the carbon on the cathode current collector.

In preferred embodiments, as the PTFE strip is fed into the nip formed between roll 92A and the active carbon catalyst, the strip is positioned such that a first side edge of the strip is aligned laterally with a first side edge of the current collector-catalyst combination, and the second edge of the strip extends, as an edge portion, outwardly of the opposing side edge of the current collector, which will be disposed toward the top of the cell, by preferably about 0.125 inch. Thus, when the PTFE strip has been fully assembled to the current collector-catalyst combination, thereby to apply the strip to the current collector-catalyst combination and to fabricate the diffusion member, one side edge of the multiple layers of PTFE strip extends outwardly of the corresponding top edge of the current collector.

As the PTFE strip is applied to and through the nip between roll 92A and carbon catalyst 34, pressure is applied by stack 90 directly to the PTFE strip, indirectly to workpiece 88, and indirectly to current collector 32, in the same manner as is used in assembling the active carbon catalyst to the current collector. Speed of rotation of the rolls is generally the same as described above for applying the active carbon catalyst material to the current collector, pressure applied to the PTFE web by stack 90 is in the range of about 30 psi to about 100 psi, preferably about 35 psi to about 70 psi, still more preferably about 35 psi to about 50 psi.

Using the above described PTFE strip, and the above described pressure and speed on rolls 92A, 92B, 92C, the PTFE strip is compressed as it enters and traverses the stack, whereby the effective thickness of the sheet material is reduced as the strip is assembled with the current collector and the catalyst. Increased compressing of the PTFE in general reduces permeability of the PTFE to air flow therethrough. Permeability is also reduced as the number of layers of PTFE is increased.

Starting with a PTFE strip thickness of 0.002 inch, the overall thickness of a three layer diffusion member 36, so fabricated, is preferably about 0.0035 inch. This and other thicknesses of PTFE strip can accordingly be used, in this and other numbers of layers of PTFE strip material, for example, 4 layers, 5 layers, 6 layers, 7 layers, or more, to fabricate any desired thickness and/or any desired diffusion rate for diffusion member 36.

After the PTFE strip is thus assembled to the current collector-catalyst combination, the pressure is released from roll stack 90, and the current collector, carbon catalyst, diffusion member assemblage is removed from the stack.

A separator 16 is then juxtaposed adjacent the inner surface of the cathode assemblage. Separator 16 can be juxtaposed adjacent the inner surface either before or after the cathode assemblage is assembled to a bottom closure member such as to bottom closure member 202 or to cathode can 28.

The upstanding free edge region of the PTFE diffusion member is then rolled or folded inwardly about the circumference of the cell, down over the top of the separator, and downwardly onto the top portion of the inner surface of the separator. The downwardly-depending portion of the PTFE on the inner surface of the separator provides a seal shield, in slot 174 (FIG. 33), against movement of electrolyte or electricity from anode mix 20 through slot 174 and to the cathode current collector or the cathode can.

The rolling of the PTFE upstanding free edge region can, in theory, be done any time after the air cathode assembly is formed. The preferred sequencing is to roll the PTFE free edge shortly after removing the assembled air cathode from the stack of rolls 90.

Figure 30:
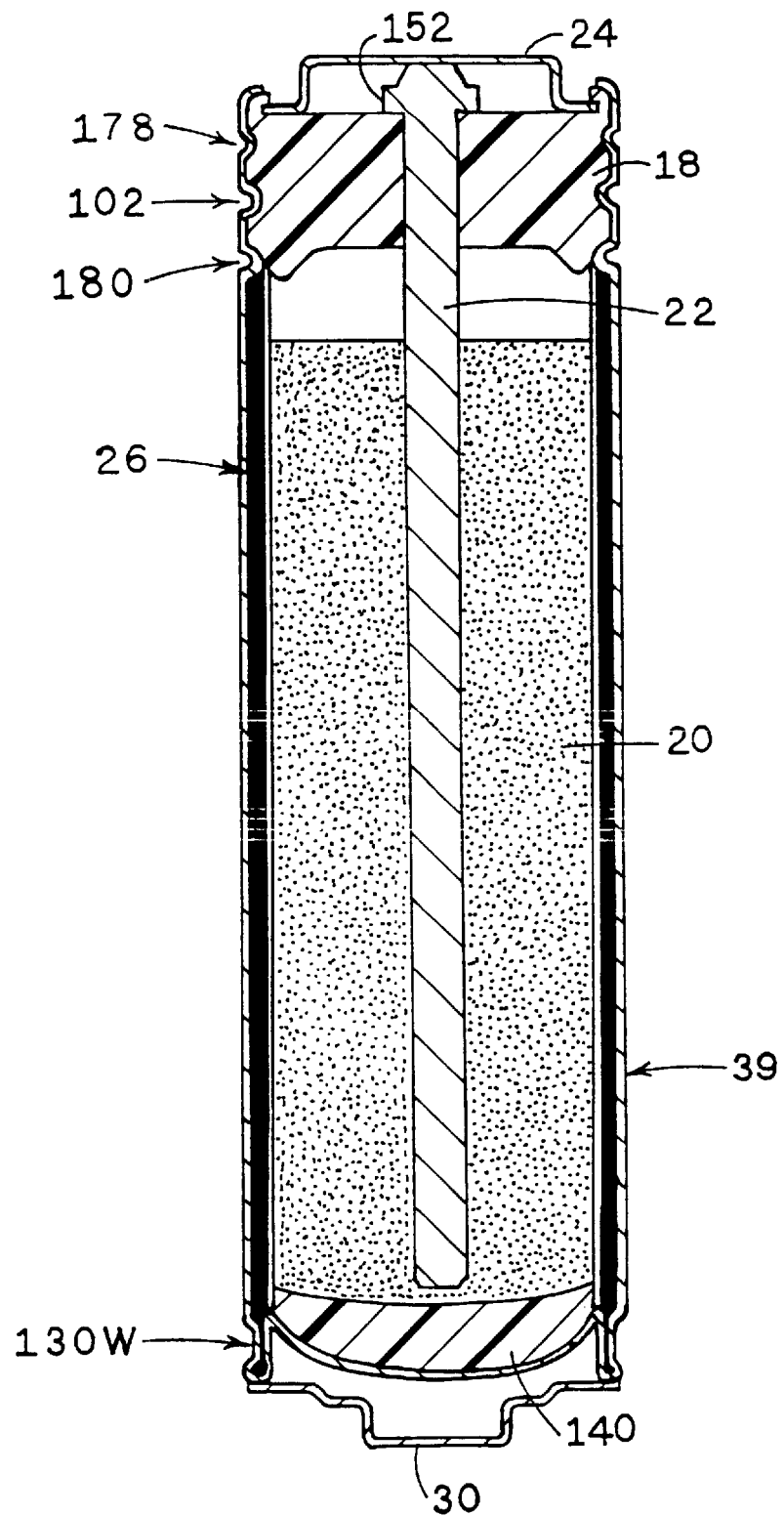
FIG. 30 is a representative cross-section of a cell of the invention similar to the cell of FIG. 2, and illustrating an alternate top seal structure.

Top and bottom rings 76, 78, respectively, of a solution of a seal composition of e.g. bitumen and toluene are applied to the PTFE diffusion member, such as by painting on of the composition, in areas of the diffusion member which are to be compressed by bottom seal groove 122 (FIGS. 21–23) or 130 (FIGS. 3A, 24); and top seal groove 176 (FIG. 3B) or 180 (FIG. 30). Rings 76, 78 are generally positioned where crimping seal force will be applied to them such as at seal grooves 102, 130, 176. Typical positions of rings 76, 78 are illustrated in FIGS. 3A, 3B, 13, and 16. The bitumen rings dry to a tacky, non-smearing consistency in a few minutes at ambient temperature, and serve as seal rings between the diffusion member and inner surface of cathode can side wall 39 at the top and bottom seal grooves, or at inner surfaces of other corresponding top and bottom closure members of the cell.

Longitudinal and transverse cross-sections of the completed air cathode assembly are illustrated generally in FIGS. 15 and 17 though without illustrating the carbon catalyst (as at FIGS. 3A, 3B) in perforations 56.

In some embodiments, once the leading edge of the PTFE strip has been secured in the nip at roll 92A, a modest level of tension can be applied or the strip, thereby to enable the above described reduction in the thickness of diffusion member 36, by stretching when desired.

Figure 13:
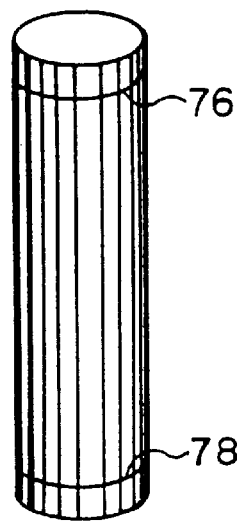
FIG. 13 is a representative pictorial view of the assembled air cathode, including cathode current collector, active carbon catalyst, and diffusion member.

The making of cylindrical air cathode assemblies has been described above, and such cylindrical air cathode assembly is illustrated in FIG. 13. In the finished air cathode assembly, the combination of inner surface 60 of current collector 32 and the adjacent innermost surface of catalyst 34 represents the inner surface of the air cathode assembly.

As with work piece 88 of active carbon catalyst 34, diffusion member 36 can be joined into the cathode assembly by using the alternate apparatus and methods illustrated in FIG. 14A. The same or similar pressures apply as are used with stack 90 to join the PTFE web to the active carbon catalyst. The number of layers of PTFE applied is typically not affected by the choice of using apparatus of FIG. 14A.

Irrespective of the apparatus used to join the PTFE strip into the cathode assembly, that of FIG. 14, that of FIG. 14A, or other apparatus (not shown), a further option for the PTFE web is that the PTFE web not extend the recited e.g. 0.125 inch past the edge of the current collector. Rather, in some embodiments, the respective edge of the PTFE strip corresponds with, and overlies, the respective edge of the current collector.

Cathode Can

Cathode can 28 generally comprehends an exo-skeletal structure of cell 10, which provides much of the physical structural strength of the cell. The cathode can is positioned outwardly of the anode, including outwardly of anode mix 20, outwardly of anode current collector 22, and also outwardly of cathode assembly 26. The cathode can is similarly disposed outwardly of grommet 18 about the circumference of the cell. Thus, cathode can 28 functions to encase, and to generally enclose, various elements inside cell 10.

The cathode can provides physical structural support to, and protects, air cathode 26, as well as other elements inside cell 10. For example, the cathode can provides physical structural protection to grommet 18 about the circumference of the cell. Cathode can 28 and, to some degree, air cathode assembly 26 and separator 16, provide physical support to, and structural protection for, anode mix 20.

Cathode can 28, in combination with other elements, secures other elements in place in the cell, thus to fix the juxtaposition of various ones of the elements of the cell in their appropriate positions for proper functioning of the cell.

By means of air ports 38, cathode can 28 admits cathodic oxygen into the cell adjacent air cathode assembly 26, thereby to provide the cathodic electroactive oxygen which ultimately reacts at the cathode to provide the hydroxyl ions consumed in the anode.

Cathode can 28 is fabricated from a single piece of sheet metal. Preferred metal sheet is a three-layer structure having a core layer of cold rolled steel (CRS), and outwardly disposed layers of nickel on opposing sides of the CRS core layer.

The general cylindrical shape of cathode can 28 is fabricated using drawing, or drawing and ironing steps, performed on metals tempered and otherwise fabricated in known manner, to have suitable drawing, or drawing and ironing properties. Such materials can be obtained from Thomas Steel Strip Corporation, Warren, Ohio USA.

Strength and ductility are important physical characteristics of the cathode can. Drawn, or drawn and ironed, cathode cans may be formed of virtually any metal that is plated, clad, or otherwise coated, with appropriate metal, such appropriate metal having a hydrogen overvoltage similar to that of the cathode, and being insoluble, preferably generally inert, in the presence of the electrolyte, e.g. alkaline electrolyte, or when otherwise exposed to a high pH environment.

The cathode can may be formed entirely of a metal or alloy having a hydrogen overvoltage similar to that of the cathode (as opposed to plating or cladding the can) so long as sufficient strength and ductility are available from the material selected. Materials in addition to nickel, having such hydrogen overvoltage properties, include, for example and without limitation, stainless steel, paladium, silver, platinum, and gold. Such materials can be coated as one or more coating layers onto the core layer by, for example, plating, cladding, or other application process. The ones of such materials providing sufficient strength and ductility can also be used as single layer materials in place of the composite structure which comprehends CRS or other suitable material as a core layer.

Steel strip plated with nickel and nickel alloy is generally used because of cost considerations, and because pre-plated, or clad, steel strip, which generally require no post-plating processes, are commercially available. The metal in the can must be both ductile enough to withstand the drawing process, and strong and rigid enough, to tolerate and otherwise withstand the cell crimping and closure process as well as to provide primary overall structural strength to the cell during shipment of the cell to market, and during the contemplated use life of the cell.

Cathode cans, for example, can be made of cold-rolled steel plated with nickel. Cathode cans may also be formed from cold-rolled mild steel, with preferably at least the inside portions of the cans being subsequently post plated with nickel. Other examples of materials for cathode cans include nickel-clad stainless steel; nickel-plated stainless steel; INCONEL (a non-magnetic alloy of nickel), pure nickel with minor alloying elements (e.g. NICKEL 200 and related family of NICKEL 200 alloys such as NICKEL 201, etc.), all available from Huntington Alloys, a division of INCO, Huntington, W. Va. USA. Some noble metals may also find use as plating, cladding, or other coating for can metals, including covering steel strip plated with nickel, and mild steel strip subsequently plated with nickel after fabricating the can.

Where multiple layers are used, e.g. CRS coated on opposing sides with nickel, the invention contemplates additional e.g. fourth, fifth, etc. layers, either between the nickel and CRS, or with a nickel layer between the CRS and the additional layer(s). For example, gold, platinum, palladium, or other excellent electrical conductor can be deposited on some or all of the outer surface of the cathode can (outside the nickel layer) after the can is drawn, or drawn and ironed. As an alternative, such fourth etc. layer can be, for example, a bond-enhancing layer between the CRS and the nickel.

Where the can is fabricated using a typical raw material structure of

/NI/CRS/NI/ as the sheet structure, such sheet structure is preferably about 0.010 inch thick, with a thickness range of about 0.006 inch to about 0.020 inch, and a preferred range of about 0.008 inch to about 0.014 inch. In such embodiments, each of the nickel layers represents about 2% to about 10%, preferably about 3% to about 7%, more preferably about 4% to about 6%, most preferably about 5%, of the overall thickness of the metal sheet in such 3-layer structure.

Cathode can 28 includes bottom wall 37, and side wall 39 extending upwardly from bottom wall 37. Given the above noted drawing, or drawing and ironing process used in making can 28, the thickness of bottom wall 37 is typically, but not necessarily, about 80% of the thickness of the raw sheet material from which the can was fabricated. Thus, where the raw sheet material from which the can was fabricated was 0.010 inch thick, the thickness of the bottom wall of a can made from such sheet material is typically about 0.008 inch.

Similarly, the thickness of side wall 39 is about 50% of the thickness of the raw sheet material from which the can was fabricated. Thus, where the raw sheet material from which the can was fabricated was 0.010 inch thick, the thickness of the side wall of a can made from such sheet material is typically about 0.005 inch.

Cathode Can Side Wall

After the basic shape and structure of the can are formed by drawing, or drawing and ironing, or other fabrication process, the finishing steps are performed on the side wall and the bottom wall. Accordingly, air ports 38 are formed in side wall 39. For the illustrated size "AA" cell, about 400 air ports 38 are preferably formed by e.g. laser piercing side wall 39 at evenly spaced locations, in a pattern generally evenly distributing the air ports over that portion of side wall 39 which is disposed opposite the reaction surface of the cathode assembly in the finished cell 10. Where 400 air ports are used, each air port is e.g. 0.015 inch nominal diameter, with a preferred range of about 0.010 inch to about 0.025 inch.

Larger or smaller numbers of air ports can be used depending on the use which is expected to be made of the cell. A larger number of relatively smaller air ports is preferred where greater limiting current is desired and where moisture vapor movement into or out of the cell is to be suppressed where the number of air ports is greater than 400, the average size of the air ports is preferably reduced in order to avoid excessive evaporation of electrolyte out of the cell, or ingress of moisture vapor into the cell. In general, as the sizes of the air ports are reduced, the overall open area of all air ports 38, taken in combination, can be reduced without reducing the limiting current of the cell, but beneficially reducing the overall rate of evaporation of electrolyte vapor from the cell or ingress of moisture vapor into the cell.

Where the number of air ports is less than 400, the average size of the air ports is increased, in order to compensate for the smaller number of air ports, and thus to provide sufficient oxygen at the reaction sites on the air cathode to sustain the desired level of electrical power production. In general, as the sizes of the air ports are increased and the number of air ports is decreased, the overall open area of all the air ports 38, taken in combination, should be increased in order to maintain the limiting current of the cell. However, the overall rate of evaporation of electrolyte vapor from the cell generally increases as the overall open area of all air ports increases. Thus, the decision regarding the number of air ports, and the sizes of the air ports, balances the anticipated electrolyte evaporation rate against such factors as cell limiting current.

Using laser piercing technology, air ports can generally be any size desired, from a low of about 0.001 inch up to about 0.025 inch, or more. The lower end of the range is generally established by (i) the higher cost of making a larger number of smaller air ports, and (ii) the practical limit of laser technology to effectively make perforations in metal sheet wherein the cross-section (diameter) of the air port so made is less than the thickness of the material so perforated. While such lower port diameter/material thickness ratio perforations can be made, the cost, precision, repeatability, and other factors generally discourage making such perforations at the lower end of the range. Accordingly, preferred lower end of the range of sizes for air ports is about 0.003 inch, more preferably about 0.005 inch, and most preferably about 0.008 inch. The most preferred range is, as stated above, about 0.010 inch to about 0.025 inch.

Larger air ports are cheaper and easier to make than smaller air ports. The upper end of the range of sizes of air ports 38, with corresponding reduction in the number of air ports, is generally defined in terms of at least three factors. First, there is the risk that the air ports may obviate the side wall continuing to provide its normal functions of structural support, protection of the air cathode assembly, and the like, as larger openings are made in the side wall of the can.

Second, a smaller number of air ports places greater reliance on lateral distribution of cathodic oxygen to those portions of the reaction surface of catalyst 34 which are laterally displaced from the air ports. As the number of air ports decreases without corresponding increase in the sizes of the air ports, the distance between any two of the remaining air ports is increased, whereby there is increased requirement for lateral transport of oxygen entering the cell at the respective air ports, and transport from the respective air ports to areas of the reaction surface displaced from the respective air port but still further displaced from any other of the air ports.

Third, the smaller number of air ports generally requires that the individual air ports, on average, be larger than when a larger number of air ports is used, whereby the potential for vapor loss, or gain, through ports 38, increases as the number of air ports is decreased.

In general, where the size of the air port exceeds about 0.060, the size of the air port also admits of passage of a wide variety of foreign objects into the cell through the respective air ports. Accordingly, air ports larger than about 0.060 inch are generally not used in cells of the "AA" size. Preferred air ports are no larger than about 0.050 inch. More preferred air ports are no larger than about 0.040 inch, while air ports as low as 0.030 are preferred for some embodiments. The most preferred air ports, for "AA" size cells, have cross-sections equivalent to openings about 0.010 inch to about 0.025 inch diameter.

It will be appreciated that the smaller the air port, the greater the variations in the dimensional uniformity of the cross-sections of the open areas defined by such air ports. While discussion here generally addresses circular openings, the cross-sections of the openings is greatly influenced by the methods, and fabrication controls, used in fabricating such air ports. Accordingly, a wide variety of cross-sections are contemplated for air ports 38, especially the smaller air ports wherein the feasibility of controlling the cross-section, when a port is fabricated, tends to be less precise as port size decreases. Some of such cross-sections will be fabricated intentionally. Others of such cross-sections are cross-sections necessarily following from the processes used to make such air ports.

Referring to FIGS. 18 and 30, stop groove 102 is formed in side wall 39 of the cathode can by urging a forming tool against the side wall at a suitable location and rotating the can, thus to bring the entire circumference of the cathode can into forming contact with the forming tool. A suitably-shaped mandrel (not shown) is preferably used to support the inside surface of the side wall across from the forming tool, thus to assist the forming tool in fabricating the stop groove.

Referring to FIG. 18, stop groove 102 provides a ledge 104 which receives and abuts against a corresponding step 106 (FIG. 3B) in the diameter of grommet 18.

Cathode Can Bottom Wall

The above-noted drawing, or drawing and ironing, or other can fabrication process, produces a cathode can pre-form, illustrated in FIG. 19, having the basic shape and structure representative of the finished cathode can. Side wall 39 has been formed to its full height. Bottom wall 37 is flat between bottom portions of the side wall.

The bottom and side walls of the pre-form are then further worked to provide the desired finished structure of bottom wall 37. The air ports described earlier are preferably fabricated in side wall 39 before such further working. However, to the extent fabrication of the air ports is compatible with air port fabrication after certain working of the bottom and side walls, such sequencing is acceptable.

As illustrated in FIGS. 20–28, in a variety of embodiments of cells of the invention, certain working or support of bottom wall 37 cooperates with corresponding working or support of the lower portion of side wall 39, or certain working or support of the lower portion of side wall 39 cooperates with corresponding working or support of bottom wall 37, in producing the finished structure at the bottom of the cathode can.

FIG. 20 represents further working of the bottom wall of FIG. 19 by a forming process illustrated in FIG. 20A. FIG. 20 illustrates a central elevated platform 108, and downwardly depending inner wall 110 extending from platform 108 to the lowest extremity 112 of the bottom wall. Inner wall 110 and the lower portion 114 of side wall 39, in combination, define a recessed annular slot 116 at the base of the can pre-form.

Referring to FIG. 20A, the can pre-form of FIG. 19 is placed on a hollow cylindrical lower tool 113. Tool 113 is rigidly mounted to an underlying support (not shown). Bottom wall 37 of the pre-form is disposed upwardly. The open end of the pre-form is disposed in a downward direction. An upper tool 115 advances downwardly against bottom wall 37 as shown by arrow 117. As upper tool 115 advances down, tool 115 pushes bottom wall 37 into the open central portion of lower tool 113. Correspondingly, side wall 39 is drawn upwardly toward the bottom wall as suggested by arrows 119. Tool 115 is advanced a predetermined distance, then stopped. Tool 115 generally does not abut tool 113, not even through bottom wall 37, but rather operates inside the walls of tool 113.

The overall result of the advance of tool 115, against the fixed support of can 28 by tool 113, is inward deformation of bottom wall 37 to form platform 108 and slot 116. Platform 108 and slot 116, and downward-most movement of tool 115, are illustrated in dashed outline in FIG. 20A.

After formation of slot 116, air cathode assembly 26 is inserted into the slot, as illustrated in dashed outline in FIG. 20. When the air cathode assembly is disposed in slot 116, inner surface 60 of current collector 32, at imperforate bottom edge portion 44, is disposed against the nickel layer on the corresponding interior surface 118 of wall 110. See also FIG. 3A.

The facing surfaces 60 and 118 form the contact surfaces whereby electrical energy transported to and from the air cathode assembly is transferred to and from cathode can 28. In order to implement such energy transfer, the contact surfaces 60, 118 are brought into intimate electrical contact with each other in such manner as to maintain such intimate contact throughout the life of the cell. Such intimate contact is generally developed by urging surfaces 60, 118 toward each other, either directly or indirectly.

Figure 21:
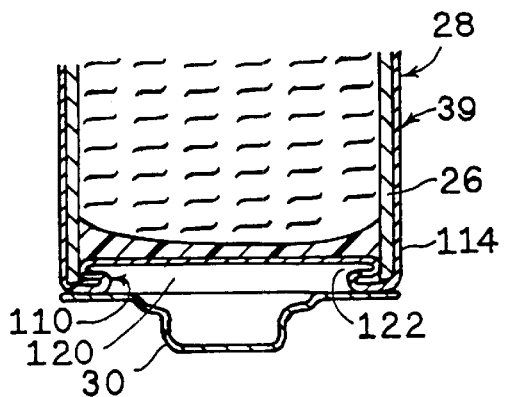
FIGS. 21–24 and 28 are representative cross-sections of bottom portions of cathode cans made using pre-forms of FIGS. 19 and 20.

Referring to FIG. 21, a forming tool (not shown) is inserted into the opening 120 above extremity 112 and below platform 108. The forming tool is turned about the circumference of inner wall 110, at the top of the inner wall and preferably against a supporting tool on the outer surface of lower portion 114 of side wall 39, thus to urge interior surface 118 of inner wall 110 against surface 60 of the current collector. As interior surface 118 is urged against surface 60, a bottom seal groove 122 is formed in inner wall 110. The recited forming of bottom seal groove 122 urges surface 118 of wall 110 into forced contact with inner surface 60 of current collector 32 thus to make the desired intimate physical and electrical contact.

In the alternative, instead of the forming tool being turned about the circumference of the can, groove 122 can be made by holding the forming tool stationary and turning the circumference of inner wall 110 about the forming tool.

In addition to established electrical contact with the current collector, the forcing of inner wall 110 against the air cathode, thus crimping inner wall 110 against the air cathode assembly, also traps or otherwise fixes the air cathode assembly in its specified especially longitudinal assembled position in the cell as well as generally defining its position with respect to the remaining elements of the cell. In addition, the crimping of inner wall 110 against the air cathode assembly also urges the air cathode assembly against the lower portion 114 of side wall 39, thus closing off any free path of travel for escape of electrolyte from the cell through slot 116. It may be noted by comparing FIGS. 20 and 21 that inner wall 110 of FIG. 21 has a lower height than the corresponding wall 110 of FIG. 20. The height of such wall 110 is thus adjusted depending on the ultimate configuration anticipated for the bottom structure of the cathode can.

Figure 22:
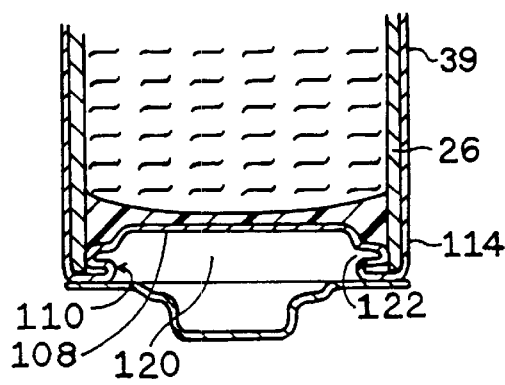

FIG. 22 illustrates a bottom structure much like the structure of FIG. 21, but with a higher height for inner wall 110 between the lowest extremity 112 and platform 108, and wherein bottom seal groove 122 is intermediate the upper and lower ends of wall 110. The advantage of the embodiment of FIG. 22 is that a wider variety of forming tools can be used to fabricate bottom seal groove 122. The respective advantage of the embodiment of FIG. 21 is that the height of inner wall 110, and thus of opening 120, is smaller than in FIG. 22, whereby the length of anode cavity 137, and the respective contained volume inside the completed cell 10, are correspondingly increased. The increased contained volume can be filled with additional anode mix 20 thus providing a potentially longer cycle life in the cell of FIG. 21 compared to the cell of FIG. 22.

Figure 23:
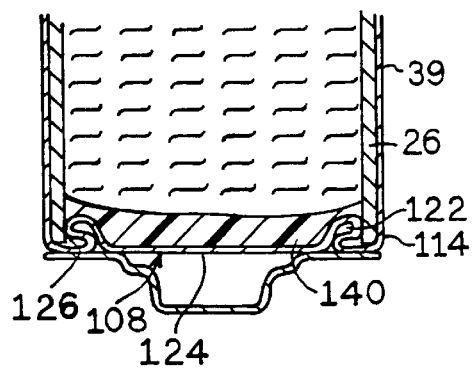

FIG. 23 shows another embodiment derived from the embodiment of FIG. 22. In FIG. 23, and after fabrication of bottom seal groove 122, platform, 108 of FIG. 22 has been urged downwardly such that bottom surface 124 of platform 108 is at the same height as bottom surface 126 of extremity 112. The result is a contained volume, inside the completed cell, even greater than the contained volume of the embodiment of FIG. 21.

Figure 24:
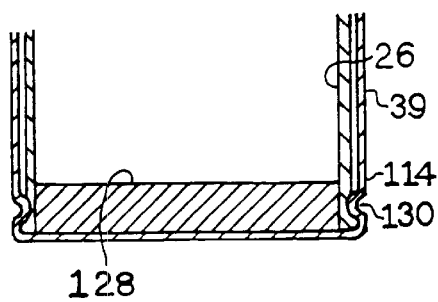

Referring back to FIG. 13. FIG. 24 represents an embodiment wherein no further fabrication is done to the bottom of the can prior to inserting the air cathode assembly into the can. Rather, the air cathode assembly is inserted into the can shown in FIG. 19. Next a conductive inner plug 128, for example in the shape of a disc, is inserted into the can, inwardly of, and juxtaposed closely adjacent, the inside surface of the current collector. Such conductive inner plug 128 can be, for example, nickel plated cold rolled steel, or any of the other materials recited for use in fabricating the cathode can. Plug 128 can also be formed from a nonconductive substrate such as a suitably hard plastic, suitably coated with a conductive material such as nickel.

A wide variety of shapes can be used for plug 128 so long as the respective plug provides suitable electrical contact, and suitable physical support to fixedly hold and secure the cathode assembly against the cathode can or other bottom closure member at the bottom of the cell.

A forming tool (not shown) is urged against the outer surface of lower portion 114 of side wall 39. The forming tool is turned about the circumference of side wall 39 against plug 128, thereby forming bottom seal groove 130 and establishing electrical contact between the current collector and plug 128. Accordingly, plug 128 must be suitably rigid and otherwise resistant to deformation about its circumferential edge to accommodate formation of groove 130.

In the embodiment shown in FIG. 24, the entire area of the bottom surface of plug 128 is in surface-to-surface contact with the top surface of bottom wall 37, thereby establishing effective electrical contact between plug 128 and bottom wall 37. Thus, plug 128 provides a path for flow of electricity between current collector 32 and can 28. Bottom wall 98 of the cathode can can have a wide variety of configurations so long as plug 128 is properly supported for formation of seal groove 120.

As in the previous embodiments, such turning at lower portion 114 can comprise either making the can stationary and moving the tool, or making the tool stationary and rotating the can. Rotating the can against a stationary tool is preferred. In any event, bottom seal groove 130 performs generally the same functions as bead 122.

Thus, in addition to establishing electrical contact between current collector 32 and plug 128, the forcing of side wall 39 against the plug, thus crimping side wall 39 against the plug, also traps or otherwise fixes the air cathode assembly in its specified position with respect to the remaining elements of the cell. In addition, the crimping of side wall 39 against the air cathode assembly, and thus against plug 128, closes off any free path of travel for escape of electrolyte from the cell past plug 128 and around the lower end of the current collector.

Figure 25:
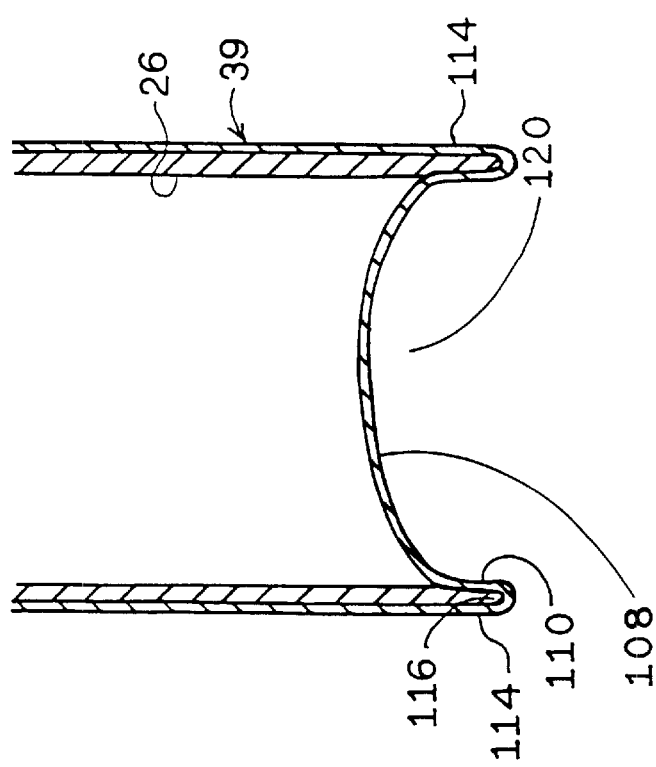
FIG. 25 is a representative cross-section of a second embodiment of a second stage pre-form, made from the pre-form of FIG. 19.

FIG. 25 represents a further embodiment of fabricating the bottom of the can prior to inserting he air cathode assembly into the can. In the embodiment of FIG. 25, an outwardly domed forming tool is urged against the outer surface of the bottom of the car, forming the illustrated upwardly-shaped dome in bottom wall 37. The resulting opening 120 is defined by an upwardly, typically spherically, curved surface wherein the curvature of inner wall 110 merges into central platform 108, thereby to form slot 116 between inner wall 110 and lower portion 114 of side wall 39.

Figure 26:
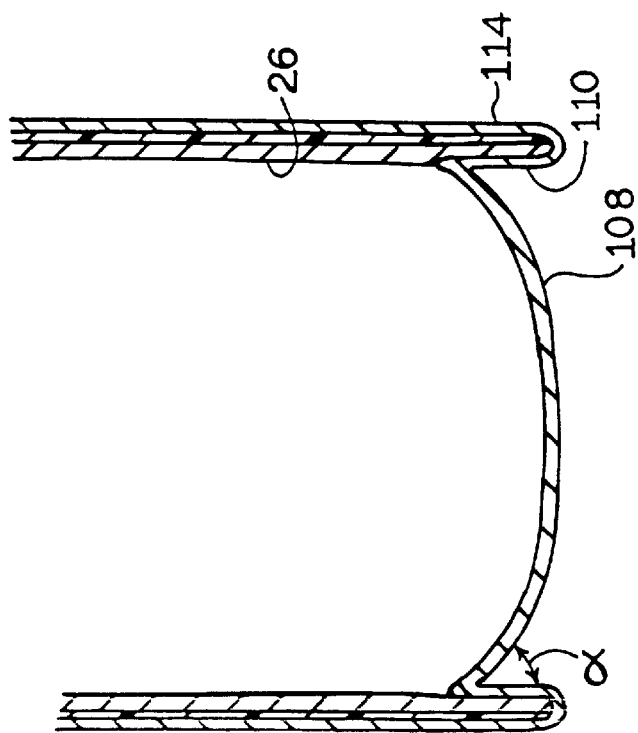
FIGS. 26–27 are representative cross-sections of bottom portions of cathode cans made using pre-forms of FIG. 25.

Air cathode assembly 26 is then inserted into the can, with the inner surface of bottom edge portion 44 of the current collector juxtaposed against inner wall 110. A downwardly domed forming tool, generally reflecting substantially the full transverse cross-section of the interior of the can, is then preferably but not necessarily urged against the inner surface of platform 108, forming the platform downwardly as shown in FIG. 26, and correspondingly urging the outer portions of the outer surface of platform 108 toward inner wall 110, thus to form an acute angle α with inner wall 110. The urging of the outer portion of platform 168 toward inner wall 110 urges inner wall 110 against the cathode current collector, thus to form the above recited intimate electrical and physical contact between inner wall 110 and air cathode assembly 26.

Figure 27:
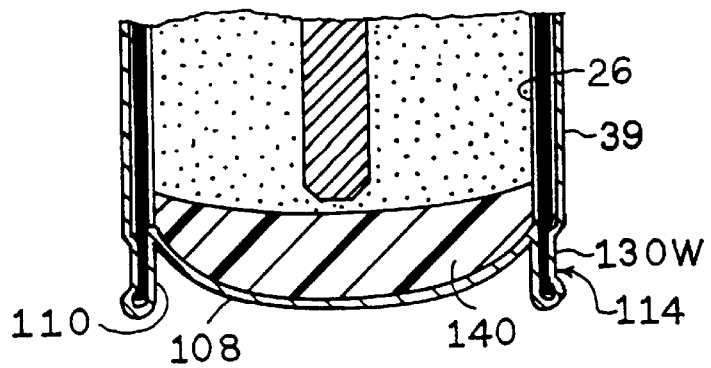

FIG. 27 represents a subsequent step being performed on the embodiment of FIG. 26. Referring to FIG. 26, a forming tool (not shown) is urged against the lower portion 114 of side wall 39, forming a wide bottom seal groove 130W.

Wide bottom seal groove 130W further solidifies and makes certain the electrical and physical contact effected by the downwardly directed forming step used to arrive at the bottom wall structure shown in FIG. 26. Wide bottom seal groove 130 also further enhances the bottom seal between the cathode can and the air cathode assembly.

Figure 28:
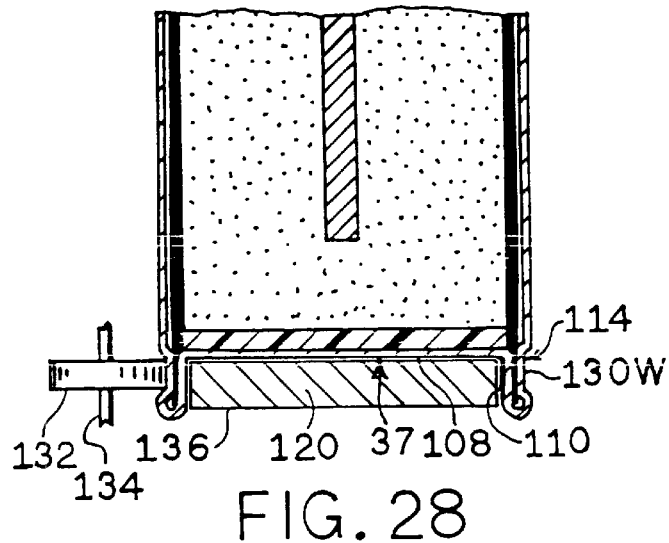

FIG. 28 represents still another embodiment of bottom wall structure which is derived from the embodiment of FIG. 20. After the cathode can is formed as in FIG. 20, a forming tool 132, mounted on e.g. shaft 134 is urged against the lower portion 114 of side wall 39. Forming tool 132 operates against the support of back-up tool 136 which is located inside, and substantially fills, the cross-section of opening 120. The result of the combined operation of tools 132, 136 is to form wide bottom seal groove 130W. The fabrication of wide bottom seal groove 130W, by urging lower portion 114 of side wall 39 against inner wall 110, with the back-up of tool 136 in place as shown, essentially crimps wall portions 114 and 110 against each other over greater than 50%, for example, 75%, of the height of inner wall 110. Namely, the air cathode assembly, especially the contact portion of the cathode current collector, is urged directly against inner wall 110, thus further solidifying and making certain the electrical and physical contacts initiated by the forming step used to form platform 108 and inner wall 110 as at FIG. 20A, to flat and vertical conditions respectively.

Certain parts of the working of bottom wall 37 are done before cell assembly, and certain other parts are done during cell assembly. The parts of the working of the bottom wall of the can which are done before cell assembly can be done either before or after fabrication of air ports 38.

The Separator

Figure 32:
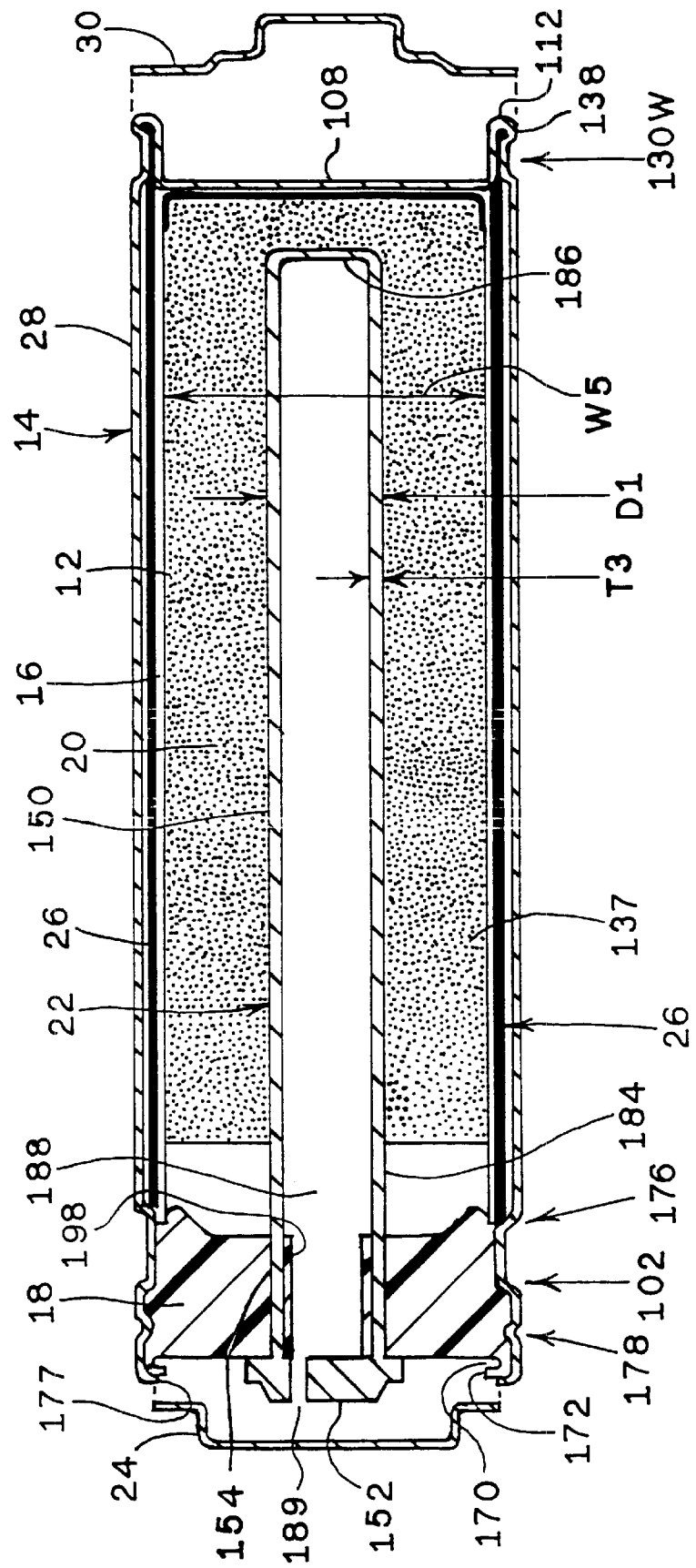
FIG. 32 is a cross-section of a cell of the invention as in FIG. 2, and employing a hollow tubular anode current collector as a mass-control chamber.

Separator 16 s positioned generally between air cathode assembly 26 and anode mix 20. Separator 16, in combination with bottom wall 98 of the cathode can and grommet 18, thus defines anode cavity 137 (FIG. 32). The overall function of the separator is to maintain physical and electrical separation between anode mix 20, in the anode cavity, and the air cathode assembly. While maintaining the recited physical and electrical separation, separator 16 is required to enable facile passage of electrolyte, especially hydroxyl ions, therethrough, between the anode cavity and the air cathode assembly.

Suitable materials for making separator 16 are, for example, a tightly woven nylon web, a microporous polypropylene web, a nonwoven polypropylene web or a cellulosic web. The separator can be coated with a suitable ion exchange resin. An exemplary material is Acropor, NFWA from Gelman Sciences, a resin-coated woven nylon cloth. In addition, any separator material known to be suitable for use in an alkaline $Zn/MnO_2$ cell can be used in cells of the invention, so long as the resulting separator has suitable porosity to pass electrolyte and hydroxyl ions while being generally impervious to passage of anode material and electric current. In general, preferred separator webs are coated on at least one surface with at least one of a number of well-known ion exchange resins.

The parent web from which the separator is ultimately fabricated is generally about 0.001 inch to about 0.005 inch thick, with preferred thickness of about 0.002 inch or about 0.003 inch. Such thicknesses and materials are well known in the art. Any separator material, of any thickness, generally known for use in alkaline electrochemical cells, can be used in cells of the invention.

Individual separators 16 are fabricated my cutting appropriate sized, e.g. rectangular work pieces from a larger parent web. Such work pieces are sized such that a length or height dimension of the separator can extend from the bottom of the cathode can, above slot 116, (FIG. 3A) to generally the top of the cathode current collector (FIG. 3B). Width of the separator work piece is sufficiently great to extend about 1.25 to about 1.5 times around the circumference of the inside surface of the air cathode assembly.

During cell assembly, separator 16 is positioned against the air cathode assembly, preferably in surface-to-surface relationship with the air cathode assembly over the entirety of that portion of the inner surface of the air cathode assembly which extends above slot 116.

In generally preferred embodiments, the separator is no adhered or otherwise bonded to the air cathode assembly. Experiments have shown that cells fabricated with the separator unbonded to the air cathode assembly produce greater closed circuit voltage than cells fabricated with the separator bonded to the air cathode assembly by e.g. an adhesive which is a combination of carboxymethyl cellulose and polyvinyl acetate, or the like. Thus, the inventors contemplate that normally-used adhesive may interfere with movement of the reacting ions in the cell especially at high rate demand levels.

Accordingly, in assembling a separator work piece into a cell, the separator work piece is generally formed into a cylindrical shape, with side edges overlapped. The cylindrically-shaped work piece is inserted into the cavity defined inside air cathode assembly 26, and optionally inside the cathode can, preferably without placing any adhesive on the separator for bonding the separator to the cathode assembly. The separator work piece is then released inside the air cathode assembly. The natural resilience of the separator work piece material causes the work piece to expand outwardly against the inner surface of the current collector. The natural resilience of the separator work piece then holds the separator work piece in place while additional elements of the cell are installed and secured in the cell.

On the other hand, if a gas bubble should occur at separator 16, such as between separator 16 and air cathode assembly 26, the cell output rate is reduced at high rate demands, and the overall cell output at high rate is reduced. Accordingly, in some embodiments where high rate demand is not a controlling issue, the separator can be adhered to the cathode current collector.

The Bottom Isolation Cup

As illustrated in FIG. 3A, a bottom seal member such as bottom isolation cup 142 can be disposed on the bottom of the anode cavity, in surface-to-surface relationship with the bottom wall of cathode can 28, between the positive electrode bottom wall and the negative electrode anode material. Cup 142 gas a bottom wall 144 disposed against central platform 108 of bottom wall 37 of the can, and a side wall 146 extending upwardly from bottom wall 144 and engaging against the inner surface of separator 16.

Side wall 146 of isolation cup 142 is formed while being inserted into the anode cavity by pushing an appropriately-sized circle of material through a forming tube (not shown) using a punch (not shown) which closely approaches the outline of the inner surface of the forming tube and the separator in the cell. The isolation cup is thus formed as part of the process of the circle of resiliently deformable material being pushed directly into the anode cavity of the cell, inside separator 16. Side wall 146 is thus formed and thereby engaged against separator 16, by the process of forming and placing isolation cup 142. In addition, the forming and placing of isolation cup 142 by the punch and forming tube further urges separator 16 outwardly against air cathode assembly 26, thereby further assuring proper expansion of the separator against the air cathode assembly.

The function of isolation cup 142, after being placed and positioned in the cell, is to serve as a platform for, and to assist in, physically and electrically isolating the anode mix, in the anode cavity, from bottom portions of the cathode can. For example, isolation cup 142 is physically interposed between the anode mix and central platform 108.

Isolation cup 142 can be made from any of the same materials, and in the same thicknesses, as can be used to fabricate separator 16.

As illustrated in FIG. 3A, the isolation cup is positioned inwardly of separator 16 at and in surface-to-surface relationship with, the bottom of can 28. In general, the isolation cup is placed in the can, inwardly of the separator, and at the bottom of the separator and the bottom of the can, after the separator has been positioned inside the air cathode assembly. In such arrangement of separator and isolation cup, the combination of the separator and isolation cup covers the entirety of the otherwise exposed surface area of the cathode current collector.

The isolation cup and the separator form, between themselves, a joint 148 which extends from the top of side wall 146 to the bottom-most interface of separator 16 with side wall 146 adjacent bottom edge 150 of separator 16.

In an alternate structure (not shown), isolation cup 142 is inserted first into the anode cavity, followed by insertion of separator 16. In such embodiment, side wall 146 of the isolation cup is disposed against cathode assembly 26 at cathode current collector 32. The lower edge of the separator is at the upper surface of bottom will 144 of the cup. The bottom portion of the separator is in face-to-face relation to side wall 146, while the remainder of the outer surface of the separator is in face-to-face relation to the cathode assembly at current collector 32.

Bottom Seal

As illustrated in e.g. FIG. 3A, bottom seal 140 can be positioned over isolation cup 142, at and about joint 148, and up against separator 16 above joint 148.

The function of bottom seal 140 in such embodiment is to serve as a cap, and to assist in forming a bottom covering over the bottom wall of the cathode can, physically and electrically isolating the negative electrode anode mix, in the anode cavity, from bottom portions of the positive electrode cathode can. For example, bottom seal 140 is physically interposed as a mass of material, imperforate, and generally impregnable to the anode mix, between anode mix 20 and isolation cup 142, between anode mix 20 and separator 16 at loci above joint 148, and between anode mix 20 and joint 148.

Bottom seal 140 is placed in the bottom of the cathode can after the air cathode assembly has been installed, preferably after the air cathode assembly has been fixed in place, after the separator has been installed, and after any isolation cup has been installed. The separator, and preferably any isolation cup, are no fixedly mounted to any other element at this stage of the assembly. The separator is, rather, held in place by the natural cylindrical restorative forces of the material from which the separator work piece is fabricated, by the restorative assist applied by isolation cup 142, and by the tooling used to install isolation cup 142. The isolation cup is held in place by friction between side wall 146 of cup 142, and the separator, the friction being associated with restorative forces in side wall 146.

Bottom seal 140 can be placed in position at the bottom of the anode cavity in either solid or liquid form. When placed in the cavity in liquid form, a nozzle is inserted into the cavity, adjacent the bottom of the cavity, and the liquid material is dispensed toward the bottom of the cavity. In preferred ones of such embodiments, the can is spinning during such dispensing, to preferably distribute the seal material about the bottom of the cavity, including about the entire circumference of joint 148. All the other elements in the can at that time are generally at ambient temperature, whereby the seal material is rapidly cooled, and solidifies in a short time.

In preferred embodiments, the seal material is placed in the bottom of the cathode can in solid form, preferably as a single pellet of material. When placed in the cavity in solid form, one or more solid pellets of the seal material are placed in the bottom of the cathode can cavity. For a "AA" size cell, about 0.25 gram of solid polymeric seal material is sufficient to provide an effective bottom seal A heater can then be placed against or adjacent the outside surface of the bottom wall of the cathode can. A suitable heater is a contact heater which transfers heat to the can by conduction. Alternatively, the bottom wall of the cathode can is heated by a radiant or hot air heater. Further, a stream of e.g. hot air can be directed against the solid sealant pellet from inside the can, thus to melt and distribute the pellet. For purposes of simplicity and effectiveness, a contact heater, such as a hot plate or the like, heating bottom wall 37 of the can is referred.

Figure 29:
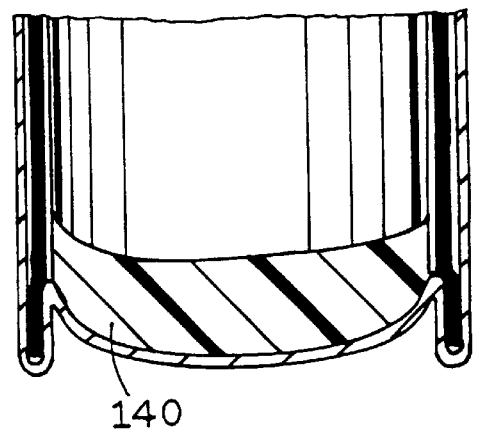
FIG. 29 is a photograph showing a cross-section of the bottom portion of a partially assembled cell, configured as the bottom portion of the cell in FIG. 26, and made using in situ melting as the method of placing the bottom seal.

By whatever method, sufficient heat is transferred through the bottom wall of the cathode can to melt the pellet of seal material, or is conveyed to the pellet in some other manner effective to melt the pellet. The melted sea material flows as it melts, spreads out over the inner surface of the bottom of the cavity defined inside the can, and moves some distance up the sides of the separator. FIG. 29 is representative of a photograph showing such in situ melted bottom seal material 140 after the seal material has melted, has distributed itself, including up the side wall of the can, without resorting to centrifugal force, and has re-solidified. Centrifugal force can be used to distribute the melted material, if desired.

In general, one or the other of the bottom isolation cup (FIG. 2) or the bottom seal (FIGS. 21–23, 27, 29–30) are used as the bottom seal member in a given cell. Some embodiments use both the isolation cup and the bottom seal (FIG. 3A). When plug 128 is used, the plug takes on the electrical properties of the bottom wall, whereby isolation cup 142, or seal 140, or both, are disposed between the anode material and the plug. Thus, in these embodiments, the plug functions as a portion of bottom wall 37.

FIG. 29 shows an embodiment wherein isolation cup 142 is not used. FIG. 3A illustrates the relationship of the seal to the isolation cup where the cup is used. As seen in FIG. 3A, the isolation cup is disposed between bottom wall 37 and bottom seal 140, and covers the entire circumference of the top of joint 148. Thus, bottom seal 140 provides an additional barrier, e.g. at joint 148, to electrolyte traveling along the inner surface of the separator, downwardly around bottom edge 59 of the current collector, and the bottom edge of the diffusior member, and thence out of the cell at an air port 38. A first barrier is the above recited crimp of the can as at seal groove 130 or 130W at flange 138 against inner wall 110 through current collector 32 and air diffusion member 36. A second barrier is joint 148 between the separator and side wall 146 or isolation cup 142. The bottom seal 140 is thus a third barrier to electrolyte leakage at the bottom of the cell.

Bottom seal 140 can be made from any polymeric material having suitable dielectric properties, having suitable chemical tolerance for the alkaline environment inside the cell, and having a melting temperature to accommodate placement and melting of the seal material in the cell without deleterious distortion of any of the other materials in the cathode can at the time the seal material is introduced into the can and distributed by heating.

As used herein, "melting temperature" refers to that minimum temperature where the polymer as a whole is subject to fluid flow. Such definition allows for unmelted included particles so long as the melt phase is the continuous phase.

While no minimum melting temperature is contemplated, materials found to have the properties described above generally have melting temperatures of at least about 350 degrees F., for example linear low density polyethylene.

At the upper end of the range, melting temperatures are acceptable in some embodiments up to about 650 degrees F. Above the recited upper end of 650 degrees F., the heat required to melt the respective seal material causes deleterious affect on at least one other element present in the cathode can when the seal material is melted in the can.

Thus, a wide variety of thermoplastic materials such as polyolefin and olefin copolymer compositions can be used for bottom seal 140. There can be mentioned as specific examples of such materials, without limitation, the low density polyethylenes, the ethylene vinyl acetates, the linear low density polyethylenes, mixtures and copolymers of the above materials, and the like.

The Anode

Anode 12 includes electroactive anode mix 20, and anode current collector 22 centrally disposed and in intimate physical and electrical contact with the anode mix. Anode current collector 22 is held in position in the cell, and is electrically isolated from the cathode, by grommet 18.

The primary function of the anode is to react zinc metal with hydroxyl ions to thereby produce electrons according to the anode half reaction, the reaction correspondingly producing zinc oxide. The locus of such anode reaction is initially located adjacent the air cathode assembly in a fresh unused cell and, as the cell is used, the locus of reaction moves, generally as a reaction front, from the region of the cathode assembly toward the anode current collector.

Figure 31A:
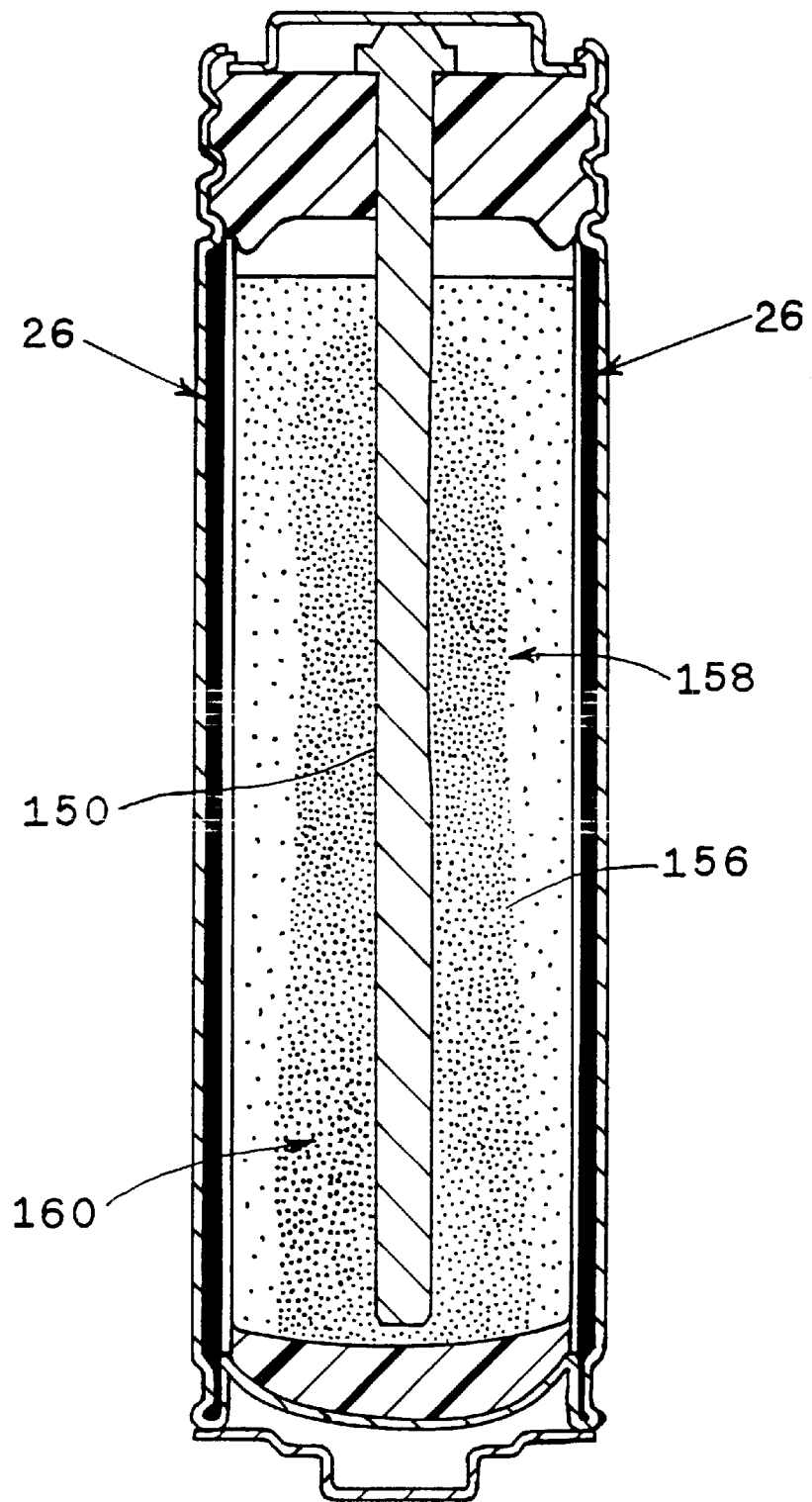
FIG. 31A is a representation of a photograph showing a cross-section of a portion of a cell which has undergone significant discharge, wherein the zinc was loaded into the anode cavity in generally dry condition, and illustrating progression of the reaction front from the cathode current collector toward the anode current collector.

FIG. 31A illustrates a cell of the invention after significant discharge, and thus illustrates the general nature of the movement of reaction front 156. As seen in FIG. 31A, the relatively less-densely stippled anode mix material 158, generally emanating inwardly from air cathode assembly 26, is reacted zinc oxide. The relatively more-densely stippled anode mix material 160, generally disposed about the lower portion of the anode current collector, is unreacted zinc.

The Anode Mix

In general, anode mix 20 can be any anode mix that is known for use in a zinc electrochemical cell operating in an aqueous alkaline environment, and especially any anode mix used in an alkaline cell, including an alkaline air depolarized cell.

In general, such anode mix includes about 25% by weight to about 45% by weight potassium hydroxide, about 55% by weight to about 75% by weight particulate zinc, and suitable additives. Exemplary metal additives include bismuth, indium, cadmium, lead, and/or aluminum, as well as others known in the art. In a preferred embodiment, the additive package includes lead, indium, and aluminum. The indium is preferably present as indium compound in sufficient fraction to enable increased rate of electrochemical output of at least the anode portion of the electrochemical cell. A preferred amount of indium in the indium compound is about 0.02% by weight to about 0.5% by weight, based on the weight of the particulate zinc.

The aqueous potassium hydroxide liquid contains about 30% by weight to about 40% by weight, preferably 32.5% by weight to about 37.5% by weight, KOH.

The anode mix preferably also includes about 0.1% by weight to about 0.4% by weight of an organic surfactant comprising hydroxyethylcellulose, and may include from 0.0% up to about 12% by weight mercury, the percentages of the organic surfactant, and the mercury where appropriate, being based on the weight of the zinc. The anode mix generally also contains about 0.1% by weight to about 1.0% by weight, based on the weight of the zinc, of a gelling agent,and zinc oxide in amount of about 1% by weight to about 4% by weights, preferably about 2% by weight, based on the weight of the potassium hydroxide.

Th above anode mix is prepared as follows. A dry solid powder coating composition comprising equal amounts of organic surfactant, gelling agent, and MgO is added to a desired amount of particulate zinc, in amount of about 3% by weight coating composition to about 97% by weight particulate zinc, and mixed in a coating and mixing step to form a first dry-coated mixture of particulate zinc and the coating composition. At that point, especially the organic surfactant and the gelling agent are coated on the surfaces of the zinc particles, but have not yet, in general, been activated.

The dry coated zinc mixture is then mixed, 2 parts fresh uncoated zinc particles with 1 part of the coated zinc particles mixture to form a second mixture of coated zinc particles with uncoated zinc particles, whereby each component of the coating is then present at a concentration of about 0.33% by weight of the second mixture.

It will be understood, of course, that some of the coating material will transfer from the coated particles to the uncoated particles during the mixing of coated and uncoated particles. However, such transfer does not severely adversely detract from the benefits of using the combination of coated and uncoated zinc particles.

Indium compound, with or without other additives, is then added to, and mixed with, the second mixture in the desired amount, such as about 0.02% by weight to about 0.5% by weight indium in the indium compound, based on the weight of the second mixture, to make a third dry mixture including the indium compound. The third dry mixture includes (i) zinc particles coated with surfactant, gelling agent, and MgO, (ii) the zinc particles added after the coating and mixing step, and (iii) indium compound.

For the above indicated size "AA" cell, about 8.5 grams of the third dry mixture can be placed into the anode cavity inside cathode can 28, inside separator 16 and above bottom seal 140 or isolation cup 142, the about 8.5 grams of dry mixture providing the preferred about 57% by weight of the material which will eventually be the full weight of anode mix 20.

Aqueous potassium hydroxide (about 33 percent by weight KOH in aqueous solution) can be used without any additives. A preferred potassiurm hydroxide is prepared for use in the anode by adding to a quantity of aqueous potassium hydroxide preferably about 2% by weight ZnO.

The resulting potassium hydroxide has a fluid consistency resembling that of water. No other additives need generally be used to prepare the potassium hydroxide for use in making the anode mix 20.

The so prepared potassium hydroxide is added to the third dry mixture in the anode cavity, in amount to provide the preferred about 33% by weight of electrolyte in the finished anode mix 20. When the liquid potassium hydroxide is placed in the anode cavity, the potassium hydroxide coacts with the gelling agent, converting the anode mix from a consistency resembling water to a gel consistency, in situ in the anode cavity.

In any of the embodiments, the zinc oxide need not be initially provided in the alkaline electrolyte mixture, as an equilibrium quantity of zinc oxide is ultimately self-generated in situ over time by the exposure of the zinc to the alkaline environment and operating conditions extant inside the cell, with or without addition of zinc oxide per se. The zinc used in forming such zinc oxide is drawn from the particulate zinc already in the cell, and the oxygen is drawn from hydroxyl ions already in the cell.

Any of the conventionally known gelling agents can be used in any conventionally known amounts. Preferred gelling agent composition is carboxypolymethylene, available from B.F. Goodrich Company. Cleveland, Ohio. under the trade name CARBOPOL®. Preferred amount of the CARBOPOL® gelling agent is about 3% by weight, based on the weight of the zinc particles.

When surfactant is present in the alkaline electrolyte together with the zinc, the surfactant is believed to be chemically adsorbed on the surface of the zinc through the metal soap principle to form an hydrophobic monomolecular layer which provides a corrosion-inhibiting effect at the zinc surface, while at the same time making the zinc sufficiently available for the electrochemical oxidation reaction that the desired rate of production of electrochemical power can be maintained under heavy loading of the cell.

A suitable surfactant is available from Aqualon company. Wilmington, Del., as "Natrosol®." The Natrosol® surfactant is an hydroxyethylcellulose-based surfactant. While choosing not to be bound by technical theory, applicants believe that the hydroxyethylcellulose-based surfactant is at least in part enabling of the greater rates of power generated by anodes made with such material, and thus the increased rate of electrochemical output from such cells.

In the above illustrated method of making anode material 26, the indium compound is added to the mixture after the organic surfactant is mixed with the particulate zinc.

An indium compound preferred for use herein is indium hydroxide. Methods of making suitable indium hydroxide are disclosed in U.S. Pat. No. 5,168,018 Yoshizawa, and thus are well known.

When indium hydroxide powder is mixed with the particulate zinc, the indium hydroxide powder may coat the zinc particles. When the potassium hydroxide is added to the particulate zinc, part of the indium hydroxide may be electrodeposited onto the surfaces of the zinc particles through the principle of substitution plating, thereby raising the hydrogen overvoltage on the respective surfaces of the zinc particles. Any remaining portion of the indium hydroxide which is not so electrodeposited is believed to be retained in solid form in the alkaline electrolyte.

This "remaining portion" of indium hydroxide, if any, may be electrodeposited onto fresh surface of zinc exposed when the zinc is subjected to discharging, whereby the "remaining portion" of the indium can deposit on newly formed surface area of the zinc particles to thereby protect such newly formed surface areas from unwanted side reactions.

The smaller the particle size of the indium compound, the better the dispersion in the alkaline electrolyte, so that the indium compound can be effective uniformly throughout the anode mix. If the indium compound particle is too small, however, it may be immediately dissolved in the alkaline potassium hydroxide whereby the amount of the indium compound available to be used after partial discharge of the cell may be insufficient.

The potassium hydroxide need not have any additives, although use of the ZnO as indicated above is preferred. The optional use of ZnO discussed above is well known, so is not discussed further here.

The amount of potassium hydroxide can vary from a low of about 25% by weight of anode mix 20 to a high of about 45%. The balance of the anode mix is made up primarily of the particulate zinc, making allowance for the noted preferred additives. Preferred concentration for the potassium hydroxide is about 27% to about 40% by weight, with a most preferred concentration of about 30% to about 37% by weight of the anode mix.

The particulate zinc can generally be made from any battery grade zinc composition. Preferred particle size is about 100 to about 500 microns average, with at least about 90 weight percent of the zinc being within the stated range.

In a first series of embodiments of the anode material wherein dry zinc composition is placed in the anode cavity followed by addition of electrolyte, the zinc preferably includes a small amount of lead as an alloying agent, such as about 200 parts per million (ppm) by weight to about 1000 ppm by weight based on the weight of the particulate zinc. Preferred amount of lead is about 500 ppm by weight, or less. For use in the dry zinc addition method, indium preferably comprises no more than 5 ppm by weight of the particulate zinc alloy.

In the illustrated embodiments, the composition of the anode mix may include mercury as a functioning component therein. The amount of mercury car, however, be reduced as compared to conventional alkaline electrochemical cells. While an overall range of 0.0% by weight to about 12% mercury by weight is contemplated, preferred range for the mercury is up to about 3% by weight. A more preferred range is about 1% by weight to about 3% by weight mercury. Where suitable hydrogen overvoltage can otherwise be obtained, the preferred anode composition is free from effective amounts of mercury. However, where mercury is used, preferred particulate zinc is amalgamated such that the surface of the zinc bears an equivalent proportion of the mercury content to that of the bulk of the zinc.

While the precise mechanism is not fully understood, and while applicants choose to not be bound by technical theory here, applicants believe that mercury, where used, and in the presence of the indium and the organic surfactant, facilitates an increased electrochemical reaction rave capacity in the anode, thus releasing electrons from the zinc at an increased electrochemical reaction rate, enabling a faster discharge of the cell under high rate conditions.

The method of associating mercury with the zinc is not critical. Thus, mercury can be associated with the zinc as by physically mixing mercury with the zinc particles, by alloying mercury with zinc, by solution displacement reaction, and the like.

In the recently above noted embodiments, the particulate zinc alloy is preferably free from functionally detectable amounts of indium. To the extent the particulate zinc may comprise indium as an alloy component therein, the amount of indium alloyed with the zinc is generally less than 100 ppm by weight, based on the weight of the zinc.

It is believed that indium compound in the anode composition, separate from any indium alloyed in the zinc, provides a trigger mechanism enabling the desired high reaction rate in the anode mix. Conventional cells, on the other hand, exhibit steadily declining voltage under high drain rates, which suggests that the reaction rate of the electrochemical reactions in such cells is insufficient to maintain a constant voltage at high drain rates.

While the preferred embodiments have been described with respect to using indium hydroxide as the indium compound, indium chloride and indium sulfate are also contemplated to work as well, and so are within the scope of the invention. Applicants further contemplate that indium bromide, indium oxide, and indium sulfide, as well as other indium compounds, may work in place of the disclosed indium hydroxide.

Additional metal compounds contemplated to work, in addition to or in place of the indium compound, are compounds of cadmium, gallium, thallium, germanium, tin, and lead. Respectively, such compounds as CdO, $Ga_2O_3$, $Tl_2O_3$, $GeO_2$, SnO, and PbO are contemplated.

In a second series of embodiments, the additive package includes about 0.1% by weight to about 0.5% by weight, preferably about 0.2% by weight to about 0.4% by weight, of a solid polyethylene oxide surfactant such as those disclosed in U.S. Pat. No. 5,128,222 Yoshizawa et al and U.S. Pat. No. 5,308,374 Yoshizawa et al, for example Surflon® S-161, available from Asahi Glass Company. Tokyo, Japan; about 0.1% by weight to about 0.5% by weight, preferably about 0.2% by weight to about 0.4% by weight. of indium hydroxide, about 0.1% by weight to about 0.5% by weight, preferably about 0.2% by weight to about 0.4% by weight, of polyacrylic acid gelling agent; and about 0.1% by weight to about 1.0% by weight, preferably about 0.3% by weight to about 0.8% by weight, of a gelling agent such as the above mentioned CARBOPOL carboxypolymethylene.

In the above described composition, the polyacrilic acid gelling agent can be a material such as potassium polyacrylate, for example Aridall 1460 from Chemidal Corporation, Palatine, Ill., USA and may operate as a viscosity modifier, in combination with operating as a "superabsorbent," and such properties may operate on the basis of cross-linking of such material.

The particulate zinc is alloyed with bismuth, indium, and calcium in amounts of about 300 ppm by weight bismuth, 300 ppm by weight indium, and 300 ppm by weight calcium. This embodiment is preferably devoid of mercury because of environmental concerns; however, cells of the invention are readily operable when mercury is included in the anode mix in well known amounts.

In this second series of embodiments, the potassium hydroxide electrolyte is combined with the particulate zinc before the zinc is placed in the anode cavity. The sequence of steps for making the anode mix is as follows.

An aqueous potassium hydroxide electrolyte composition is made at a concentration of 37.5% by weight KOH. 3.7% by weight zinc oxide. An aqueous surfactant composition is made by mixing solid Surflon® S-161 surfactant solids with water at a 10% solids concentration.

999 grams of the KOH solution are mixed with 0.9 gram of the surfactant solution. 0.9 gram of solid indium hydroxide, 9.0 grams Aridall 1460, and 14.4 grams CARBOPOL© 940. The resulting composition is mixed vigorously for about 15–18 minutes until a thoroughly mixed composition is obtained. The resulting gel is then aged for e.g. 16 hours at room temperature.

After the proper aging, 1976 grams of particulate zinc is added to the gel and mixed in a moderate speed until an homogeneous finished anode mix 20 is obtained.

Greater or lesser amounts of each of the alloying materials alloyed with the zinc can be used in various embodiments. Typically, the amount of any one alloying material is in the range of about 50 ppm by weight to about 750 ppm by weight. Where the amount is less than about 50 ppm by weight, the affect is generally insufficient. Where the amount is greater than 750 ppm, the desired affect is generally not enhanced.

A variety of other zinc alloys are acceptable. There can be mentioned, for example, combinations of bismuth-indium-aluminum-lead, aluminum-indium-lead, bismuth-indium-lead, indium-lead, and lead only. One preferred zinc alloy contains 500 ppm lead as the only significant alloying material. Another alloy contains 500 ppm lead. 300 ppm indium, and 70 ppm aluminum. Yet another alloy contains 500 ppm lead and 300 ppm indium. In addition, cells of the invention can employ any other zinc alloy known for use in a zinc electrochemical cell operating in an aqueous alkaline environment.

The surfactant can be, in addition to the specific surfactant compositions disclosed, any surfactant known for use in a zinc electrochemical cell operating in an aqueous alkaline environment.

Anode Current Collector

In a first embodiment illustrated in e.g. FIG. 2, anode current collector 22 includes an elongate shank 150, and a head 152 on one end of the shank. Head 152 can serve as the anode terminal as illustrated in FIG. 1, or can be in intimate electrical contact with anode cap 24 as suggested in FIG. 2. Preferably, current collector 22, and especially shank 150, is symmetrically shaped. Most preferably, shank 150 is in the shape of a solid round rod. In cell 10, shank 150 is immersed in, and is in intimate electrical contact with, anode mix 20.

The function of current collector 22 is to collect electrical energy, produced by electroactive reactions in the anode, and to conduct the electrical energy, as electric current between the anode mix and the anode terminal. The functioning of the current collector requires at east a minimum threshold amount of surface area on shank 150 to be in intimate contact with anode mix 20 in order to "collect" the electric current produced in the anode mix.

In electrochemical cells of the invention, the anode current collector is not the primary electroactive anode material, but is rather a receiver and transporter of the electricity produced at the mass of electroactive anode material, the mass of electroactive anode material, namely anode mix 20, being the primary electroactive anode material. As usual, the current collector can be affected by side reactions such as oxidation, not per se productive of useful electric energy. And while the anode current collector can participate in the primary electroactive reaction on a secondary basis, the primary electroactive reaction is primarily carried out based on the reactivity of anode mix 20, not the typically and generally unreactive current collector 22.

The outer surface of shank 150 is finished to a desired uniform surface smoothness, and is preferably free of deviations from the general surface finish. Such deviations might be, for example, burrs, nicks, and scratches, which would add surface area and thus promote an unnecessary amount of gassing, especially where the surface of shank 150 may be plated with a gas suppressing plating material. Non-symmetrical current collectors can be used, provided accommodating modifications are made in cooperating ones of the other elements, for example grommet 18, with which the current collector interfaces and cooperates.

The anode current collector should efficiently collect current, and should conduct the current so collected to the anode terminal with minimal loss to internal resistance. Thus, in addition to the physical characteristics of the outer surface providing an efficient collector of electrical energy, the outer surface of the composition of current collector 22 should be a good conductor of electricity.

In general, known and commonly used current collectors incorporate large fractions of copper in their compositions because copper is a cost effective, good collector and good conductor, having low internal resistance. The particular composition selected for the anode current collector depends on the use anticipated for the cell, the environment in which the cell will be used, and the known efficiency of the materials under consideration, for collecting and conducting electricity under the anticipated use, and use environment, conditions. For primary cells, discharge capacity for a single discharge is a prominent consideration. Oxidation of the anode current collector, on the other hand, is of little concern so long as no oxidation occurs that would impede operation of the cell until after the cell is fully discharged.

Pure copper is generally not satisfactory for use as current collector 18, ever under primary cell conditions. Accordingly, the copper is mixed or alloyed with additives, and/or the current collector is plated with, for example, tin, gold, or other oxidation suppressing plating material in order to obtain the desired collection and conduction properties in the current collector, without incurring unacceptable levels of oxidation of the current collector.

As suggested by the above noted plating, properties of collecting and conducting current are substantially controlled by the composition of the material at the outer surface of current collector 22. Accordingly, the current collector can comprise a substrate made of any of a variety of materials selected for other than current collecting or current conducting properties. Such substrate has the general size and shape desired for the finished current collector. The substrate material can be selected based on, for example, weight, cost, strength, or the like. The substrate is coated, such as by plating, cladding, or the like with an outer layer having desired properties associated with collecting and conducting electrical energy. The material used as the coating can also be used as the substrate, as in FIG. 2, whereby the coating per se is obviated.

It is known to use, for example, a number of brass compositions in making current collectors, such as 50% by weight to 80% by weight copper, and respectively 20% by weight to 50% by weight zinc. Specific examples are 70% by weight copper and 30% by weight zinc, 65% by weight copper and 35% by weight zinc, 60% by weight copper and 40% by weight zinc, and 50% by weight copper and 50% by weight zinc. Such materials can be used as the entire mass of the current collector, or as a coating on an underlying substrate. Multiple effective coating layers can be used on a substrate so long as the electrically effective outer layer exhibits the desired collection and conduction properties.

The above-noted brass compositions are sufficiently effective at suppressing oxidation as to be acceptable for use in primary cells which employ a single discharge cycle before the cell is disposed of. In general, the higher the copper fraction, the lower the internal resistance in the current collector. Similarly, the lower the copper fraction, the higher the internal resistance. It is known to use an anode current collector composition having cooper modified with up to about 11% by weight silicon, and generally comprising up to about 0.5% manganese, and the balance copper. A most preferred anode current collector is a brass substrate having about 60% by weight copper and about 40% by weight zinc, and plated with tin over the brass.

In general, the anode current collector is assembled to grommet 18 by pushing shank 150 through aperture 154 in the grommet. The combination grommet-current collector is then emplaced in the can, with concurrent driving of shank 150 of current collector 22 into zinc anode fix 20. This brings he shank into intimate electrical contact with the zinc anode mix.

The Grommet

Referring to FIGS. 3B and 18, in the embodiments illustrated, grommet 18 has a first major diameter 162, generally corresponding with the general inner diameter of the cathode can, an intermediate diameter 164, and a minor diameter 166. Ledge 106 defines a step diameter change between major diameter 162 and intermediate diameter 164. Ledge 168 defines an arcuate diameter change between intermediate diameter 164 and minor diameter 166. Central aperture 154 extends through the grommet, from top to bottom, and is operative to receive shank 150 of anode current collector 22 while excluding head 152, thus to present head 152 for electrical contact with either an outside circuit or anode cap 24 (FIG. 2).

The functions of grommet 18 are generally as follows. First, the grommet provides cell closure at the top of the cell, preventing escape, such as by leakage, of materials of the anode mix, especially leakage of electrolyte.

Second, the grommet provides structural integrity to the top of the cell, in cooperation with the hoop strength of especially the cathode can, to resist transverse crushing of the cell at the top portion of the cell.

Third, the grommet is made of an electrically insulating, preferably polymeric, material, such as for example nylon, which electrically isolates the anode current collector from any transmission of electricity through the grommet, between the anode and the cathode. Certainly, other materials can be used to make grommet 18 so long as they provide the above described functions. There may be mentioned, for example. polypropylene, certain of the polyethylenes and other polyolefins and olefin copolymers, and the like as materials useful for making grommet 18.

Fourth, at and below ledge 168, the grommet at minor diameter 166 interfaces directly with air cathode assembly 26, and indirectly with separator 16, in some embodiments directly with separator 16, thereby to trap the air cathode assembly and the separator between he grommet, at minor diameter 166, and the cathode can at an upper portion of side wall 39.

Referring especially to FIG. 18, ledge 106 is fabricated in the grommet, and stop groove 102 is fabricated in the can side wall, before the grommet is assembled into the can, such that the stop groove receives ledge 106, and thereby stops downward movement of the grommet into the can when the grommet has been pushed the desired distance into the can. Namely, ledge 106 and stop groove 102 cooperatively stop movement of the grommet inwardly into the can when the grommet is properly positioned in the can with the rest of the cell elements during cell assembly.

With ledge 106 of the grommet properly positioned on ledge 104 of stop groove 102, ledge 106 of the grommet comes into generally controlling engagement with the air cathode and separator, as is discussed in more detail hereinafter.

As seen especially in FIG. 18, a properly positioned grommet 18 fills the entire cross-section of the top opening of the cathode can, thus closing the top of the can to ingress into, or egress out of, the anode mix-receiving cavity 137 inside the cell. Still referring to FIG. 18, when the grommet is properly seated in the cell, top 169 of the grommet is modestly below the top of the can. The top of the can is then crimped over as illustrated in FIGS. 1 and 18. Note also FIG. 2 wherein anode cap 24 is shown optionally placed on top of the grommet before the crimping, thereby to crimp the anode cap to he top of the cell at cap slots 170.

End Caps

Anode end cap 24 is positioned at the anode end of the cell, in electrical and preferably in physical contact with head 152 of the anode current collector. The anode end cap is not used in all embodiments. Where anode end cap 24 is used, the anode end cap is secured in position at slot 170 by the crimping of the top of side wall 39 of the cathode can inwardly and downwardly against the anode cap at cap slot 170. In such embodiments, the upstanding top distal ridge 172 of the grommet is crimped inwardly along with the top edge of the cathode can such that ridge 172 serves to separate, so as to physically isolate, and electrically insulate, the top edge of the cathode can from the top surface of anode cap 24.

Such crimping of side wall 39 and top distal ridge 172 over the anode cap in fixing the anode cap in place is suggested in FIG. 2. Preferably, electrical contact, between she anode cap and head 152 of the anode current collector, is ensured by lightly tacking the anode cap to head 152 by, for example, welding the anode cap to head 152 of the anode current collector.

Closure of the cell by inwardly crimping the top edge of the cathode can side wall downwardly and inwardly against ridge 172 of the grommet, without using an anode end cap, is comprehended in the invention, and is illustrated in FIG 18. In such embodiment, head 152 of the anode current collector operates as the anode terminal of the cell.

Cathode end cap 30 is positioned at the cathode end of the cell, typically at the distal edge of flange 138. Cap 30 is securely affixed to the bottom of the cathode can, preferably by welding the cathode cap to flange 138 of the cathode can.

As illustrated, the anode and cathode caps exhibit traditional cross-sectional shapes for anode and cathode caps on round electrochemical cells. Other cross-section configurations can be used if desired, and a wide variety of such configurations will be obvious to those skilled in the art, typically based on the configurations of the appliances in which respective ones of the cells of the invention are to be used.

The general function of either of anode cap 24 or cathode cap 30 is to facilitate making electrical contact between terminals of an outside electric circuit and the electrodes of the cell. To the extent the electrode caps make the contact more certain, more cost effective, or easier for the user to effect, caps 24 and/or 36 are preferably selected for use.

To the extent the electrode caps do not provide any net advantage to the cell, such electrode caps need not be used.

The occurrence, or not, of such net advantage depends on the intended end use of the cell. Where the cell is to be used in a conventional appliance, where the appliance terminals are configured to receive conventional cells, the electrode caps may be used. Where the appliance is specifically structured to use cells of the invention, the appliance terminals are preferably structured to interface with head 152 on the anode current collector, and either platform 108 or flange 138 of the cathode can, obviating anode and cathode caps 24, 30. As a further option, platform 108 and head 152 can be so configured as to be disposed in the physical location and physical arrangement usually extant in conventional cells of the standard size of interest.

Anode cap 24 and cathode cap 30 can be fabricated from any conductive material which can readily make good electrical contacts, and which will tolerate the physical stresses which are typically placed on such caps during routine use of the cell. A variety of such materials can be used for caps 24, 30. One can use, for example, a wide variety of materials such as those recited for use in fabricating the cathode can. Among the materials which can be used for either or both of the anode cap and the cathode cap are, for example and without limitation, cold rolled steel, optionally coated on one or both sides with nickel; and stainless steel such as 305 stainless steel, optionally coated on one or both sizes with nickel. Other materials known in the battery art for use as electrode caps in alkaline round cells are equally useful in cells of the invention.

Corner Structure Detail

FIGS. 3A and 3B, taken at cashed circles 3A and 3B respectively in FIG. 2, represent enlargements of the top and bottom respectively of the interior structure of the cell at and adjacent the top and bottom of the air cathode. FIGS. 3A and 3B illustrate especially the seals, about the air cathode assembly at the top and bottom of cell 10, against electrolyte leakage, and in promotion of electrical isolation of the anode and cathode from each ocher.

Referring to, for example, FIG. 7, any electrolyte traversing through the air cathode assembly must pass through the PTFE air diffusion member. However, the PTFE is hydrophobic, whereby the aqueous electrolyte generally does not traverse through the PTFE. Accordingly, the PTFE air diffusion member is effective in normal use to prevent aqueous electrolyte from passing through the PTFE and thence out of the cell.

The cell is especially vulnerable to leakage of electrolyte, however, at any location where the electrolyte can by-pass the PTFE, and traverse a path that does not require that the electrolyte traverse through the PTFE or along a surface of the PTFE. Such paths potentially exist at the top and the bottom of the cell adjacent the separator and the air cathode assembly. And while such paths devoid of such PTFE can be effectively sealed against electrolyte leakage, such seal paths are more difficult to seal than corresponding paths employing such PTFE.

Corner Structure at the Bottom of the Cell

Referring to FIG. 3A, inner wall 110 of bottom wall 37, and lower portion 114 of side wall 39 form the inner and outer walls of flange 138 at the bottom of the cell, thus at slot 116 on the interior of the cell. As discussed with respect to the bottom structure overall, cathode current collector 32 and air diffusion member 36 extend downwardly into slot 116.

As illustrated in FIGS. 21–24, the invention contemplates various implementations of crimping the flange in order to collapse slot 116 at various bottom seal grooves such as 122, 130, and the like, thereby to bring inner wall 110 and lower portion 114 of side wall 39 together in intimate relationships with the current collector and the air diffusion member, and into close proximate relationship with each other.

FIG. 3A illustrates that carbon catalyst 34 need not, and preferably does not, extend into slot 116, but is confined between air diffusion member 36 and current collector 32 above slot 116. Similarly, the bottom edge of separator 16 extends generally to, but not into, slot 116. Thus, in preferred embodiments, the material extending into slot 116 is limited to the cathode current collector and the air diffusion member. As illustrated in FIG. 3A, the air diffusion member is rather compressible, and is accordingly highly compressed in the area of crimped bottom seal groove 130W, and by its typical resilience, entirely fills any residual width of the slot with its hydrophobic composition.

Referring to the bottom or the cell and FIG. 3A, liquid may potentially traverse a path downwardly to the bottom of slot 116, about the bottom edges of the cathode current collector and the air diffusion member, and upwardly along the outer surface of the diffusion member to an air port, thence to exit the cell. Points along such path are where separator 16 meets isolation cup 142 and where the bottom of separator 16 meets air cathode assembly 26, as well as the first choke region adjacent inner wall 110 at the wide bottom seal groove in slot 116 and the second choke region adjacent lower portion 114 of side wall 39 at wide bottom seal groove 130W.

Such path generally begins where separator 16 meets bottom seal 140, and passes between separator 16 and bottom seal 140; and/or the path traverses between separator 16 and isolation cup 142 along joint 148, thence downwardly past the bottom of separator 16, thence continuing downwardly between wall 110 and cathode current collector 32, through the first choke region at the wide bottom seal groove in slot 116. The path then traverses past the bottom end of the cathode current collector and around the end of the current collector and air diffusion member 36, to the outer surface of the air diffusion member. Once on the outer surface of the air diffusion member, the path traverses upwardly through the second choke region, namely past seal groove 130W between air diffusion member 36 and lower portion 114 of side wall 39, and finally must pass around or through seal ring 78 before advancing to an air port 38. If the seeping material should reach an air port, the material would be free to escape entirely from the cell, through the air port.

Returning now to FIG. 3A, bottom seal 140 provides a first obstacle to traverse of liquid along such path. Namely, bottom seal 140 is a liquid impervious polymer, and is in intimate physical contact with the separator along a meaningful height of the separator about the circumference of the cell at the bottom of the cell, thus blocking movement of liquid along the interface between seal 140 and separator 16 at the bottom of the cell.

Any liquid which manages to get past the bottom seal and/or the isolation cup, next encounters the pressure exerted on inner wall 110 and current collector 32 opposite compressed wide bottom seal groove 130W, on flange 138. The recited crimp seal at bottom seal groove 130W substantially reduces the width "W4" (FIG. 3A) across slot 116 to that width which is occupied by the cathode current collector and the highly compressed air diffusion member after the flange has been permanently deformed under the crimping force of e.g. tools 32 and 136.

As illustrated in FIG. 3A, diffusion member 36 is typically compressed in the sealing groove to no more than about 50 percent, preferably no more than about 35%, more preferably no more than about 25%, or the thickness of such diffusion member outside the sealing groove and adjacent e.g. an air port 38. The crimping is practiced specifically to provide such an obstacle to flow of liquid electrolyte.

For effective leakage prevention, the seal at wide bottom seal groove 130W substantially closes slot 116 except for the widths required by the cathode current collector and the highly compressed air diffusion member. The deformation properties of the e.g. cold rolled steel core layer of side wall 39 of the cathode can are such as to maintain permanent the substance of the deformation imposed at the crimping step, and to maintain substantial pressure against the air diffusion member and the cathode current collector, thereby to maintain slot 116 closed to traverse of liquid electrolyte after tools 132, 136 are removed.

Corner Structure at the Top of the Cell

Referring to FIG. 3B, a top edge region of air diffusion member 36 is wrapped inwardly and downwardly about the circumference of top distal edge 57 of the cathode current collector, and about the top of separator 16, and thence downwardly along a top portion of the inner surface of the separator.

FIG. 3B illustrates that carbon catalyst 34 need not, and preferably does not, extend into he slot 174 between minor diameter 166 and wide sealing groove 176 below the top edge 177 (FIG. 32) of side wall 39. Rather the carbon catalyst is generally confined between air diffusion member 36, current collector 32 and separator 16, below slot 174.

In preferred embodiments, the material extending into slot 174 is limited to the cathode current collector and the air diffusion member, and the top edge of separator 16 generally abuts the bottom of the grommet, whereby the separator does not extend upwardly into the slot. As illustrated in FIG. 3B, the air diffusion member is rather compressible, and thus is highly compressed, as discussed for the corner structure at the bottom of the cell, in the area of wide sealing groove 176, and the typical resilience of the diffusion member entirely fills any residual width of the slot, both against the cathode can and against the grommet, whereby the hydrophobic properties on both surfaces of slot 174 impede entry of aqueous electrolyte into the slot and traverse of aqueous electrolyte along or through the slot.

Referring to the top region of the cell and to FIG. 3B, liquid may potentially traverse a path upwardly to the top of slot 174. From there, the liquid could take either or both of two paths. First, the liquid might traverse the outer surface of the air diffusion member, and downwardly along the outer surface of the diffusion member to an air port, thence to exit the cell. Points along the overall such path are where the grommet meets the distal edge of the air diffusion member, arcuate ledge 168, and the outer surface of the air diffusion member in the choke region where the air diffusion member is crimped, and thus compressed inwardly, by can side wall 39 at wide sealing groove 176.

Such path is impeded both by the hydrophobic nature of the air diffusion member and by the choke points defined by the pressure between the air diffusion member and the grommet and between the air diffusion member and the cathode can side wall at wide sealing groove 176.

Second, liquid could traverse from the top of slot 174 upwardly between grommet 18 and side wall 39 of the cathode can, thus to the top of the grommet and thence out of the cell.

Such path traverses, for example, from inside the anode cavity, along slot 174 between grommet 18 and air diffusion member 36, thence upwardly between grommet 18 and side wall 39 to the top of the cell. Once the leaking material reaches the top of the cell, the material is free to escape entirely from the cell.

Returning now to FIG. 3B, wide sealing groove 176 provides a first obstacle to traverse of liquid along the upwardly directed portion of the path leading to ledge 168. Namely, wide sealing groove 176 exerts a force compressing air diffusion member 36 against grommet 18 whereby air diffusion member 36 is in intimate physical and compressive contact with the grommet for substantially the full height of slot 174 about the entirety of the circumference of the cell adjacent the top of the cell, thus blocking movement of liquid between grommet 18 and air diffusion member 36 to the top of the slot.

Any liquid which manages to get past the compressed hydrophobic diffusion member and thus through slot 174 and to ledge 168, depending on the path of interest, next encounters either the pressure between compressed wide sealing groove 176 and the compressed air diffusion member on the downwardly directed path, or encounters the pressure between the grommet and side wall 39 of the cathode can. Referring to the downwardly directed path, the pressure between wide sealing groove 176 and the hydrophobic air diffusion member constitutes a significant obstacle to traverse of aqueous electrolyte. In addition, in order to completely traverse wide sealing groove 176, the electrolyte must pass around or through seal ring 76 before advancing to an air port.

Referring to the upwardly directed path, upward of ledge 168, a grommet lock groove 178 in side wall 39 (FIG. 2) preferably extends about the circumference of the cell between wide sealing groove 176 and the top of grommet 18. Grommet lock groove 178 is formed in can side wall 39 after the grommet has been installed in the can, and thus crimps the side wall of the cathode can against grommet 18 with sufficient pressure (i) to hold, or at least assist in holding, the grommet in the can and (ii) to block flow of electrolyte between grommet 18 and side wall 39 upwardly toward the top of the cell. Grommet lock groove 178 exerts sufficient ongoing active pressure against grommet 18 to substantially impede flow of liquid e.g. electrolyte upwardly past grommet lock groove 178. The crimping of grommet lock groove 178 is practiced specifically for, among other functions, creating such an obstacle to flow of liquid electrolyte.

For effective leakage prevention, wide sealing groove 176 substantially closes slot 174 except for the width required by the combination of the cathode current collector, and the two layers of the highly compressed air diffusion member. The deformation properties of the e.g. cold rolled steel core layer of side wall 39 of the cathode can are such as to maintain the deformation of groove 176 as imposed at the crimping step, thereby to maintain slot 174 closed to traverse of liquid electrolyte after the crimping force of the respective tooling is released.

Wide sealing groove 176, as illustrated in FIGS. 2 and 3B is fabricated by placing a grooving tool in the existing grommet stop groove 102 (See also FIG. 30) and working the tool about the circumference of the can as well as downwardly, thus using the tool to widen the existing groove downwardly such that the groove extends continuously downwardly from the stop groove, and continuously about the circumference of the can. Thus, the height of the comparatively wider sealing groove 176 incorporates, and expands on, the original rather narrower stop groove 02.

In another embodiment, illustrated in FIG. 30, a separate top sealing groove 180 is fabricated in side wall 39 below grommet stop groove 102 and above the bottom of slot 174. Such top sealing groove 180 performs generally the same function as wide sealing groove 176, but over a lesser height of the cell, and separate from stop groove 102.

In yet another embodiment, not shown, of corner structure at the top of the cell, namely adjacent the top of anode cavity 137, bit referring for guidance to FIG. 3B. diffusion member 36 extends upwardly into slot 174 and terminates at a top edge adjacent the corresponding top edge of cathode current collector 32. Namely, in this embodiment, diffusion member 36 is not turned inwardly and downwardly inside the cathode current collector between the cathode current collector and grommet 18. Rather, cathode current collector 32 is in direct surface-to-surface relationship with grommet 18.

While the separator is generally wettable by aqueous liquids, the pressure at e.g. wide sealing groove 176 is effective to at least partially suppress migration of aqueous liquid upwardly into slot 174 in those embodiments where separator extends upwardly into slot 174. Thus, while the separator is generally hydrophilic, under the pressure of sealing groove 174, the separator loses at least part of its hydrophilic characteristic properties, and serves as the first line of defense against leakage of liquid electrolyte out of the cell. Any liquid electrolyte which does manage to get past the separator in the slot, still must traverse the choke points and other obstacles in one of the upwardly and downwardly directed paths described earlier herein, in order to effectively leak out of the cell.

Sealing Tape

As with other air depolarized electrochemical cells, a seal tape, suggested in dashed outline at 182 in FIG. 1, is installed on the outside surface of the cathode can, covering the air ports. In the cylindrical embodiments of cells of the invention, the sealing tape is installed about the entire circumference of the outer surface of side wall 39 and preferably extends from proximate e.g. bottom seal groove 130 to a location generally proximate sealing groove 176 or 180, as applies. Tape 182 covers air ports 38, and blocks unrestricted access of air to the air ports, until such time as the cell is to be placed into service. When placement of the cell into service is imminent, the tape is removed, thereby exposing the air ports to ambient air, whereby the cathode half reaction is facilitated.

Seal tape 182 can be made from any of the seal cape materials known for use over air ports of air depolarized cells. Preferred materials are those known for use where chemical reactions are suitably suppressed, for lack of air, until such time as the cell is to be placed into service.

Such material can have, for example, a 2 inch wide base web about 0.002 inch thick and with suitable known porosity, with e.g. suitable pressure sensitive adhesive mounted thereon. The tape is applied by wrapping a suitable length of the tape, adhesive side inward, about the entire circumference of that portion of side wall 39 which contains air ports 38, namely the portion of side wall 39 which extends e.g. between bottom flange 138 and e.g. either wide seal groove 176 or top seal groove 180.

Review of Certain Aspects of the Invention

Electrical contact between the cathode current collector and the cathode can is effected at flange 138 at the bottom of the cell, with either groove 122 or 130 providing active holding force, or both grooves 122 and 130 where both grooves are used, holding inner surface 50 of the bottom edge portion of the cathode current collector against the inner surface of inner wall 110, thereby establishing and maintaining electrical contact between cathode current collector 32 and cathode can 28.

Bottom seal material 140 can be placed in the bottom of the anode cavity by spraying melted seal material from a nozzle inserted into the anode cavity and toward the bottom of the cathode can, preferably with concurrent rotation of either the nozzle or the can. In the alternative, the uniformity of placement of bottom seal material 140, about the bottom of the anode cavity, is increased, over spraying melted seal material, when the seal material is placed in the anode cavity as a solid pellet or pellets, and is melted in situ before being solidified by subsequent cooling of the so-melted seal material. However, applicants have noticed a modest performance advantage in cells which were constructed with the in situ melting step, as compared to cells wherein the seal material was applied as a melted spray.

Applicants contemplate that the noted improved uniformity of in situ melting of the seal material, over spray application of already-melted seal material 140, may be related to the very nature of spray applications. Namely, the amount of material applied adjacent and at an edge of the spray pattern varies according to the exact position in the spray pattern. Thus, in order to assuredly cover an area of interest, one normally directs the spray pattern so as to apply acceptable amounts/thicknesses of material throughout the target area. Accordingly, in obtaining the minimum desired full thickness coverage of spray material throughout the target area, the edges of the spray pattern generally apply lesser amounts of the spray material outside the target area.

In the case of cells of the invention, the spray target applies seal material at the same height as generally the same amount of seal material (allowing for edge overspray) would reach in the meniscus adjacent the separator if the insulating melt plug (e.g. seal 140) were developed by in situ melting of one or more particles of the seal material as described above. In order for the spray application to cover the target area including the meniscus height, the lighter edge areas of the spray pattern necessarily reach above the purported meniscus height.

While choosing to not be limited to technical theory here, applicants contemplate that the lighter spray coverage in such higher areas above the meniscus zone. May impede electrical and/or physical mobility of reactant moieties to, from, or in, the cathode assembly adjacent where the lighter spray has been applied above the meniscus height, correspondingly reducing the level of electrochemical reactivity at respective adjacent portions of the reaction surface of the cathode assembly. Accordingly, where other factors are equal, the in situ melting method of applying thermoplastic seal material 40 is preferred.

The active carbon catalyst is mechanically bonded between outer and inner surfaces 58, 60 of the cathode current collector by carbon catalyst material extending outwardly from projected open areas of the perforations, on both such outer and inner surfaces of the cathode current collector.

An exemplary air diffusion member 36 is preferably fabricated by wrapping about 3.25 wraps of a suitable e.g. 0.002 inch thick layer of microporous PTFE about active carbon catalyst 34, with suitable pressure and/or tension on the PTFE sheet material as the PTFE is wrapped. The affect of applying pressure and/or tension on the PTFE sheet as the sheet is wrapped a cut the carbon catalyst is that the resulting multiple-layer PTFE diffusion member has an overall thickness smaller than the corresponding multiple of the nominal, at rest, single layer thickness of the web so wrapped. In the above example, the resulting thickness of the 3-layer wrap is about 0.0035 inch. Suitable such wrapped multiple layer diffusion members have resulting thicknesses about 50% to about 70%, preferably about 55% to about 65%, most preferably about 60%. as great as the sum of the thicknesses of the layers wrapped.

The effect of wrapping the PTFE while subjecting the PTFE to compressive and/or tensile reduction in thickness is to establish a desired air diffusion rate through the air diffusion member, depending on the amount of compression imposed. Greater levels of compression, including greater levels than those recited above, can be used to establish lower rates of air diffusion, for example, to establish a lower air diffusion rate as a tool for controlling vapor transport into or out of the cell.

Lower diffusion rate can also be used to establish an upper limit on the cathode reaction rate by reducing the supply of oxygen available at the cathode reaction surface. Lesser levels of compression and/or tension, including lesser levels than those recited above, can be used to establish higher rates of air diffusion and thus greater supply of oxygen to the cathode reaction surface.

Another effect of wrapping the PTFE as a continuous (essentially endless) web is to avoid any end edges extending substantially through one or more layers of the thickness of the diffusion member. Where e.g. 3.25 wraps are used, for any electrolyte to get through the diffusion member, the electrolyte must either traverse through the thickness of 3 layers of the PTFE (not likely), or traverse along facing surfaces of adjoining layers of the PTFE for 3.25 times the circumference of the diffusion member (again rot likely). Given the above obstacles to liquid egress from the cell, liquid electrolyte in general does not exit the cell through the PTFE diffusion member. Thus, the multiple layer endless wrap structure of the PTFE diffusion member is a significant factor in impeding such liquid exit through the diffusion member.

In technically preferred embodiments, the diffusion member is turned inwardly about the circumference of the cell, over the top or the separator or cathode current collector, and downwardly onto the top portion of the inner surface of the respective cathode current collector or separator. The downwardly-depending portion of the PTFE on the inner surface of the cathode current collector or separator provides a first-encountered sealing shield, in slot 174, impeding movement of electrolyte or electricity from anode mix 20 to the cathode current collector or the cathode can, thus impeding internal electrical shorting in the cell.

Overall Method of Making a Cell

The following materials are provided for assembly of a cell of the invention. A cathode can as described above is provided. Such cathode can has air ports 38 in side wall 39, in suitable number, preferably evenly distributed over side wall 39 adjoining the prospective reaction surface area of the air cathode assembly. The cathode can includes provision for stabilization of the bottom of the air cathode assembly as at either slot 116 or through plug 128, or the like, optionally in combination with groove 122 or 130. The cathode can preferably further includes grommet stop groove 102.

An air cathode assembly 26 as described above, is provided. In such air cathode assembly, an upstanding free edge region of the PTFE diffusion member preferably extends e.g.

about 0.050 inch to about 0.150 inch, preferably about 0.100 inch to about 0.125 inch, above the top of the cathode current collector.

A grommet 18 is provided, including ledge 106 properly positioned for interfacing with grommet stop groove 102. Either grommet stop groove 102 or ledge 106, or both, can be continuous as shown, or can be intermittent about the circumference of the can and grommet. The only requirement is suitable interface to stop advance of the grommet as the grommet is assembled into the cell.

A separator 16 as described above is provided. The height of the separator is such as to extend generally from the top of slot 116 or plug 128 to and into what will become slot 174 between grommet 18 and side wall 39 of the cathode car. The width of the separator is sufficient to extend more than the full circumference of the anode cavity. The composition of the separator is preferably as described above, though a wide variety of known separator materials can be tolerated in the invention. The thickness and resiliency of the sheet material used to make separator 16 is such as to anticipate a resilient expansion of a lightly coiled such material inside the air cathode assembly when the lightly coiled material is released inside the cathode can.

A suitable anode mix or anode mix precursor is provided. The anode mix is preferably the above described wet anode mix, preferably made as described, with the electrolyte composition being incorporated with the dry powder prior to he anode mix being incorporated into he cell. However, a wide variety of known anode mixes, including dry anode mixes, subsequently wetted inside the anode cavity, can be used in cells of the invention, and a wide variety of known operable methods of making such anode mixes, are acceptable, and operable in making cells of the invention, although the above described anode mixes are preferred. The reason such anode mixes are preferred is because such anode mixes can potentially provide higher discharge rates than other, more widely-used anode mixes.

A suitable anode current collector is provided. While a wide variety of anode current collectors can be used, a preferred anode current collector for some embodiments is a brass nail (70% copper, 30% zinc) in the form of a solid rod, coated (e.g. plated) with tin, gold, or other material providing a sufficiently high hydrogen overvoltage to impede self-generation of hydrogen gas inside the environment extant in the cell.

A suitable bottom seal material 140 is provided. The bottom seal material can be provided in either solid or melted/liquid form, depending on the method which is to be used in placing the seal material into the cell. When the seal material is provided in melted form, the melted material is generally contained in suitable spray machinery, including a suitable reservoir, a spray nozzle, and a pump for pressurizing the melted seal material. When the seal material is provided in solid form, preferably a single pellet of suitable weight (e.g. 0.25 gram for a size "AA" cell) is provided. Multiple pellets, of suitable combined mass, for use in a single cell are acceptable, but less desirable.

Given the above provided materials, air cathode assembly 26 is inserted into the cathode can, with the bottom of the air cathode assembly extending to the inside surface of the lowest extremity 112 of bottom wall 37.

The bottom wall of the cell is then crimped, either at flange 138 or against a conductive plug 128, using a groove e.g. 122 or 130, thus to fix air cathode assembly 26 in position in the can to provide electrical contact between the cathode current collector and the cathode can, and to effect a seal impeding flow of electrolyte around the lower end of the cathode assembly and thence out of the cell.

The separator is then rolled generally and loosely into cylindrical form, and is inserted into the cathode can, inwardly of the air cathode assembly. The separator is preferably pushed downwardly into the can until the bottom edge of the separator reaches the too of slot 116, or plug 128, whichever is being used. Once in the can, the separator is released, whereupon the separator automatically and resiliently uncoils/expands against the inner surface of the cathode current collector, thereby generally defining the circumferential side wall about the anode cavity of the cell. The bottom of the anode cavity is defined by the uppermost one of the bottom covering materials, namely seal 140 or isolation cup 142.

In some executions of separators in conventional metal-air cells, the separator is adhesively bonded to the cathode current collector. While the separator can be e.g. adhesively bonded to the cathode current collector in cells of the invention, the high drain rare performance of the cell is improved, compared to a cell having an adhesively bonded separator, where the separator is not bonded to the cathode current collector. Accordingly, the invention contemplates preferred cells wherein no adhesive bonding is present between the outer surface of the separator and the inner surface of the cathode current collector.

In embodiments where an isolation cup 142 is used, the isolation cup is typically inserted into the anode cavity after the separator is inserted into the cell. The isolation cup is placed inwardly of the separator, at the bottom of the anode cavity, with bottom wall 144 of the isolation cup against the central portion (e.g. central platform 108) of the bottom wall of the cathode can, or example, the bottom surface of bottom wall 144 is against the top surface of central platform 108 in FIGS. 2 and 3A, although small spacings are shown between the elements in the drawings for ease of visually distinguishing the elements from each other.

In the alternative, the isolation cup can be inserted into the anode cavity, followed by insertion of the separator into the anode cavity, including into the isolation cup such that the bottom edge of the separator extends to the top surface of bottom wall 144 of the isolation cup. Once the separator and isolation cup are in place in the anode cavity, the bottom seal material, if used, is next inserted. Where pre-melted seal material is used, a spray nozzle is thus inserted into the anode cavity, with the spray orifice of the nozzle generally disposed toward the bottom of the cavity.

Preferably the cathode can and contents are rotated while liquid (melted) seal material at e.g. 500–575 degrees F. is dispensed from the nozzle onto the bottom of the can, or the isolation cup as appropriate. Seal material is accordingly dispensed onto the lower portion of separator 16 at the same time. In general, the cathode can and contents are at approximately ambient temperature when the seal material is dispensed. Accordingly, the cooler temperature of the cathode can and contents rapidly cools the dispensed seal material to below its solidification temperature, whereby the seal material rapidly reverts to the solid state after placement into the anode cavity in a melted condition and before flowing down by gravity off the site wall of the separator.

Where seal material is introduced into the anode cavity in solid state, preferably a single pellet of e.g. 0.25 gram (for size "AA" cell) of seal material is placed in the bottom of the anode cavity, against central platform 108 or isolation cup 142. The desired amount of seal material can be placed in the anode cavity as more than one pellet, but the single pellet is preferred.

The solid seal material is then melted by heating, and after melting is cooled and thereby re-solidified. The melting can be done by, for example, inserting a hot air nozzle into the cavity above the seal material pellet and using hot air to melt the pellet. In the alternative, and preferably, a hot contact heater contacts the outer surface of bottom wall 37, and provides melting heat to the seal material by conduction through bottom wall 37. Either way, the seal material must be heated sufficiently that the seal material melts or otherwise flows and fills the bottom of the cavity, especially to close off joint 148 and/or any other point between separator 16 and a bottom member of the anode cavity such as platform 108 of the can or isolation cup 42.

The heated, fluid seal material flows to fill the joints, and preferably forms a meniscus (FIGS. 3A and 29) providing a significant seal interface between seal material 140 and the lower portion of separator 16 where separator 10 interfaces with the bottom of the anode cavity, whatever the structure at the bottom or the anode cavity.

The upwardly-inclined meniscus at the separator provides a suitably long path that any potentially leaking electrolyte must travel in order to leak past the seal material and downwardly into slot 116. Especially where the central portion of bottom wall 37 is lower than outer portions of the bottom wall, such as at FIGS. 27 and 29, the meniscus is important to retaining suitable thickness of the insulating melt plug at separator 16.

Once the seal material flows, and fills the appropriate locations in the bottom of the anode cavity, cooling is again provided, effective to solidify the seal material in the bottom of the anode cavity, thus to fix the seal material in the desired location at the bottom of the anode cavity.

With the bottom of the can properly protected by seal material or the isolation cup, or both, a suitable quantity, e.g. about 13.5 grams of wet gelled zinc pre-mix composition is added to the anode cavity, whereby the finished and functional wet electrolyte composition is then in place in the anode cavity. In the alterative, e.g. about 8.5 grams of a dry zinc pre-mix is added to the anode cavity followed by addition of suitable electrolyte composition.

The anode current collector is assembled to the grommet by inserting shank 150 of the anode current collector through aperture 154 of the grommet, until head 152 of the anode current collector abuts the top of the grommet about aperture 154.

The subassembly of the grommet and the anode current collector is then inserted into the anode cavity, with the shank of the current collector disposed inwardly of the grommet, and penetrating into, and into intimate physical and electrical contact with, the anode mix. The grommet/current collector subassembly is preferably advanced into the anode cavity until grommet ledge 106 abuts ledge 104 of stop groove 102 of side wall 39 of the cathode can.

After the grommet and anode current collector are inserted into the cathode can, suitable grooves are formed or expanded about the side wall of the cathode can to lock the grommet in place, and to provide effective seals against leakage of e.g. electrolyte out of the cell past grommet 18. For example, the cell can be turned against suitable tools to create grommet lock groove 178 (FIG. 30) and/or top sealing groove 180, or both (FIG. 30), about the entire circumference of side wall 39. Grommet lock groove 178 is optional. Top sealing groove 180 is obviated where grommet stop groove 102 is expanded downwardly as shown in, for example, FIGS. 2 and 3B to form wide grommet lock groove 176, generally extending between and including what are shown as stop groove 102 and sealing groove 180 in FIG. 30.

Inserting grommet 18 and anode current collector 22 into the can, and forming the recited grooves 176, 178, 180, as appropriate, completes the closure of the cell, including forming a desirably tight closure and seal of the cell.

Wide sealing groove 176 is fabricated by placing the working tool into grommet stop groove 102, and holding the tool at a suitable radius to provide inwardly-directed sealing force against grommet 18 while turning the cell and gradually moving the working tool downwardly from the height of stop groove 102. As the tool is moved gradually downwardly while holding the recited radius, stop groove 102 is expanded downwardly and optionally inwardly, thereby to bring pressure to bear against the diffusion member, cathode current collector, and separator, and indirectly against grommet 18, over an expanding vertical height eventually reaching the dimension "H1" (FIG. 3B) and locking the diffusion member, the cathode current collector, and separator in a press-fit configuration in slot 174, against grommet 18, thus to form the wide grommet lock groove as illustrated in FIGS. 2 and 3B.

Height "H1" of wide grommet lock groove 176 is substantially greater than the height of grommet stop groove 102 illustrated in e.g. FIGS. 18 and 31. Typical ratio of the height "H1" of grommet lock groove 176 to the height of grommet stop groove 102 is of the order of about 2/1 to about 10/1, with preferred ratio of about 4/1 to about 8/1.

With suitable sealing grooves and/or locking grooves having been formed in side wall 39, the cell is at that point adequately closed and sealed against leakage of contents of the cell. Top edge 177 of the cathode can is then crimped inwardly, along with top ridge 172 of the grommet, against the top surface of the grommet, thereby to provide the final closure crimp in closure of the cell.

If an anode end cap 24 is to be used, the anode end cap is placed against the top of the grommet before the top edge of the can and top ridge of the grommet are crimped over. In such event, the circular outer perimeter of the anode cap is thus trapped in slot 170 as the top edge of the can and the top ridge of the grommet are crimped over, holding the anode cap to the anode end of the cell. The anode cap is electrically isolated from top edge 177 of cathode can 28 by the intervening electrically insulating top ridge 172 of the grommet.

While the anode cap is thus placed in close, and likely touching, proximity with head 152 of the anode current collector, a spot weld is preferably formed between head 152 and cap 24, thus to establish excellent electrical contact between the anode current collector 22 and anode cap 24.

Correspondingly, if a cathode cap 30 is to be used, the cathode cap is placed against preferably the lowest extremity 112 of the cathode can, and welded in place, thereby to obtain physical securement of the cathode cap to the cathode can and to establish excellent electrical contact with the cathode can.

Hollow Anode Current Collector

Figure 31B:
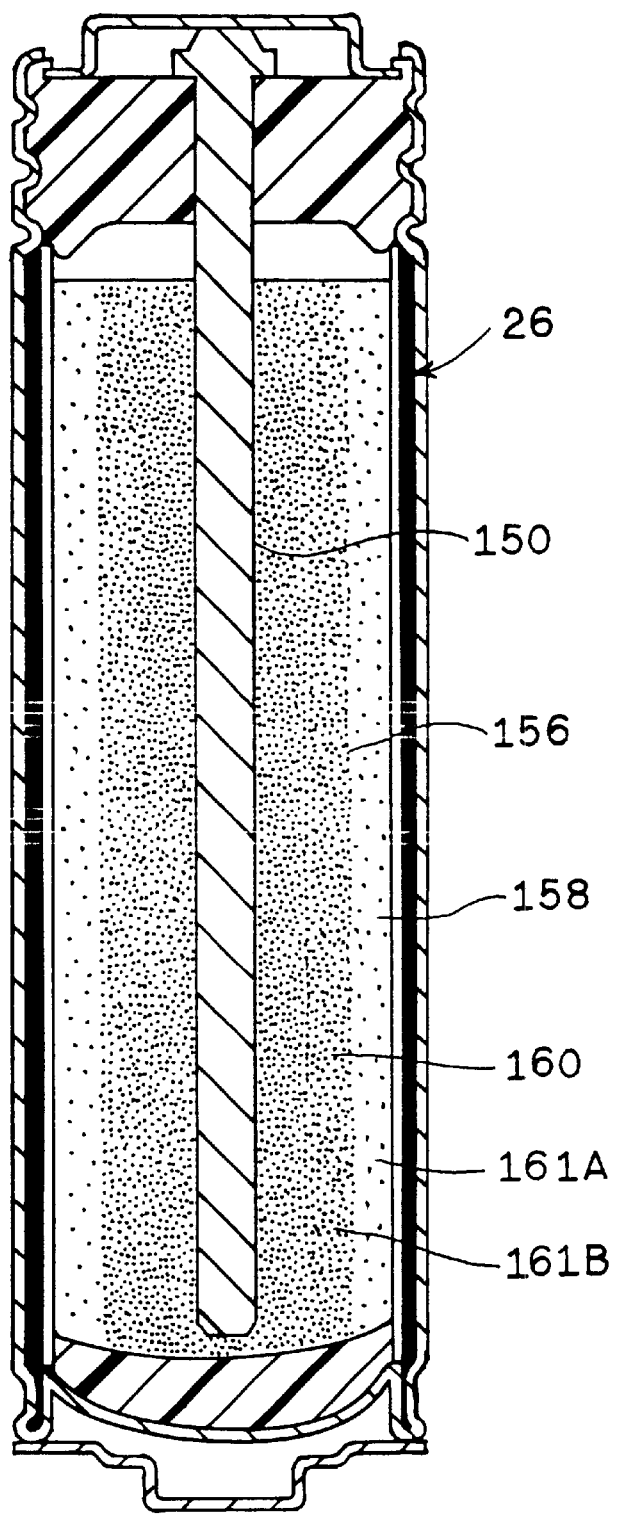
FIG. 31B is a representation of a photograph showing a cross-section of a portion of a cell which has undergone significant discharge, wherein the zinc was loaded into the anode in a wet or gelled condition, and illustrating progression of the reaction front from the cathode current collector toward the anode current collector.

FIG. 31A and 31B represent cross-sections of representative cells after significant discharge of the respective cells. FIG. 31A represents a cell having an anode wherein the zinc was placed in the anode cavity in the dry condition, with the electrolyte having been added to the anode cavity after addition of the dry zinc.

By contrast, FIG. 31B represents a cell having an anode wherein the zinc was placed in the anode cavity in the wet condition. Namely, the electrolyte was added to, and mixed with, the zinc before the zinc was placed into the anode cavity.

Both of FIGS. 31A and 31B illustrate movement of reaction front 156 of the anode half reaction as oxygen from the air combines with the zinc in the anode, through the auspices of hydroxyl components of the electrolyte. As illustrated therein, the relatively lighter colored anode mix material 158, namely the reacted zinc oxide. generally emanates inwardly from air cathode assembly 26. The relatively darker colored anode mix material 160, namely the unreacted zinc, is generally disposed relatively inwardly in the cell, about the anode current collector.

As FIGS. 31A and 31B illustrate generally, in a fresh, unused cell, being put into use for the first time, the anode half reaction between hydroxyl ion and zinc initially takes place immediately adjacent the air cathode assembly. Thus, the reactive hydroxyl ion reacts with one of the first available zinc particles it encounters as it leaves the cathode assembly. Namely, the reactive hydroxyl ion reacts with a zinc particle which is close in distance to the cathode assembly.

As the zinc immediately adjacent the cathode assembly is used up in electrochemical reaction in the cell, and is thus converted to zinc oxide, the hydroxyl ions have to travel further inwardly from the cathode assembly, through the light-colored zone of reacted zinc oxide, in order to reach and associate with, and thus to react with, unreacted zinc, whereby reaction front 156 gradually moves inwardly toward the anode current collector as the zinc metal is progressively used up in the electrochemical reaction. Further, the reacted zinc oxide tends to coalesce toward a physical structure more representative of a single agglomerated article, more stone-like in nature, and less easily traversed by the hydroxyl ions.

FIGS. 31A and 31B, representing dry and wet addition of the zinc, respectively, illustrate somewhat different paths of movement of the reaction front as use of the cell progresses. Both FIGS. 31A and 31B represent cells that are substantially used up, namely substantially used up assuming relatively high drain rates of one ampere, and using an end points of 0.9 volt. In FIG. 31A, the reaction front has progressed substantially all the way to the anode current collector at loci upwardly in the cell. But toward the bottom of the cell, the reaction front has moved inwardly from the cathode current collector to a lesser degree. Namely, the zinc oxide is about 2–3 millimeters thick. Accordingly, the cell of FIG. 31A illustrates unreacted zinc 160 in a bell-shaped configuration, open at the bottom, and focused about the anode current collector at the bottom of the cell.

The cell from which FIG. 31A is derived approximated a "AA" cell in size. The reaction front at lower portions of the cell was about 2 millimeters to 3 millimeters from the cathode current collector.

The result is that a first generally cylindrical portion of the anode mix, taken along the full length of the anode cavity, and which is defined inwardly of the reaction front at the lower portion of the anode cavity, has a relatively lower overall fraction of reacted zinc oxide, and a relatively higher overall fraction of unreacted zinc.

By comparison, a second generally cylindrical portion of the anode mix, taken along the full length of the anode cavity, and which is defined outwardly of the reaction front at the lower portion of the anode cavity, has a relatively higher overall fraction of reacted zinc oxide, compared to the first generally cylindrical portion of the anode mix. So, comparing the first and second cylindrical portions of the anode mix, the second outward cylindrical portion of the anode mix is more effectively used in the cell than is the first inward portion of the anode mix, in the embodiment of FIG. 31A.

Referring now to FIG. 31B, which represents the zinc having been added to the anode cavity in the wet condition, the first outward generally cylindrical portion is designated 161A, and the second inward generally cylindrical portion is designated 161B. As seen in FIG. 31B, the outward portion 161A represents a high fraction of conversion of zinc to zinc oxide, and the inward portion 161B represents a low fraction of conversion of zinc to zinc oxide. However, the reaction front represents a relatively cylindrical surface, all along the height of the anode mix in the anode cavity.

It should be understood that the reaction front profiles illustrated in FIGS. 31A and 31B represent only high drain operation of the cells. While greater fractions of the zinc can be reacted, and thus used up, where drain rate and/or voltage are lower, typical demands anticipated for cells of the invention are focused on higher drain applications, whereby low drain rate properties are not anticipated to have significant value. Accordingly, the higher drain rate profiles illustrated in FIGS. 31A and 31B are believed to represent the more typical real life use of such cells. Cells of the invention can, of course, also be used in moderate and low drain rate applications FIG. 32 represents a further embodiment of the invention which takes advantage of the high use rate characteristics of outer cylindrical portion 161A, though the outer and inner cylindrical portions are not specifically illustrated in FIG. 32. As illustrated in FIG. 32, elongate shank 150 of anode current collector 22 is tubular, including side wall 184 and end wall 186 defining cavity 188 inside shank 150.

As illustrated, shank 150 has a diameter "D1", preferably but not necessarily generally constant along the length of the shank, including through grommet 18. Side wall 184 has a thickness "T3." Separator 16 defines width "W5" of anode cavity 37. The purpose and benefit of the embodiment of FIG. 32 is to reduce the weight of cell 10 by eliminating some or all of the lesser-used zinc of inward portion 161B while retaining all, or nearly all, of the more-used zinc of outward portion 161A. The overall result is that significant weight is eliminated with elimination of the inward portion of the zinc, while overall energy capacity of the cell is reduced to a lesser degree. Correspondingly, the ratio or the overall energy available from the cell to the weight of the cell (the energy/weight ratio) is increased over the ratio for a cell having a solid shank 150, as represented by cells of either of FIGS. 31A, 31B or similar cell wherein the shank is merely larger in diameter.

Referring to FIGS. 31A, 31B, the unreacted zinc 160 at termination of operation of the cell is weight in the cell which provides no operational benefit to the cell. Namely, the unreacted zinc 160 contributes to the denominator "weight" of the ratio without contributing to the numerator "energy" of the ratio, namely the total energy available from the cell.

By replacing the unreacted zinc of FIGS. 31A. 31B with a less dense material inside shank 150, typically air, the weight of the cell is reduced while reducing the total energy available from the cell to a lesser degree, whereby the ratio of energy to weight is favorably advanced.

Thus, as diameter "D1" of hollow shank 150 is increased, the amount of unreacted zinc existing in the cell after full effective discharge of the cell is decreased until the shank is sufficiently large, thus sufficiently close to the separator, that substantially all the zinc is consumed by the time he cell reaches the end point voltage, of typically about 0.9 volt to about 1.0 volt. Namely, the greater the diameter "D1," the closer is side wall 184 to separator 16, and thus the less the distance between shank 150 and separator 16.

In comparing variations of the embodiments represented by FIG. 32, and in light of the teachings respecting FIGS. 31A. 31B, and further assuming that the diameter of the shank does not extend outwardly beyond the reaction front represented in e.g. FIG. 31B, the closer side wall 184 of shank 150 comes to separator 16, the less the amount of unreacted zinc at the end point. Where the ratio of total energy to weight is an important operational criterion of the cell, the preferred construction is a cell having no, or substantially no, unreacted zinc at the cell end point, namely when the cell can no longer provide the threshold required voltage at the effective load. Accordingly, the diameter of shank 150 preferably corresponds generally with the diameter of the reaction front when the end point voltage of the cell is reached.

In that regard, compared to an anode current collector having a solid shank, improvement in the energy/weight ratio is seen at any time when the expanded diameter of shank 150 displaces what would otherwise nave been unreacted zinc at the end point of the use life of the cell. Accordingly, some benefit is usually seen when the distance between side wall 18A and separator 16 is no more than 40 percent of the average distance across the diameter, or other cross-section, of anode cavity 137. Depending at least in part on width "W5" of anode cavity 137, further improvements are seen in the energy/weight ratio in cells wherein the distance between side wall 184 and separator 16 is less than 40 percent of the average distance across the diameter. Thus, a distance of no more than 30 percent typically provides an improvement over the 40 percent distance.

A still further improvement is typically obtained when the distance is no more be than 25 percent. Yet further improvement is seen in at least some embodiments when the distance is no more than 20 percent. In some embodiments, still further improvements are seen when the distance is no more than 15 percent, or 10 percent. The actual optimum percentage depends on a variety of parameters relating to the specific cell under consideration. Such parameters can include, for example, size and configuration of the anode cavity, the wet or dry condition of the zinc where placed in the anode cavity, end point voltage, drain parameters including drain rate, and the like.

As used herein, "average distance across the diameter" means the average distance taken across the cross-section of the cell, and wherein diameter is the diameter of a cell having the same cross-sectional area as the specific cell being evaluated. Thus are cells having non-cylindrical configurations provided for, as well as cylindrical cells.

Once the expanded diameter of shank 150 reaches the point where no substantial mass of unreacted zinc as at 160 remains when the cell reaches the end point, namely the diameter of the shank corresponds with the reaction front at the end point, any further reduction in the distance between shank 150 and separator 16 does not significantly further improve the energy/weight ratio, whereby the average distance between the tubular anode current collector and the separator is sufficiently small that substantially no unitary unreacted mass of zinc remains proximate the anode current collector when the cell reaches typical end point voltage of about 0.9 volt to about 1.0 volt. Where the reaction front is not parallel to shank 150, the optimum diameter is somewhat less than where the reaction front is parallel to shank 150, and a corresponding adjustment in the designed cross-section of shank 150 is preferred.

Still referring to FIG. 32, side wall 184 and end wall 186 of shank 150 define cavity 188 inside shank 150. Cavity 188 can be open to ambient atmosphere through port 189 in head 152 of current collector 22. Accordingly, any pressure imposed on shank 150 which translates to a dimensional change in e.g. diameter of shank 150 results in a corresponding ingress or egress of air into or out of cavity 188 through port 189. Correspondingly, cavity 188 is not open to anode cavity 137, which would obviate the pressure moderating effect of port 189.

Side wall 184 can be defined by a suitable material have a suitable thickness "T3," for example and without limitation, about 0.006 inch to about 0.020 inch, defining a structural strength in shank 150 such that shank 150 withstands forces typically exerted inside anode cavity 137. Such forces represent, for example, the increased volume requirement of the anode material as the zinc is converted to zinc oxide in the electrochemical reaction. Such suitable material can be any of the brass compositions conventionally used for anode current collectors in cells having alkaline environments. for example, brass having compositions of 70 percent cooper 30 tin, or 60 copper 40 tin Other brass compositions, as well as other conventional anode material compositions. can be used as desired. The composition requirements are only limited by the suitability of the material for use as a current collector in the alkaline e.g. potassium hydroxide environment. Various material compositions are known for use in such alkaline environments, and all such materials are contemplated for use in the instant invention.

In other embodiments, thickness "T3" is selected, along with suitable material, to be thinner, for example and without limitation, about 0.002 to about 0.020 inch thick, such that shank 150 collapses under forces typically extant in the anode cavity during typical conditions to which the cell is exposed. While the sale materials as above can be used, e.g. the thickness of side wall 184 is reduced, whereby the side wall of the shank which passes through grommet 18 can collapse to a dimension less than the effective diameter of the shark as the shank passes through grommet 18, thus providing additional space inside the cell. As needed, a reinforcing sleeve or collar 198 can be used to reinforce shank 150 inside grommet 18 so the seal between shank 150 and grommet 18 at aperture 154 is not broken by any collapse of shank 150 inwardly inside grommet 18. Accordingly, collar 198 is preferably confined to the region of the grommet and thus extends less than the full length of shank 150.

In yet other embodiments of the cell of FIG. 32, side wall 184 is made of a plurality of materials, typically a substrate defined by a substrate material, having a first material disposed on the polymeric substrate composition and optionally a second material disposed on the first material, and wherein the combination of the first and second materials is suitable to collect electrical energy from the anode mass and to conduct such electrical energy between the anode mass and the anode terminal. Such substrate material can be rigid, whereby the tube does not collapse during discharge of the cell. In the alternative, the substrate can be rather collapsible, thereby to facilitate increasing the volume of the anode cavity during discharge of the cell.

As to the materials disposed on the substrate, there can be mentioned any and all of the materials conventionally known for use in shank 150. Thus, there can be mentioned gold, copper, silicon-copper alloys, silicon modified brass, conventional brass such as 70/30 brass and 60/40 brass and the like, as well as tin and various tin alloys, and such materials coated with suitable such materials, for example, tin-plated brass.

As illustrated, cavity 188 is preferably vented to the atmosphere through head 152. In the alternative, cavity 188 can be closed and sealed. Where the cavity is open to the atmosphere, cavity 188 contains ambient air, and enables air to move in and out of cavity 188 at will.

Cavity 188 is a closed chamber, closed especially to the anode cavity, such that contents of the anode cavity cannot move into cavity 188. Thus, side wall 184 is imperforate to the anode cavity, and end wall 186 is imperforate and closed to the anode cavity.

Shank 150 can be made with a closed bottom wall by providing a plug at the end of a tube comprising side wall 184, or by drawing and ironing a metal cup, thereby to form the bottom as part of a one-piece drawn and ironed work piece.

In embodiments where the cavity is a totally closed chamber, the cavity can contain other materials, generally placed in the cavity when the cavity is formed. Such other materials can be, for example and without limitation, any of the inert gases such as helium, argon, and the like. Such other materials can also include liquids and/or solids, so long as the density of the material disposed in cavity 188 is sufficiently small to contribute to the cavity reducing the overall weight of the cell. Thus, the density of any material contained in cavity 188 is generally no more than 80 percent of the density of the anode mix. Preferred materials have densities of no more than 60 percent of the density of the anode mix. Yet more preferred materials have densities of no more than 40 percent of the density of the anode mix. Still more preferred materials have densities of no more than 20 percent of the density of the anode mix. Other preferred materials nave densities of no more than 10 percent of the density of the anode mix. Finally, gaseous materials can be used in cavity 188, the densities of such gases being no more than 5 percent of the density of the anode mix.

In the interest of minimizing the weight of the cell, cavity 188 typically contains a gas such as air.

The tube defining shank 150 is not necessarily cylindrical, whereby the tube can be oval, ovoid, or otherwise annular, or may be hexagonal, or any other desired closed cross-section shape.

Shank 150 generally reaches to nearly the bottom of anode cavity 188, for example within about 0.005 inch to about 0.020 inch, preferably within 0.010 inch, of the bottom wall 186, whereby bottom wall 186 of shank 150 is preferably in close proximity to the respective seal 140 or isolation cup 142, such that the clearance between bottom wall 186 and the seal or isolation cup is minimal.

The reach of the shank to nearly the bottom of the anode cavity optimizes use of the anode zinc material by locating surface of the anode current collector proximate the bottom-most zinc in the anode cavity, thereby to facilitate efficient use of such zinc. Nonetheless, for ease of assembly, a measurable distance may exist between bottom wall 186 and the respective seal or isolation cup, whereby some anode material may be disposed between bottom wall 186 and the bottom of the anode cavity.

As used herein, references to AA size cells refer to the ANSI specifications for AA size Alkaline Manganese Cells. Conventional AA size cells have ANSI specified overall height of about 1.96 inches (50 mm) and overall diameter of about 0.55 inch (14 mm).

Table 3 illustrates comparative output of AA size cells of the invention compared to AA size conventional cells.

TABLE 3

| Ex No. | Discharge Current | Cathode Area | Current per hr to 0.9 V Best of 5 cells | Ahr to 0.9 V Best of 5 Cells |
|---|---|---|---|---|
| 1 | 1 Amp | 157 mA/cm$^2$ | 4.6 | 4.6 |
| 2 | .05 Amp | 8 mA/cm$^2$ | NA | 6.2 (est) |
| 3C | 1 Amp | 135 mA/cm$^2$ | 1.0 | 1.0 |
| 4C | .05 Amp | 7 mA/cm$^2$ | 46.0 | 2.3 |

Referring to Table 3. Examples 1 and 2 represent cells of the invention. Examples 3 and 4 represent conventional cells. "Best of 5 cells" means that 5 cells were tested, and the number reported was the best cell of the 5 tested.

Table 3 shows that cells of the invention have distinct advantage over same-sized conventional alkaline manganese cells.

Can-Less Cell Design

FIGS. 33 and 34 illustrate yet another set of embodiments of cells of the invention, wherein the cathode can per se has been deleted as a receptacle for receiving and containing the remaining elements of the cell, and structural strength of the cell is provided by other cell elements. To that end, the cathode current collector is preferably 0.007 inch thick instead of the 0.005 inch thickness indicated for the previous embodiments which do include a cathode can. A top e.g. closure member is used to consolidate the cell elements at the top of the cell. A bottom e.g. closure member is used to consolidate the cell elements at the bottom of the cell.

Figure 35:
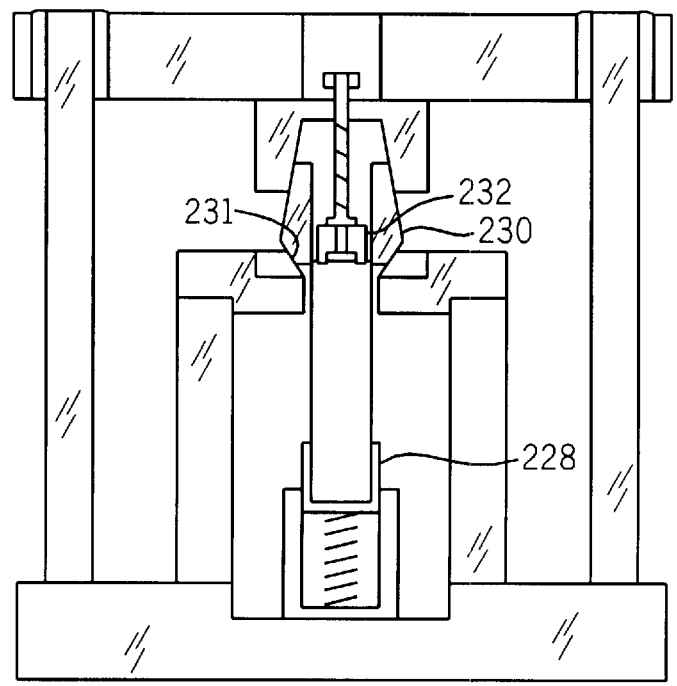
FIGS. 35 and 36 show representative elevation views of apparatus useful for closing and crimping the top and bottom members of can-less embodiments of cells of the invention.
Figure 36:
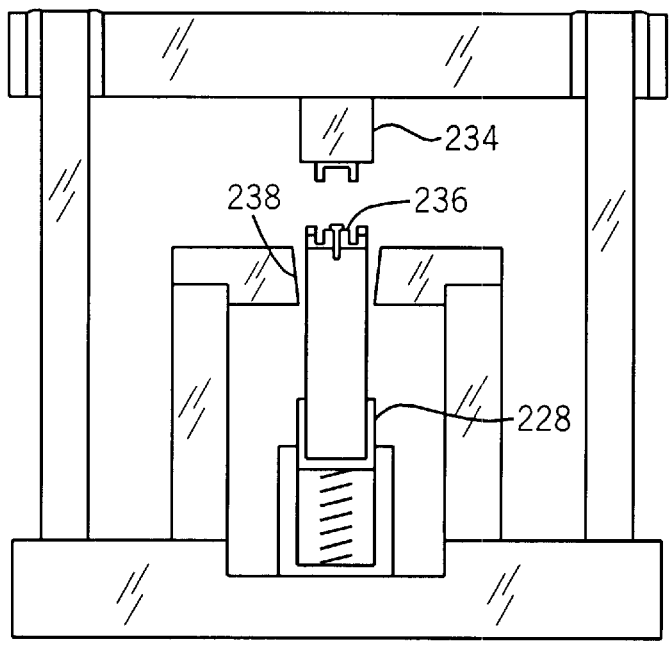

FIGS. 35 and 36 illustrate first and second apparatus and methods for assembling the top and bottom closure members with the remaining elements of the cell.

Figure 37:
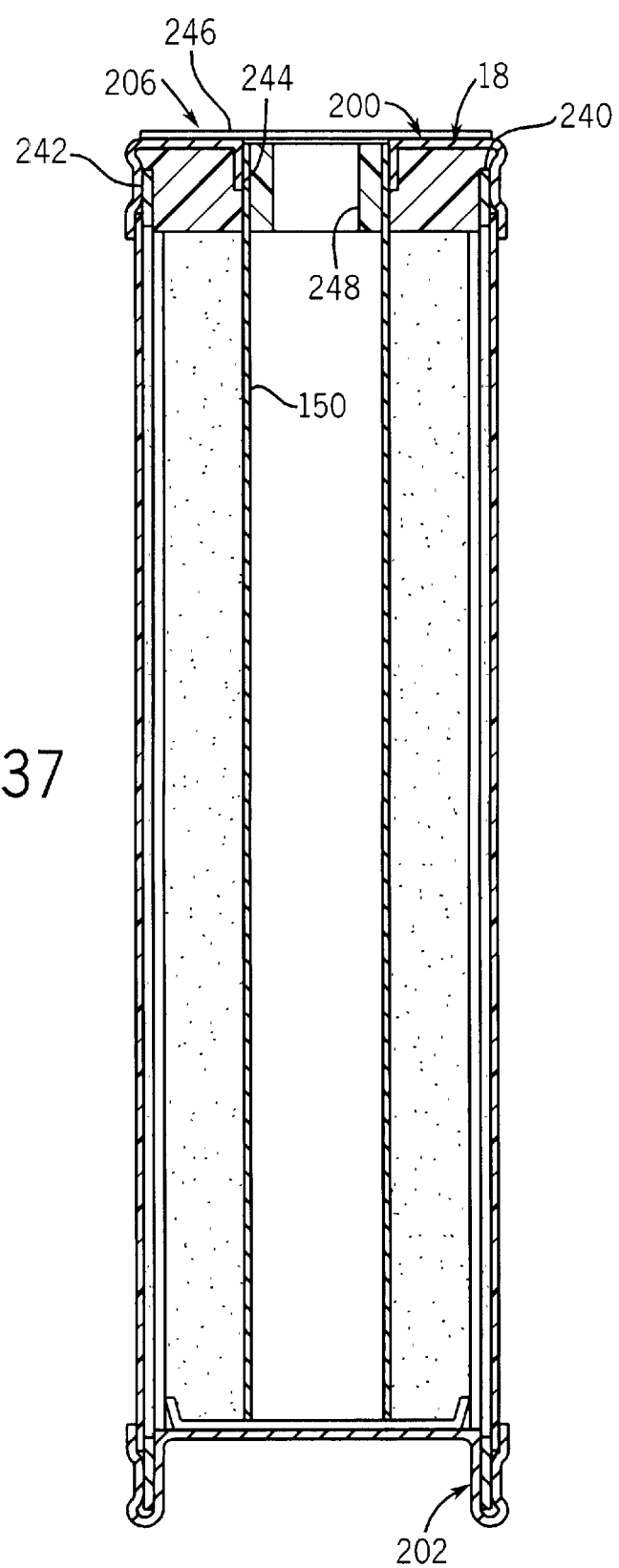
FIG. 37 shows a cross-section of a can-less embodiment of cells of the invention, utilizing a hollow anode current collector.
Figure 38:
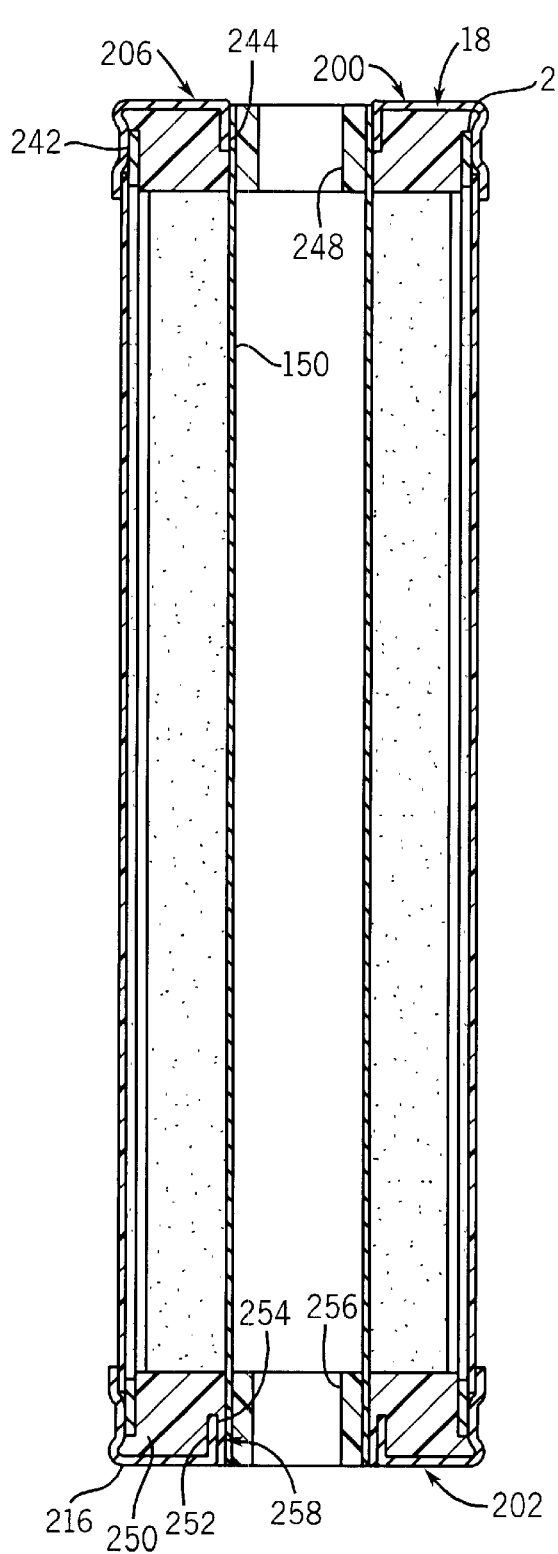
FIG. 38 shows a cross-section of a can-less embodiment of cells of the invention, utilizing a hollow anode current collector, having central openings in both the top and the bottom of the cell.

Finally, FIGS. 37 and 38 illustrate embodiments of the can-less cells employing hollow anode current collectors.

Basic Can-Less Cell Design

Referring now specifically to FIGS. 33 and 34, cathode assembly 26 is configured and assembled as in the above described embodiments except that a thicker cathode current collector is used. Preferred cathode current collector is 0.007 inch thick, thereby providing additional hoop strength to the cathode assembly. Cathode assembly 26 is made in the manner described above, making allowance for the thicker current collector material.

Annular top closure member 200 receives the top end of the cathode assembly, while annular bottom closure member 202 receives tie bottom end of the cathode assembly. Anode current collector 22 is received through top closure member 200 and projects into the anode mix as in the earlier embodiments.

Top closure member 200 includes a slimmed-down nylon grommet 204 received in a metal contoured top washer 206. Grommet 204 receives anode current collector 22 through central aperture 154. Contoured top washer 206 includes an outer annular slot 208 which receives an annular member 210 of grommet 204, the grommet having a corresponding annular slot 211, whereby the combination of slots 208, 211 define an annular receptacle receiving the top edge region of the cathode assembly.

Figure 34A:
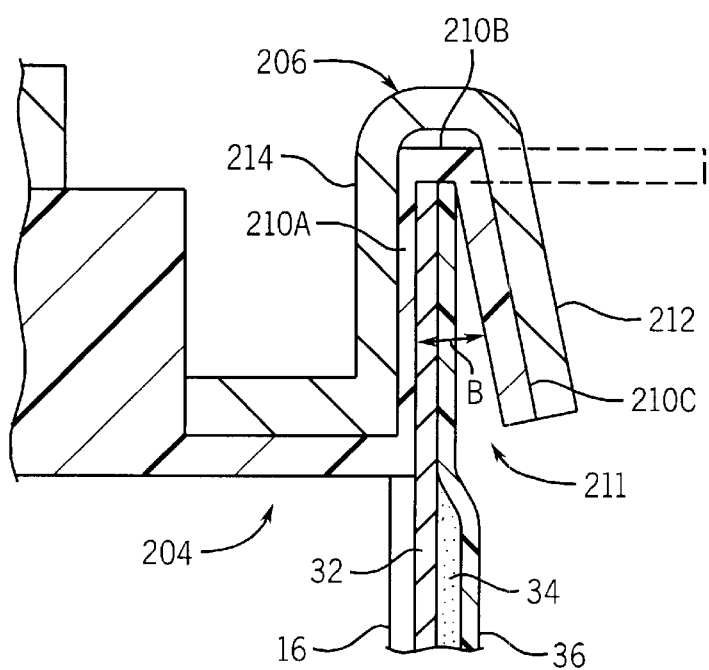
FIGS. 34A–34D illustrate cross-sections of additional embodiments of top closure structure of the cell.

FIG. 34A illustrates another embodiment of the can-less, receptacle-less structure, wherein the illustration shows the cell immediately prior to crimping of the top closure member inwardly in final closure of the cell. As shown, grommet 204 is constructed with a substantial angle β in slot 211, of about 2 degrees to about 90 degrees, preferably about 5 degrees to about 30 degrees, more preferably about 5 degrees to about 20 degrees. Thus, slot 211 is quite open at the bottom to receive cathode assembly 26. Angle β is defined by upwardly extending leg 210A, outer flange 210B, and downwardly depending leg 210C, of annular grommet member 210. Top washer 206 is placed over the grommet, whether before or after the grommet is assembled to the cathode assembly. Final crimping of top washer 206 inwardly against leg 214, accordingly, also substantially collapses angle β of the grommet while closing slot 211 and crimping leg 212 against the side of the top closure structure.

FIG. 34A further illustrates in dashed outline that leg 210C can initially extend outwardly from flange 210B. I such case, leg 210C is pushed downwardly when top washer 206 is assembled to the grommet, to the position shown for leg 210C in solid outline in FIG. 34A.

Figure 34B:
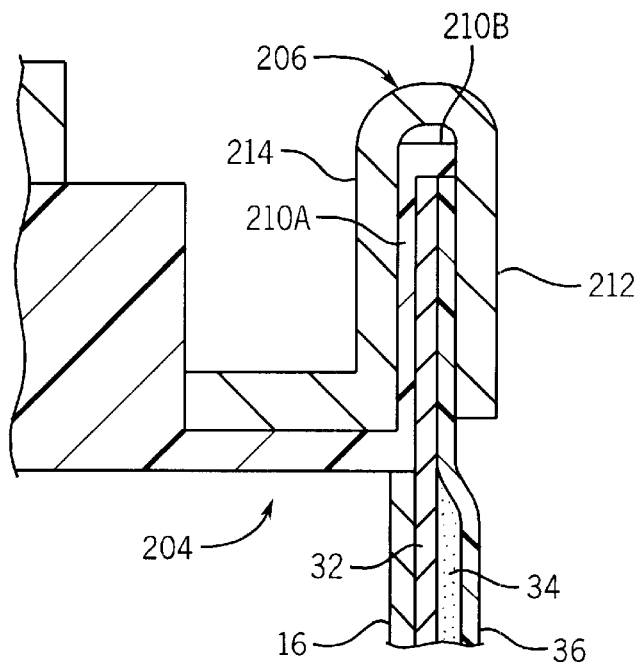

FIG. 34B illustrates a further embodiment of the can-less receptacle-less structure, as in FIG. 34A, but without downwardly extending leg 210C. Rather, annular member 210 ends at the cuter edge of outer flange 210B approximately in line with the outer surface of diffusion member 36. In this embodiment, outer leg 212 of washer 206 is crimped directly against the outer surface of the diffusion member. Thus, in this embodiment, diffusion member 36 takes on an additional function of providing electrical insulation between too washer 206 and cathode current collector 32.

Figure 34C:
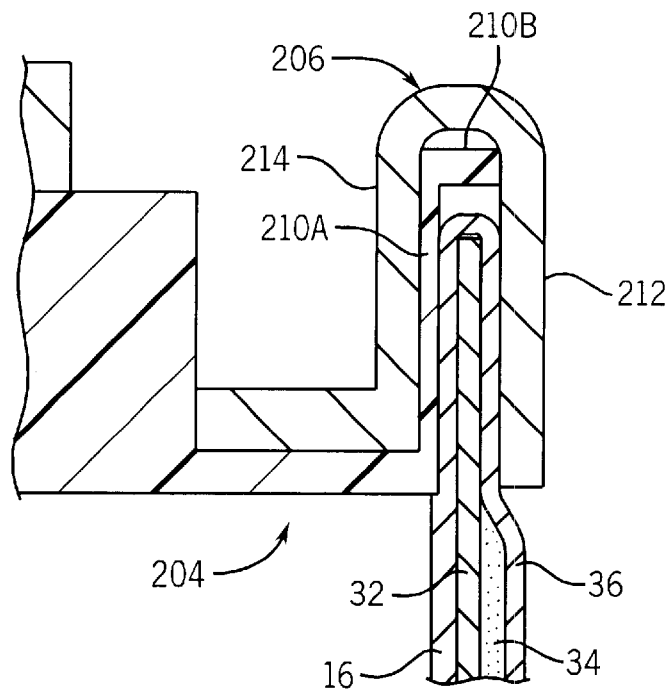

FIG. 34C illustrates a yet further embodiment derived from the structure of FIGS. 34A and 34B, and wherein the diffusion member is folded inwardly, as in FIG. 3A, over the top of the cathode current collector and downwardly along upwardly extending leg 210A of the grommet. Diffusion member 36, accordingly, lines a substantial portion of the combination of slots 208 and 211, and may line the entirety of the combination slot.

Figure 34D:
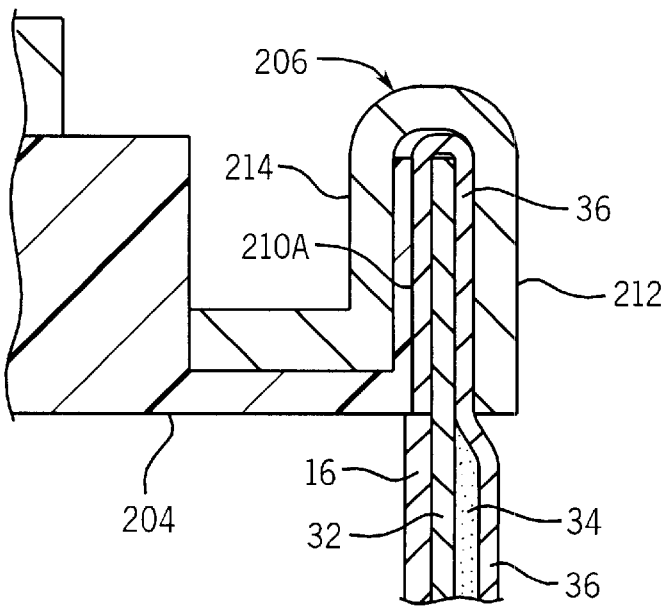

FIG. 34D illustrates a yet further embodiment derived from the structures of FIGS. 34A–34C, wherein outer flange 210B has been omitted, such that the annular receptacle which receives he cathode assembly is defined or the inner surface by leg 210A of the grommet, and the balance of the receptacle/slot is defined by leg 212, and the associated top curvature, of washer 206. Accordingly, diffusion member 36 provides the electrical separation, electrical insulation between the cathode current collector and the washer over both the outer and top portions of the combination slot.

As suggested by the drawings, the embodiments of FIGS. 34B–34D depend quite heavily on the ability of the diffusion member to provide adequate electrical insulation, as well as on the physical durability of the diffusion member to not be crushed or cut to the point of failure during cell assembly and use. However, assuming a fixed maximum outer diameter for the cell, by eliminating outer leg 210C, the cathode assembly can be moved outwardly a distance corresponding to the thickness attributed to leg 210C. Such movement of the cathode assembly adds correspondingly to the volume of electroactive negative electrode material which can be loaded into the cell thereby increasing the potential electrochemical capacity of the cell.

Top closure member 200 provides assembly integrity, and structural strength, to the top of the cell. Grommet 204 provides electrical insulation between the anode mix and the top closure member.

Downwardly depending outer and inner legs 212, 214, respectively, or opposing sides of slot 211 are effectively crimped toward each other to provide leak-proof closure of the top of the cell, generally taking the place of grooves 102, 176, 178, 180 of earlier embodiments, as appropriate. As with the embodiments which utilize a cathode can, the diffusion member can terminate at the top of the current collector, or can be folded over at the top of the cathode assembly, and thence extend downwardly inside the inner surface of the cathode current collector. Separator 16 generally terminates at or slightly above bottom slot 211.

Bottom member 202 includes a contoured metal bottom washer 216 having an annular slot 218, and an outer bottom seal member 220 received in slot 218. Seal member 220 includes a lower leg 222 extending inwardly from the outer region of slot 218 and under the bottom edge of the cathode assembly. Seal member 220 can be fabricated from any of a variety of electrically insulating materials. Typical such materials are polymers of the olefin and olefin copolymer classes. Seal member 220 is generally non-compressible in the sense that the density of the seal member generally reflects the unfoamed density of the respective material from which the seal member is fabricated. Seal member 220 is thus substantially less compressible than the above noted microporous PTFE diffusion member 36.

Upwardly extending outer and inner legs 224, 226 respectively, on opposing sides of slat 218 are effectively crimped toward each other to provide leak-proof closure of the bottom of the cell, generally taking place of grooves 122, 130 and the like at the bottom of the cathode can. Indeed, upwardly extending leg 224 takes the position of lower portion 114 of can side wall 30: and leg 226 takes the position of inner wall 110 of the can bottom. Platform 108 extends across the bottom of the cell as in e.g. the embodiments of FIGS. 2, 28, 30, and 32.

Omitting the cathode can from the design of the can-less cells as in FIGS. 33 and 34 provides multiple desirable features. First, by incorporating the much lighter weight top and bottom members in the cell in place of the can, yet allowing for the increased weight of the thicker cathode current collector, a substantial fraction (e.g. about 25%) of the weight of the cell is eliminated, accordingly enhancing the energy/weight ratio of the cell. Thus does the can-less design reduce he weight required for generating a giver amount of energy.

Second, a major portion of the length of the outer surface of the cell is represented by the cathode assembly, namely the diffusion member being openly exposed to ambient environment. Accordingly, the can-less embodiments are also known herein as having the cathode assembly "openly exposed such as at an outer surface to the ambient environment." Such statement or the like thus refers to a cell wherein there is no traditional cathode can to provide traditional containment and/or protection features to the cathode assembly or other contained elements.

In such embodiments, the diffusion member represents the only barrier to the cathode reaction surface receiving maximum available oxygen. By suitably selecting and fabricating the porosity of the diffusion member, maximum oxygen availability can be obtained while suitably controlling water vapor transmission. Such free availability of oxygen is advantageous where a high discharge rate is contemplated for the cell.

Third, the cost of the cathode can is obviated, including the cost of fabricating the can, including air ports 38.

The can-less embodiments are fabricated in a manner similar to fabrication of the can embodiments of the invention except for utilization of the can. Thus, bottom, seal member 220 is first seated in slot 218 of bottom washer 216.

Then, the cathode assembly is inserted into slot 218 inwardly of seal member 220, and onto the top surface of lower leg 222 as illustrated in FIG. 34. Bottom closure member 202 is then crimped to the cathode assembly, establishing the electrical contact between bottom washer 216 and the cathode assembly at upstanding leg 226, whereby the bottom closure member takes on the electrical contact function of the cathode can. The crimping of the bottom closure member also establishes crimping closure between seal member 220 and upstanding leg 224, thus to prevent leakage of electrolyte out of the bottom of the cell. Finally, joining the bottom closure member to the cathode assembly generally defines a receptacle for receiving the anode material.

With the bottom closure member joined with the cathode assembly, and sealed to the bottom of the cathode assembly, the subassembly is then placed in an upright disposition, with the top of the cathode assembly extending upwardly to define a generally open receptacle.

Next the separator is inserted in the manner described earlier. The separator material and structure can be that of any of the separators described earlier. After the separator has been inserted, either or both of isolation cup 142 and/or seal 140 are inserted into the open receptacle to finish defining the interior of the anode cavity. The anode mix is then placed in the cell, either a wet anode mix or the 2-step addition of a dry anode mix as described earlier herein.

With the anode mix in place, the top closure member, including the anode current collector, is placed on the top of the cathode current collector, correspondingly inserting the anode current collector into the anode mix. The combination of top closure member 200 and anode current collector 22 is then crimped in place to thereby seal the cell. Inserting the anode current collector into the anode mix establishes electrical contact between the anode mix and the anode terminal at head 152 of the anode current collector. The crimping of the top closure member to the cathode current collector closes the cell to leakage of electrolyte out of the cell.

Top and bottom closure members 200, 202 can be crimped to the cathode assembly at the above respective steps using apparatus such as that illustrated in FIG. 35. Referring to FIG. 35, a spring-mounted holder 228 receives the top end of the cathode assembly, and supports the top end while the bottom end of the cathode assembly is disposed upwardly in the apparatus shown.

Bottom closure member 202 is then placed on the upwardly-disposed bottom end of the cathode assembly. A slotted, cone-shaped collet 230 is then advanced downwardly onto the bottom closure member and against conically-shaped female tooling 231, simultaneously clamping downwardly and inwardly on the bottom closure member. An inner supporting tool 232 provides support to inner leg 226 while collet 230 crimps inwardly on leg 224, thereby to establish crimped electrical contact between the cathode current collector and bottom closure member 202 at leg 226. The crimp closure also crimps the cathode assembly against seal member 220, thus establishing the seal against leakage of electrolyte out of the cell about the bottom edge of cathode assembly 26.

With the bottom closure member thus secured to the bottom of the cathode assembly, the subassembly is then turned right-side-up, with the bottom of the cell being disposed downwardly. The separator is then inserted into the subassembly, followed by isolation cup 142 and/or seal 140 to thereby complete the definition of the anode cavity. Then, the anode mix is placed in the anode cavity. With the anode mix in place, the subassembly of top closure member and anode current collector is then assembled to the cathode assembly and the bottom closure member. Accordingly, the anode current collector is inserted into the anode mix and the top closure member is seated on the top of the cathode assembly such hat the top of the cathode assembly is received in slot 211.

The above described assemblage is then placed in holder 228 of the closure apparatus illustrated in FIG. 35, with the bottom closure member being received in holder 228 and the loosely assembled top closure member extending upwardly therefrom. Collet 230 is then brought down onto top closure member 200, crimping outer leg 212 of the top closure member downwardly and inwardly while supporting tool 232 supports inner leg 214 in channel 236 of top closure member 200.

The crimping process practiced in the working of FIG. 35 in general provides closure grooves crimping the top and bottom closure members to the cathode assembly, and thus provides the same function as corresponding grooves 102, 176, 178, 180, 122, 130, and the like, which provide closure seals on the previously described embodiments which use cathode cars. Thus, in the embodiments which use cathode cans, the top and bottom portions of the cathode can serve the same closure functions as the top and bottom closure members in the can-less embodiments. Accordingly, wherever herein we refer to a "top closure member" or a "bottom closure member," as respects closure and/or seal functions at the top and bottom of the cell, we specifically include respective top and bottom portions of the cathode can as the top and bottom closure members, in those embodiments which use a cathode can.

As an alternative to the tooling of FIG. 35, in the embodiment of FIG. 36, top closure member tool 234 advances downwardly onto channel 236, and pushes the entire cell assembly downwardly such that the respective outer leg 212 or 224, as appropriate, is crimped inwardly against tool 234 by conically-shaped receptacle tooling 238.

Can-Less Cell Having Hollow Anode Current Collector

The embodiments of FIGS. 37, 38, 39, and 39A take the invention yet another step further in improving the energy/weight ratio of the cell. In FIG. 37, the bottom corner structure is generally as disclosed with respect to FIGS. 2 and 3A. At the top of the cell, grommet 18 includes an annular slot 240 which receives the top of the air cathode assembly. Top contour washer 206 is received on the top of grommet 18, and extends downwardly about the outer edge of grommet 18, crimping an outer flange 242 of the grommet, outwardly of slot 240, onto the cathode assembly, thus locking the cathode assembly into slot 240. A downwardly depending lip 244 of contoured washer 206 makes physical and electrical contact with the outer surface of shank 150 of the anode current collector. Optional anode terminal disc 246 closes the cavity 188 inside shank 150. A vent 189 (not shown in FIG. 37) can be used as desired. A support collar 248 is illustrated in FIG. 37 supporting the inner surface of shank 150. Collar 248 is preferably conductive, but can be non-conductive in the embodiment illustrated in FIG. 37.

The crimping of the downwardly depending outer leg of washer 206 against flange 242 provides a liquid-tight crimp seal against leakage of electrolyte out of the top of the cell. Flange 242 provides electrical insulation between the cathode assembly and the conductive, typically metal, contour washer 206 which carries the anode charge. Flange 242 is, of course, sufficiently thick to provide the desired electrical isolation between the anode and the cathode.

The embodiment of FIG. 38 further illustrates a can-less cell wherein the bottom structure is similar to the top structure illustrated in FIG. 37. In FIG. 38, the top structure is the same as has been described for FIG. 37. Thus, grommet 18 electrically isolates the cathode assembly from contour washer 206 which carries the charge of the anode terminal. Grommet 18 further provides leakage control about the cathode assembly at the top of the cell.

Turning attention now to the bottom of the cell, bottom grommet 250 includes an inwardly disposed annular slot 252 which receives an upwardly depending lip 254 of bottom contour washer 216. Bottom contour washer 216 is received on the bottom of grommet 250, and extends upwardly about the outer edge of grommet 250, and upwardly about the bottom edge of cathode assembly 26, crimping the conductive metal bottom contour washer against the outer surface of the bottom edge of the cathode assembly. The bottom washer is thus in intimate electrical contact with the cathode current collector, and serves as the cathode terminal.

An inner flange 258 of grommet 250, disposed inwardly of slow 252, isolates shank 150 of the anode current collector from contour washer 216 which carries the cathode charge. A second support collar 256 supports the inner surface of shank 150 at bottom grommet 250. Collar 256 is preferably non-conductive.

Figure 39:
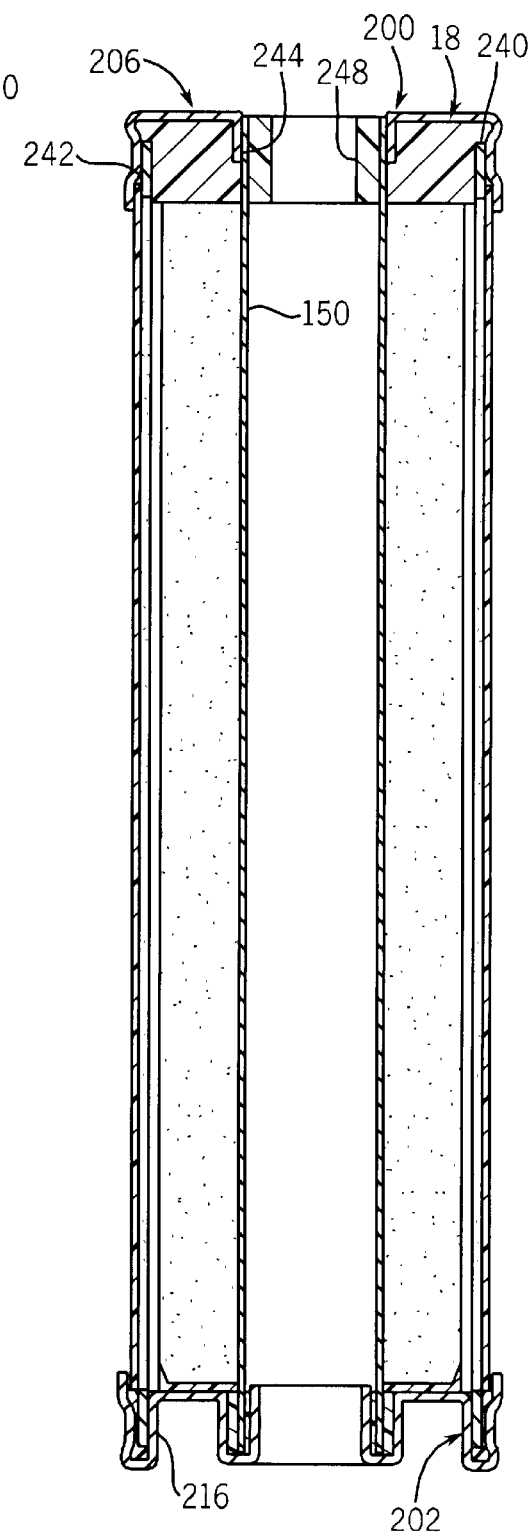
FIG. 39 illustrates a cross-section as in FIG. 38, and utilizing a modified bottom structure of the cell.
Figure 39A:
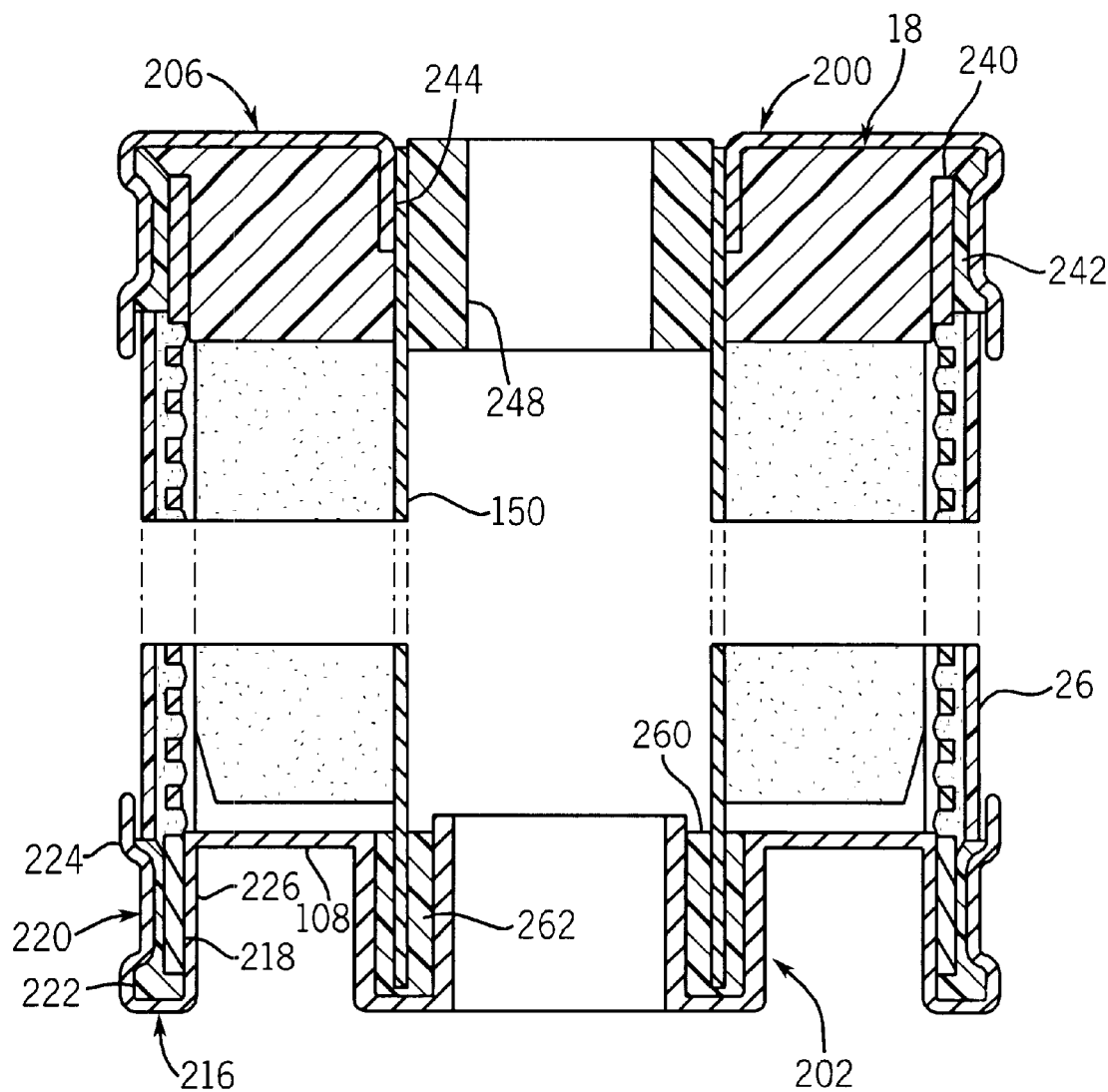
FIG. 39A is a fragmentary cross-section showing top and bottom portions of the cell of FIG. 39, further enlarged.

FIGS. 39 and 39A illustrate an embodiment having a hollow anode current collector, and top member 200 as in the embodiments of FIGS. 37 and 38, and wherein the bottom member more resembles the embodiments of FIGS. 33 and 34. Addressing specifically the bottom structure of FIG. 39A, bottom member 202 includes a contoured metal bottom washer 216 having a first outer annular slot 218 and a second inner annular slot 260. Seal member 220 in outer slot 218 includes a lower leg 222 extending inwardly from the outer region of slot 218 and under the bottom edge of the cathode assembly. Upwardly extending outer and inner legs 224, 226 respectively, on opposing sides of slot 218 are effectively crimped toward each other to provide leak-proof closure of the bottom of the cell about the bottom edge portion of the cathode assembly, and provide electrical contact between the cathode current collector and washer 216 at leg 226. A foreshortened platform, 108 extends inwardly of slot 218 to slot 260.

An inner bottom seal member 262 is disposed in inner bottom slot 260 of washer 216 and receives shank 150 of anode current collector 22. Seal member 262 provides liquid seal, sealing the bottom of the anode cavity against leakage out of the cell at seal member 262. In addition, seal member 262 electrically isolates the anode charge on shank 150 from the cathode charge on bottom washer 216.

While the invention has been described herein in terms of cells used under high discharge rate conditions, the invention is readily adapted and applied to cells used under moderate and/or low discharge rate conditions.

The principles taught herein with respect to cylindrical cells can, in general, be applied to other configurations of elongate cells. Accordingly, elongate cells of non-similar cross-section are contemplated, such as cells having e.g. oval cross-sections, hexagonal cross-sections, and other polygonal shapes.

Further, while the teachings herein are expressed in terms of cells which approximate conventional "AA" size, the same principles can be applied to other elongate cells, for example round cells, having other sizes and specific length to cross-section relationships. For example, and without limitation, the principles, including structures, taught herein can well be applied to cells commonly known as "AAA" cells, "C" cells, and "D" cells, as well as to the approximate "AA" cells illustrated, and to an infinite number of variations on the length/width ratio of such cells.

As used throughout this teaching, the term "anode" refers to the negative electrode of the electrochemical cell. Respectively, the term "cathode" refers to the positive electrode of the electrochemical cell.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent he following claims use means plus function language, it is not meant to include there, or in the instant specification, anything no structurally equivalent to what is shown in the embodiments disclosed in the specification.

Having thus described the inversion, what is claimed is:

1. An elongate air depolarized electrochemical cell, having a positive end and a negative end, and a transverse cross-section disposed along a length of said cell, said elongate air depolarized electrochemical cell comprising:

(a) a cathode, including an air cathode assembly extending along the length of said cell;

(b) an anode, including an anode cavity, and electroactive anode material in the anode cavity, the anode cavity having an open end and a closed end;

(c) a separator, having an inner side wall thereof defining a side wall of the anode cavity between said electroactive anode material and said cathode assembly;

(d) electrolyte dispersed in said anode, said cathode, and said separator;

(e) a closure member electrically connected to said cathode assembly and forming a an end wall of said air depolarized electrochemical cell; and (f) an electrically insulating seal member extending generally across that portion of the transverse cross-section which spans the anode cavity at the closed end of the anode cavity, said seal member separating said electroactive anode material from said end wall, and providing a seal about the side wall of the anode cavity at said separator, said seal member comprising an in situ melt plug extending generally across the anode cavity at the closed end of the anode cavity, electrically separating said electroactive anode material from said end wall, said melt plug resulting from placing one or more particles of thermoplastic material at the closed end of the anode cavity, and subsequently melting the one or more particles in situ and thereby activating melt flow of the thermoplastic material thus to cover the transverse cross-section at the closed end of the anode cavity.

2. An elongate air depolarized electrochemical cell as in claim 1, said melt plug comprising a meniscus at said separator.

3. An elongate air depolarized electrochemical cell as in claim 1, and including a slot adjacent an outer side wall of said closure member, said cathode assembly extending into the slot and making electrical connection with said closure member in the slot.

4. An elongate air depolarized electrochemical cell as in claim 1, said melt plug resulting from driving heat through said end wall of said closure member and thereby melting one or more particles of thermoplastic seal material in the closed end of the anode cavity.

5. An elongate air depolarized electrochemical cell as in claim 3, said cathode assembly comprising a cathode current collector, extending into the slot and making the electrical connection, said separator extending past an end of said insulating bottom seal member, and terminating short of an edge of said cathode current collector.

6. An elongate air depolarized electrochemical cell as in claim 1, said seal member further comprising an isolation cup extending across that portion of the transverse cross-section which spans the anode cavity at the closed end of the anode cavity, between said melt plug and said end wall, electrically separating said electroactive anode material from said end wall, and providing a seal about the side wall of the anode cavity at said separator.

7. An elongate air depolarized electrochemical cell as in claim 1, said seal member comprising an isolation cup extending generally across that portion of the transverse cross-section which spans the anode cavity at the closed end of the anode cavity, said isolation cup electrically separating said electroactive anode material from said end wall.

8. An elongate air depolarized electrochemical cell having a positive end and a negative end, and a transverse cross-section disposed along a length of said cell, said elongate air depolarized electrochemical cell comprising:

(a) a cathode, including an air cathode assembly extending along the length of said cell;

(b) an anode, including an anode cavity, and electroactive anode material in the anode cavity, the anode cavity having a an open end and a closed end;

(c) a separator, defining a side wall of the anode cavity between said anode material and said cathode assembly;

(d) electrolyte dispersed in said anode, said cathode, and said separator;

(e) a closure member electrically connected to said cathode assembly and forming a an end wall of said air depolarized electrochemical cell; and (f) an electrically insulating in situ melt plug extending generally across that portion of the transverse cross-section which spans the anode cavity at the closed end of the anode cavity, said melt plug separating said electroactive anode material from said end wall, and providing a seal about the side wall of the anode cavity at said separator, said melt plug resulting from placing one or more particles of electrically insulating thermoplastic material at the closed end of the anode cavity, and subsequently driving heat through said end wall of said closure member and thereby melting the one or more particles of electrically insulting thermoplastic material in situ and thereby activating melt flow of the thermoplastic material thus to cover the transverse cross-section at the closed end of the anode cavity, the melt plug comprising a meniscus at said separator;

said elongate air depolarized electrochemical cell further comprising a slot adjacent an outer side wall of said closure member, said cathode assembly comprising a cathode current collector, extending into the slot and making electrical connection with said closure member in the slot.

\* \* \* \* \*

UNITED STATES PATENT AND TRADEMARK OFFICE
CERTIFICATE OF CORRECTION

PATENT NO. : 6,436,571 B1
DATED : August 20, 2002
INVENTOR(S) : Passaniti et al.

It is certified that error appears in the above-identified patent and that said Letters Patent is hereby corrected as shown below:

Title page,
Item [57], ABSTRACT,
Line 10 "wars of" is changed to -- walls of --
Line 17 "with, the" is changed to -- with the --

Column 3,
Line 39, "cove" is changed to -- cover --

Column 4,
Line 65, "illustrative" is changed to -- illustrate --

Column 7,
Line 31, "(catode" is changed to -- (cathode --
Line 50, "cross-sectional, it is" is changed to -- cross-section. It is --

Column 9,
Line 8, "past, the" is changed to -- past the --
Line 9, "sheen" is changed to -- sheet --

Column 10,
Line 56, "sizes or" is changed to -- sizes of --

Column 11,
Line 58, "fabricates" is changed to -- fabricated --

Column 13,
Line 66, "cuter edge" is changed to -- outer edge --

Column 14,
Line 18, "slots 55A" is changed to -- slots 65A --

Column 16,
Line 23, insert comma (,) after "1500 m2/g"
Line 27, "a Preferred" is changed to -- a preferred -- (lower case "p")

Column 17,
Line 4, "about 40" is changed to -- about 40% --
Line 13, "birder" is changed to -- binder --
Line 26, "states size" is changed to -- stated size --
Lines 30-31, "low, there greater" is changed to --l ow. Where greater --
Line 45, "mix vertex" is changed to -- mix vortex --

UNITED STATES PATENT AND TRADEMARK OFFICE
CERTIFICATE OF CORRECTION

PATENT NO. : 6,436,571 B1
DATED : August 20, 2002
INVENTOR(S) : Passaniti et al.

It is certified that error appears in the above-identified patent and that said Letters Patent is hereby corrected as shown below:

Column 18,
Line 14, "0.006" is changed to -- 0.004 --

Column 19,
Line 32, "DTFE" is changed to -- PTFE --
Lines 39-40, "go about" is changed to -- to about --
Line 51, "gas a" is changed to -- has a --

Column 20,
Line 15, "third rip" is changed to -- third nip --
Line 17, "e.g." is changed to -- E.g. --
Line 58, "surface 50" is changed to -- surface 60 --
Line 23, "92B. 92C" is changed to -- 92B, 92C --

Column 21,
Line 32, "928" is changed to -- 92B --
Line 39, "as seer" is changed to -- as seen --
Line 65, "the naps" is changed to -- the nips --

Column 22,
Line 45, "or the" is changed to -- of the --

Column 23,
Line 7, "inner surface 50." is changed to -- inner surface 60. --

Column 24,
Line 35, "1611." is changed to -- 1611, --
Line 41, "at least" is changed to -- a flat --.

Column 25,
Line 37, "potassium, hydroxide" is changed to -- potassium hydroxide --

Column 26,
Line 28, "welch a" is changed to -- with a --
Line 38, "lines 96, it" is changed to -- lines 96. It --

UNITED STATES PATENT AND TRADEMARK OFFICE
CERTIFICATE OF CORRECTION

PATENT NO. : 6,436,571 B1
DATED : August 20, 2002
INVENTOR(S) : Passaniti et al.

It is certified that error appears in the above-identified patent and that said Letters Patent is hereby corrected as shown below:

Column 27,
Line 11, "carbon-cased" is changed to -- carbon-based --

Column 28,
Line 3, "mechanically bord" is changed to -- mechanically bond --
Lines 52-53, "collector, pressure" is changed to -- collector. Pressure --

Column 29,
Line 23, "(FIG. 33)" is changed to -- (FIG. 3B) --
Line 54, "or the" is changed to -- on the --

Column 30,
Line 66, "paladium" is changed to -- palladium --

Column 32,
Line 25, "suppressed where" is changed to -- suppressed. Where --

Column 35,
Line 46, "platform, 108" is changed to -- platform 108 --
Line 52, "FIG. 13" is changed to -- FIG. 19 --

Column 36,
Line 38, "he air" is changed to -- the air --
Line 41, "the car," is changed to -- the can, --
Line 59, "platform 168" is changed to -- platform 108 --

Column 37,
Line 16, "130W, by" is changed to -- 130W by --
Line 34, "16 s positioned" is changed to -- 16 is positioned --
Line 66, "my" is changed to -- by --

Column 38,
Line 13, "is no" is changed to -- is not --

Column 39,
Line 33, "bottom will" is changed to -- bottom wall --
Line 59, "are no" is changed to -- are not --

UNITED STATES PATENT AND TRADEMARK OFFICE
CERTIFICATE OF CORRECTION

PATENT NO. : 6,436,571 B1
DATED : August 20, 2002
INVENTOR(S) : Passaniti et al.

It is certified that error appears in the above-identified patent and that said Letters Patent is hereby corrected as shown below:

Column 40,
Line 19, a period -- . -- is inserted after "bottom seal"
Line 33, "sea material" is changed to -- seal material, --

Column 42,
Line 21, "weights" is changed to -- weight, --
Line 23, "Th above" is changed to -- The above --
Line 60, "57%" is changed to -- 67% --
Line 65 "potassiurm" is changed to -- potassium --

Column 43,
Line 25, "company. Cleveland" is changed to -- company, Cleveland --
Line 38, "Aqualon company." is changed to -- Aqualon company, --

Column 44,
Line 40, "mercury car," is changed to -- mercury can, --
Line 55, "rave" is changed to -- rate --

Column 45,
Line 35, "hydroxide," is changed to -- hydroxide; --

Column 46,
Line 22, "lead. 300" is changed to -- lead, 300 --
Line 47, "at east" is changed to -- at least --

Column 48,
Line 16, "fix 20" is changed to -- mix 20 --
Line 17, "he shank" is changed to -- the shank --

Column 49,
Line 18, "to he top" is changed to -- to the top --
Line 37, "she anode" is changed to -- the anode --
Line 65, "and/or 36" is changed to -- and/or 30 --

Column 50,
Line 26, "sizes" is changed to -- sides -- C --
Line 38, "each ocher." is changed to -- each other. --

Column 52,
Line 26, "he slot" is changed to -- the slot --

UNITED STATES PATENT AND TRADEMARK OFFICE
CERTIFICATE OF CORRECTION

PATENT NO. : 6,436,571 B1
DATED : August 20, 2002
INVENTOR(S) : Passaniti et al.

It is certified that error appears in the above-identified patent and that said Letters Patent is hereby corrected as shown below:

Column 53,
Line 67, "groove 02." is changed to -- groove 102. --

Column 54,
Line 9, "bit referring" is changed to -- but referring --
Line 9, "FIG. 3B." is changed to -- FIG. 3B, --
Line 48, "seal cape" is changed to -- seal tape --

Column 55,
Line 1, "surface 50" is changed to -- surface 60 --
Line 45, "zone. May" is changed to -- zone, may --
Line 53, "material 40" is changed to -- material 140 --
Line 67, "a out" is changed to -- about --

Column 56,
Line 44, "or the" is changed to -- of the --

Column 57,
Line 14, "cathode car," is changed to -- cathode can, --
Line 28, "he anode" is changed to -- the anode --
Line 28, "he cell" is changed to -- the cell --

Column 58,
Line 20, "drain rare" is changed to -- drain rate --
Line 33, "can, or example" is changed to -- can. For example --.

Column 59,
Line 11, "other point" is changed to -- other joint --
Line 13, "cup 42" is changed to -- cup 142 --
Line 17, "separator 10" is changed to -- separator 16 --

Column 62,
Line 54, "31A." is changed to -- 31A, 31B --
Line 63, "he cell" is changed to -- the cell --

UNITED STATES PATENT AND TRADEMARK OFFICE
CERTIFICATE OF CORRECTION

PATENT NO. : 6,436,571 B1
DATED : August 20, 2002
INVENTOR(S) : Passaniti et al.

It is certified that error appears in the above-identified patent and that said Letters Patent is hereby corrected as shown below:

Column 63,
Line 3, "31 A." is changed to -- 31A, 31B --
Line 19, "nave been" is changed to -- have been --
Line 22 "wall 18A" is changed to -- wall 184 --
Line 32 "more be than" is changed to -- more than -- (delete "be")

Column 64,
Line 19, "ments. for example" is changed to -- ments, for example --
Line 20, "cooper" is changed to -- copper --
Line 20, "tin Other" is changed to -- tin. Other --
Line 33, "the sale" is changed to -- the same --
Line 37, "the shark" is changed to -- the shank --

Column 65,
Line 33, "nave densities" is changed to -- have densities --

Column 67,
Lines 15-16, "I such case," is changed to -- in such case, --
Line 22, " cuter edge" is changed to -- outer edge --
Line 27, "too" is changed to -- top --
Line 40, "he cathode" is changed to -- the cathode -- "or the " is changed to -- on the --
Line 59, "cell thereby" is changed to -- cell, thereby --
Line 66, "or opposing" is changed to -- on opposing --

Column 68,
Line 29, "wall 30:" is changed to -- wall 39: --
Line 41, "he weight" is changed to -- the weight --
Line 41, "a giver" is changed to -- a given --
Line 66, "bottom, seal" is changed to -- bottom seal --

Column 70,
Line 6 "such hat" is changed to -- such that --
Line 23 "cars" is changed to -- cans --

Column 71,
Line 24 "of slow" is changed to -- of slot --

UNITED STATES PATENT AND TRADEMARK OFFICE
CERTIFICATE OF CORRECTION

PATENT NO. : 6,436,571 B1
DATED : August 20, 2002
INVENTOR(S) : Passaniti et al.

It is certified that error appears in the above-identified patent and that said Letters Patent is hereby corrected as shown below:

Column 72,
Line 24 "anything no" is changed to -- anything not --
Line 43 "a an end" is changed to -- an end --

Column 74,
Line 3 "a an open" is changed to -- an open --
Line 10 "a an end" is changed to -- an end --

Signed and Sealed this

Seventeenth Day of August, 2004

JON W. DUDAS
*Acting Director of the United States Patent and Trademark Office*